(12) United States Patent
Barnes, Jr.

(10) Patent No.: US 7,487,112 B2
(45) Date of Patent: Feb. 3, 2009

(54) SYSTEM, METHOD, AND COMPUTER PROGRAM PRODUCT FOR PROVIDING LOCATION BASED SERVICES AND MOBILE E-COMMERCE

(76) Inventor: Melvin L. Barnes, Jr., 5323 Pooks Hill Rd., Bethesda, MD (US) 20814

( * ) Notice: Subject to any disclaimer, the term of this patent is extended or adjusted under 35 U.S.C. 154(b) by 1514 days.

(21) Appl. No.: 10/154,016

(22) Filed: May 23, 2002

(65) Prior Publication Data

US 2003/0065805 A1    Apr. 3, 2003

(51) Int. Cl.
*G06Q 30/00* (2006.01)
*H04N 5/445* (2006.01)

(52) U.S. Cl. .................. 705/26; 705/1; 705/5; 705/27; 705/400; 725/60; 725/125; 709/204; 709/219

(58) Field of Classification Search .................. 705/26, 705/27, 5, 400, 1; 707/102, E17.009; 709/203, 709/244, 232, 204, 219; 348/E5.002, E5.104, 348/E7.061, E7.071, E7.081, E5.105; 725/60, 725/125

See application file for complete search history.

(56) References Cited

U.S. PATENT DOCUMENTS

| | | | |
|---|---|---|---|
| 5,732,398 A * | 3/1998 | Tagawa .......................... 705/5 |
| 5,737,491 A | 4/1998 | Allen et al. |
| 5,930,473 A * | 7/1999 | Teng et al. .................. 709/204 |
| 6,026,375 A | 2/2000 | Hall et al. |
| 6,070,155 A * | 5/2000 | Cherrington et al. ........ 705/400 |
| 6,075,527 A * | 6/2000 | Ichihashi et al. ............. 715/721 |
| 6,144,848 A | 11/2000 | Walsh et al. |
| 6,219,653 B1 * | 4/2001 | O'Neill et al. .............. 705/400 |
| 6,356,539 B1 * | 3/2002 | Zuliani et al. ............... 370/320 |
| 6,512,919 B2 | 1/2003 | Ogasawara |
| 6,928,655 B1 * | 8/2005 | Omoigui ..................... 725/105 |
| 7,072,886 B2 | 7/2006 | Salmenkaita et al. |
| 7,133,837 B1 | 11/2006 | Barnes, Jr. |
| 2001/0033296 A1 * | 10/2001 | Fullerton et al. ............ 345/730 |
| 2002/0000468 A1 | 1/2002 | Bansal |
| 2002/0078456 A1 * | 6/2002 | Hudson et al. ................ 725/60 |
| 2004/0073631 A1 * | 4/2004 | Keorkunian et al. ........ 709/219 |
| 2006/0215029 A1 * | 9/2006 | Katz .......................... 348/150 |
| 2007/0005795 A1 * | 1/2007 | Gonzalez .................... 709/232 |

* cited by examiner

*Primary Examiner*—Yogesh C Garg
(74) *Attorney, Agent, or Firm*—Mel Barnes

(57) ABSTRACT

A system, method, apparatus and computer program product for providing location based functions and mobile e-commerce comprising a central processing unit including a processor, a storage device, and programming stored in the storage device, a display device, an audio input device, an audio output device, a communications module, a commerce module, an image module, and a location module. The programming controls the operation of the present invention to provide functions based on location data, to facilitate commercial exchanges by wirelessly exchanging payment and product information with venders, to identify services such as venders meeting selection criteria, to wirelessly exchange select information with other users and systems, to restrict and/or monitor the use of the device based on authorized user parameters, selecting one of a plurality networks through which to communicate, detecting a trigger for performing an action based on a change in location and sensed data, storing a voice annotation with a computer data file, determining service providers and associated communication parameters, contemporaneously maintaining a wireless voice and data link, providing a system for selecting and delivering mobile advertisements, and many other functions and services that are described herein.

21 Claims, 9 Drawing Sheets

SYSTEM, METHOD, AND COMPUTER PROGRAM PRODUCT FOR PROVIDING LOCATION BASED SERVICES AND MOBILE E-COMMERCE

CROSS REFERENCE TO RELATED APPLICATION

This non-provisional application claims the benefit of the earlier filing date of, and contains subject matter related to that disclosed in, U.S. application Ser. No. 09/606,350 filed Jun. 29, 2000 having common inventorship, the entire contents of which being incorporated herein by reference.

BACKGROUND OF THE INVENTION

1. Field of the Invention

The present invention relates, generally, to the field of mobile communications and computer processing and more particularly, to a system, method, apparatus, and computer program product for providing location based services, mobile e-commerce, and other functions.

2. Discussion of the Background

Mobile phones and personal digital assistants (PDA) include functionality that is typically limited to providing a telephone communication link, which can be also sometimes used as a data communication link, and a set of software programs such as a calendar, email client, mini-browser, word processor, and other similar user applications. Such devices therefore typically have limited functionality. Generally, very few of such devices include image input capabilities, voice recording capabilities, significant voice control capabilities, location determining or location based capabilities, or other capabilities described herein.

In addition, portable devices are often carried with users who travel through cities, shopping complexes, and other facilities and geographical areas. However, currently portable devices do not provide users with many services and functions that are related to, or based on, the user's location or changes in location. Similarly, while such devices often have capabilities for providing a telephone communication link, very few provide capabilities for providing wireless Local Area Network (LAN), wireless Personal Area Network (PAN), or any other wireless network communications. Furthermore, such devices typically do not include Web services capabilities or access thereto. As a result of these deficiencies and others, such devices fail to provide substantial mobile e-commerce services, location based functions, and functions or services available through the use of a wireless LAN.

Furthermore, to date, venders have not been able to take advantage of location information associated with customers and potential customers or obtain information about prospective customers. Typically, a vender only identifies the customer, if at all, when the person makes a purchase. Consequently, venders are typically not aware of the nearby or approaching presence of a past customer, potential customer, or person seeking a product that the vender offers. In addition, even if a vender had such information, venders have no mechanism in place for presenting advertisements to the person or otherwise enticing the user to visit the vender store location or make a purchase. Furthermore, even if such a mechanism was in place, the vender typically has no information about the person that can be used as a basis for selecting of an advertisement to be presented to the person or customizing the advertisement and the person has little incentive for viewing such an advertisement.

These and other deficiencies are overcome by the present invention which provides a system, method, apparatus, and computer program product for providing location based services, location based mobile e-commerce, automated processing, wireless network communications, mobile telephone communications, and many other functions and services described herein.

SUMMARY OF THE INVENTION

The primary object of the present invention is to overcome the deficiencies of the prior art described above by providing a system, method, apparatus, and computer program product for providing location services and mobile e-commerce.

Another key object of the present invention is to provide a system, method, apparatus, and computer program product for providing automated processing and mobile e-commerce.

Yet another key object of the present invention is to provide a system, method, apparatus, and computer program product for providing mobile capabilities, and functions not available on existing mobile devices.

Another key object of the present invention is to provide a system, method, apparatus, and computer program product for facilitating localized e-commerce such as in a localized auction, shopping complex, vender store location, or other facility or geographical area.

Another object of the present invention is to provide a system, method, apparatus, and computer program product that can facilitate commercial exchanges through the use of wireless communications.

One embodiment of the present invention achieves these objects and others by providing a system, method, apparatus and computer program product for providing location based functions and mobile e-commerce comprising a central processing unit including a processor, a storage device, and programming stored in the storage device, a display device, an audio input device, an audio output device, a communications module, and a location module.

The programming controls the operation of the present invention to provide functions based on location data, to facilitate commercial exchanges by wirelessly exchanging payment and product information with venders, to identify services such as venders meeting selection criteria, to wirelessly exchange select information with other users and systems, to restrict and/or monitor the use of the device based on user provided parameters, selecting one of a plurality networks through which to communicate, triggering an action based on a change in location and sensed data, storing a voice annotation with computer data file, determining service providers and associated communication parameters, contemporaneously maintaining a wireless voice and data link, and many other functions and services that are described herein.

Further features and advantages of the present invention, as well as the structure and operation of various embodiments and applications of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
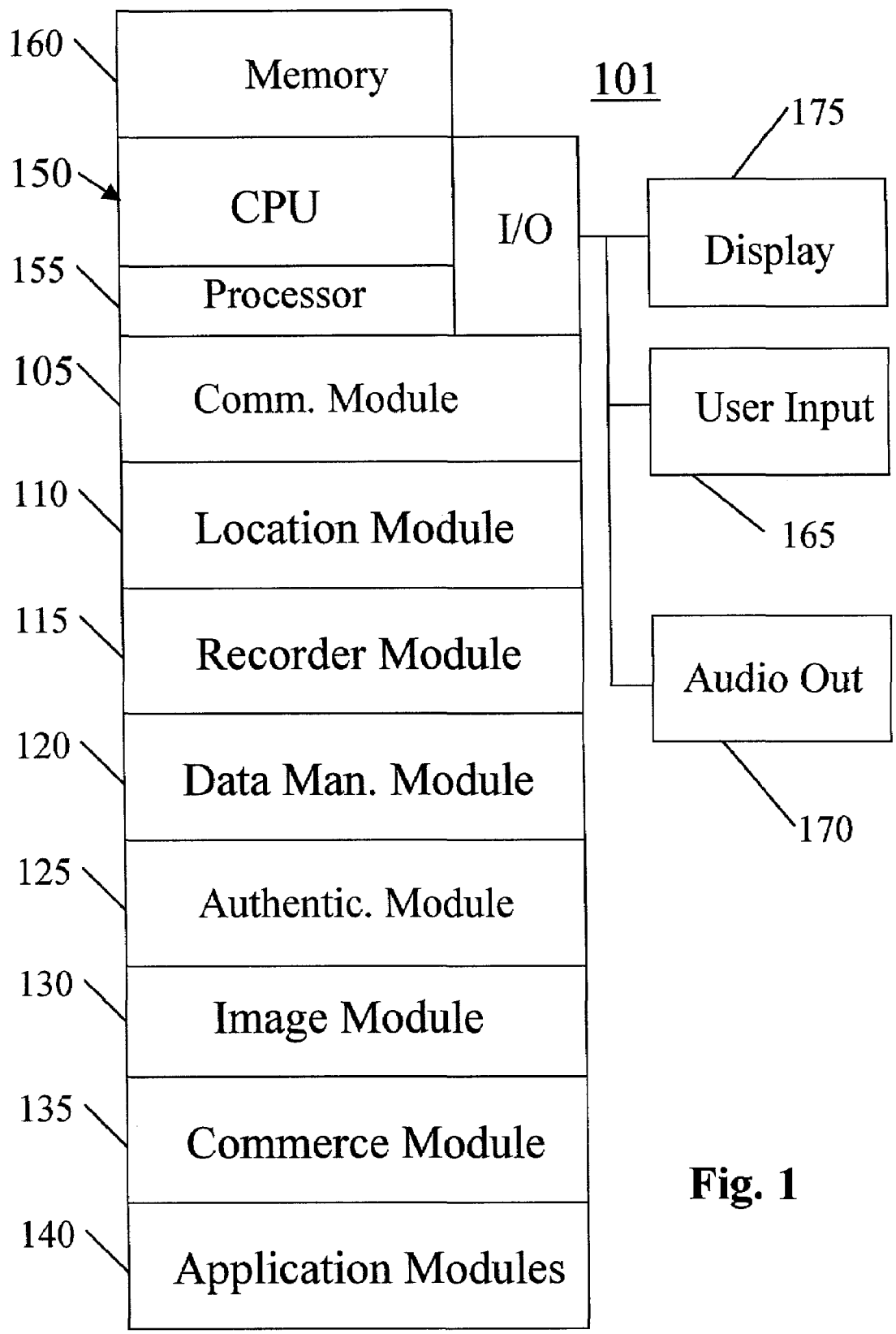
FIG. 1 is a functional block diagram of an example system, apparatus, and computer program product in accordance with the present invention.

In the following description, for purposes of explanation and not limitation, specific details are set forth, such as particular networks, communication systems, computers, terminals, devices, components, techniques, data and network protocols, formats, software products and systems, enterprise applications, operating systems, enterprise technologies, middleware, interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, formats, software products and systems, enterprise applications, operating systems, enterprise technologies, middleware, interfaces, and hardware are omitted so as not to obscure the description of the present invention.

I. General Design Concepts

References to a product is meant to mean any product, goods, service, or any other article of commerce including, but not limited to, such items as rentals, tickets (e.g., entertainment, travel, etc.), reservations (e.g., travel, hotel, restaurant, entertainment, etc.), real estate, information, food, and financial products among others.

In many of the applications of the embodiments, payment information is exchanged between the device and a computer system. The payment information may be related to any type of payment account and therefore may include, for example, credit card information, debit card information, bank account information, information for billing the product to the telephone or to an Internet Service Provider (IS) account used by the device, an email address (e.g., a Paypal® payment), brokerage account information, electronic fund transfer data, and/or any other data that may facilitate payment. The payment information will typically be different for each type of payment account. For example, the payment information for a credit card payment account may include a credit card number, expiration date, name of the card holder, billing address information, and possibly other information. However, the payment information for a bank account might include the bank name, bank account number, bank account owner's name, and a routing number.

Many of the embodiments described below include establishing a communication link or performing some other action upon occurrence of an event such as when the user with the device of the present invention is within a predetermined distance of a point of sale, a vender, a residence, a place for delivery of goods, a place for pick up of goods, or some other location. The communication link may be established by the device or the remote computer system depending on the design of the system and on which system senses the occurrence of the event as will be evident to those skilled in the art. The "predetermined distance" may be any suitable distance for implementation of the embodiment of the invention, is a design choice for the given application, may be different for different venders, different vender types (e.g., hotels versus restaurants), different embodiments and applications of the present invention, points of interest and/or different locations, and may be dependent or based on the strength of the communication signal. In addition, the predetermined distance may be the distance at which a communication link can be established or is established. Thus, the predetermined distance may be different for different user devices, external systems, times, locations, and need not be a fixed distance.

II. Description of the Invention

The present invention is a multi-function communications device 101 that includes conventional mobile phone and personal digital assistant (PDA) capabilities and preferably one or more of the functional modules shown in FIG. 1 such as a communications module 105, a location module 110, a recorder module 115, a data management module 120, an authentication module 125, an image module 130, a commerce module 135, and application modules 140 (e.g., computer programs), such as those described herein, all of which may make use of other modules. As will be discussed in more detail below, each module is comprised of a combination of hardware and software and may share (i.e., may be formed by) hardware and software of other modules as is well known in the art.

The preferred embodiment of the present invention is a portable device 101. The device 101 is preferably handheld, but may also be worn around the neck, on the hip, attached to the arm of the user, or carried in any convenient manner. The preferred embodiment of the present invention includes a central processing unit (CPU) 150, including a processor 155, a memory 160 (including volatile and nonvolatile), and communicates with various input and output devices described below. The software in the preferred embodiment of the present invention includes an operating system, and software for implementing the modules described above and in FIG. 1 and other functions described throughout. The software for implementing the invention is stored in memory such as Read Only Memory (ROM), EPROM (Erasable ROM), EEPROM (Electrically EPROM). In addition, the memory 160, some of which is preferably upgradeable, may be removably detachable memory to allow replacement if and when necessary (e.g., when becoming full). Thus, the memory 160 may also include one or more other types of storage devices such as a SmartMedia® card, a CompactFlash® card, a Memory Stick®, a MultiMediaCard®, a DataPlay disc®, and/or a SecureDigital® card.

The device 101 includes a plurality of user input devices 165 such as a microphone, and actuators (e.g., a QWERTY keyboard). The preferred means of supplying user input to the present invention is through a voice command received by a microphone in a wireless single ear headset. However, other means of supplying the user input, such as manual input means via a touch pad, keyboard, buttons, touch screen, etc. may also be used.

The device 101 also includes a plurality of output devices such as an audio output device 170 (e.g., a speaker phone, stereo headset jack (and headset), earphone jack (and earphone), among others), one or more displays 175, LED(s), a vibrator mechanism, and a programmable ringer (e.g., which rings differently based on the source of a call, on the type of alarm (a page versus a phone call versus an alarm clock ring). The display 175 is preferably a high resolution color display and dynamic touch screen that allows the user to provide manual input for certain functions. The display is also capable of displaying a bar code that is capable of being read by a barcode reader.

The audio output devices, such as the earpiece and headset are preferably wirelessly connected to the device. The earpiece and ear portion of the headset are also preferably molded to the shape of the user's ear from rubber or other pliable material by means well-known in the art.

As discussed above, the device 101 includes the capability of providing conventional mobile telephone functions such as providing a wireless voice communication link, providing a wireless data communication link (for example, for connecting to the Internet, an email server, or other computer system), and includes applications sometimes found in a PDA such as one or more of an email client, a web browser (preferably Internet Explorer®), text messaging software, short message service (SMS) client or Unstructured Supplementary Services Data (USSD) client, an image viewer, an alarm clock, game software, paging software, a calendar, a word processor, a spreadsheet, a database, and a clock (with alarm capabilities). The device 101 also includes one or more of the functional modules (software and possibly hardware) of a voice recorder (preferably forming part of the recorder module 115), an audio media player, an audio/video player (which may also acts as the audio media player), facsimile software (for sending and receiving), an image editor, a terminal service client, a voice recognition module, and a virtual private network client. As will be discussed in more detail below, the specific functional modules and software applications are a design choice based on the external systems, desired functionability, costs, co-existing applications, and other factors. Likewise, depending on the modules and software applications included, embodiments of the present invention may take the form of a laptop or notebook computer, a radio frequency tag, a Smart Card, a PDA, a mobile phone, a computer integrated into another item such as a vehicle, or another suitable configuration.

Preferably the audio/video player is compatible with the open MPEG-4 (Moving Picture Experts Group) standard format and/or the other digital video compression standards (such as MPEG-2 and MPEG-1). More preferably, the player is RealPlayer Media Player®) and can be used to play wav, .avi, .mov, .mpeg, .mp3, .au, and .aiff files. While MPEG is preferred over competing formats, such as Video for Windows®, Indeo® and QuickTime®, one or more of these standards could be used instead of, or in addition to, software for processing video received in the one or more MPEG standards. Preferably, the audio player is an MP3 player.

The operating system of the present invention is preferably Windows XP® or, alternately, PocketPC® (formally known as Windows CE®) or Palm OS®. The power supply for the device 101 is preferably a rechargeable battery unit such as lithium, nickel-cadmium or nickel-metal hydride battery.

Communications Module

As discussed above, the present invention includes a communications module 105, which includes hardware and software to allow the CPU 150 to communicate with external devices and systems. The hardware and software used to implement the communications module 105 will be driven, at least in part, by the input/output devices with which the CPU interfaces as well as the external systems with which the device 101 must communicate (receive data from and/or transmit data to). Preferably, all or part of the communications module 105 is implemented with one or more application specific integrated circuits (ASICs) and software stored in memory.

As discussed, the software used to implement the communications module 105 is determined, at least in part, by the systems with which the device 101 must communicate. In the preferred embodiment, the device 101 is configured to receive and transmit (and store) conventional digital communications, which include mobile telephone communications, and other data communications including Internet data, mobile videophone communications, and to receive digital television signals, and digital radio signals (e.g., XM® radio signals). Preferably the device 101 is configured to operate with a conventional mobile telephone network or wireless wide area network (WWAN), and one or more other wireless local area networks (wireless LAN or WLAN), wireless Metropolitan Area Networks (MAN), and a wireless personal area networks (PAN) (e.g., a Bluetooth® network). The preferred embodiment of the present invention includes hardware and software for communicating with (or through) a mobile telephone network, a WLAN, and a wireless PAN. In addition, the device 101 includes hardware and software for communicating with another device 101 through a two way radio communication link.

In addition, the device 101 may also includes software and hardware for receiving AM, FM and televisions signals. Such analog signals are preferably converted to digital signals at the source, or at an intermediate system, and transmitted to the device 101 as a digital signal through a wireless communication link. At reception, the signals are processed and presented to the user (e.g., via RealPlayer Media Player®) as is well known to those skilled in the art. Thus, the device 101 includes software for formatting, processing, and providing a representation of the signal to the display for presentation to the user. The device 101 may also optionally include an analog signal receiver (e.g., tuner, amplifier, etc.) for receiving and presenting analog radio signals directly.

The device 101 receives the digital signals from a remote receiver (e.g., through a wireless PAN from an automobile or in XM transmission), which provides the signal in digital form to the device 101, for immediate presentation or storage (e.g., as an MP3 file or an MPEG-4 formatted television broadcast). Furthermore, the remote receiver (e.g., in an automobile) may receive and store the data (e.g., in MP3 format) and transmit the stored data to the device 101 upon request by the user.

The following descriptions of various networks, standards, formats and protocols are well-known in the art, are provided as a matter convenience, and are not meant to be interpreted as a limitation on the communications capabilities of a device of the present invention. As discussed, technology for using any mobile phone network, WLAN, or PAN that is suitable for desired application(s) may be used. Communication with the wireless networks is accomplished through access points that receive and transmit wireless signals as is known in the art. Each access point is preferably individually addressable by a computer system (e.g., a client-server computer system)—which may be a vender computer system or facility computer system—with which it communicates data.

Preferably the device 101 includes a short range wireless LAN module (a PAN module) for communicating via a Bluetooth® network. The Bluetooth® wireless specification includes layer and application layer definitions and supports data, voice and content-centric applications. As is known in the art, devices that comply with the Bluetooth® wireless specification operate in the unlicensed, 2.4 GHz radio spectrum ensuring communication compatibility worldwide. The devices use a spread spectrum, frequency hopping, full-duplex signal at up to 1600 hops/sec. The signal hops among 79 frequencies at 1 MHz intervals to give a high degree of interference immunity and up to seven simultaneous connections can established and maintained.

The short range wireless LAN module (e.g., the Bluetooth® module) or PAN module allows the device 101 to wireless communicate with printers, wirelessly exchange payment information, communicate with automobile computer systems, building computers systems, facility computer systems, point of sale (POS) devices, vender computer systems, and with other devices employing the present invention. In addition, the PAN module can be used to communicate across a WLAN or WWAN.

Preferably, the device 101 complies with the Bluetooth® Hands-Free profile and imaging profile specifications. The Hands-Free profile enables hands-free use of mobile phones in automobiles and the imaging profile facilitates transmitting digital images over mobile devices. More specifically, the Hands-Free profile allows automatic establishment of a connection between the automobile's hands-free system and a mobile device the user brings into the automobile. The Imaging profile allows digital images to be shared among mobile devices. For example, a digital camera can share content with a mobile phone, personal computer or other handheld or be sent directly to a printer equipped with Bluetooth® wireless technology.

As is known in the art, Bluetooth® enabled devices include a link controller that identifies other Bluetooth® devices, coordinates a connection with such devices, and facilitates sending and receiving data from such devices. In establishing a connection with another Bluetooth® enabled device (e.g., a printer, computer, another device, etc.) the two devices first exchange a unique global identification code (global ID), which indicates the devices' profiles and capabilities. If the device profiles match, a connection is made. If the device profiles do not match, the devices ignore each other. The profiles include sets of protocols and procedures that define device functionality and identity such as headset, printer, PDA, cell phone, pager, etc.

After two devices establish a connection, one is set as the master and the other becomes a slave. The connection of two or more Bluetooth enabled devices is creates a PAN called a piconet in which all the devices in the same piconet are synchronized to the same hopping scheme determined by the master. As is known in the art, a Bluetooth® piconet can include up to 255 parked slaves (devices that are not actively receiving or sending data), which can be unparked by the master as needed. Devices in range of the piconet, but not connect to the piconet, are referred to as being in a stand by mode.

Bluetooth® compatible devices can be designed to have varying distances of communication capability. Consequently, Bluetooth® access points, which form part of a larger WLAN, a WAN, or other network can be strategically positioned so that communication is limited to devices within a predetermined and/or selected distance and/or direction. The Bluetooth® Specification v.1.1, including the Core Specification (Volume I) and Profile Definitions (Volume II), is hereby incorporated by reference.

As an alternate or in addition to Bluetooth technology, the device 101 may include hardware and software for communicating via the Echnonet standard.

The device 101 preferably also includes a WLAN module for communicating via a wireless local area network (WLAN), which are commonly used for corporate or Internet communications on campuses or enterprises. More preferably, the WLAN module is Wi-Fi (short for wireless fidelity) compatible, which means that is compliant with the IEEE 802.11b specification, which is DSSS—(direct sequence spread spectrum) compatible and has a communication range of approximately 1,000 feet in open areas and 250 to 400 feet in closed areas. Specifications for WLAN in Europe include HiperLAN2 (High Performance Radio LAN), which may alternately be used.

As discussed, the device 101 may also include a WWAN module. WWANs are commonly is used to link cities, states or large enterprises. One common protocol for this type of network is 802.11a. The IEEE (Institute for Electrical and Electronics Engineers) 802.11 standard (802.11, 802.11a, 802.11b, and 802.11b) is hereby incorporated by reference.

Preferably, the device 101 includes hardware and software for communicating with, or through, a third generation (3G) network, which is embodies some, or all, of the in IMT-2000 standard established by the International Telecommunications Union (ITU) or Universal Mobile Telecommunication System (UMTS). The preferred 3G network standard requires support for data packet networking (i.e., packet switched networking) and includes "always on" connection capabilities connection (or in other words an instant connection) and which allows the device 101 to receive incoming transmissions as they are sent. Networks employing at least some of the 3G standard include CDMA-2000 based services (e.g., CDMA 1XRTT, CDMA 2000 1XEV) (CDMA refers to Code-Division Multiple Access), FOMA (Freedom of Mobile Multimedia Access), and Wideband CDMA.

Alternately, or in addition, the device 101 of the present invention is designed to communicate via a two and a half generation (2.5G) network, which is also a packet-switched network and an always on. Common 2.5G networks include General Packet Radio Service (GPRS) and Enhanced. Data for GSM (Global System for Mobile Communications) Evolution (Edge), also referred to as Enhanced Data Rates for Global Evolution and Enhanced Data GSM Environment.

Alternately, or in addition, the device 101 of the present invention is designed to communicate via a second generation (2G) network. Common 2G networks include CDMA, Time-Division Multiple Access (TDMA), and Global System for Mobile Communications (GSM). 2G networks are circuit switched networks and require logging on to the network (i.e., do not have always on capabilities).

Alternately, or in addition to the networks identified above, the device 101 of the present invention is designed to communicate via an analog network often referred to first generation network or 1G network.

The device 101 also preferably includes Wireless Application Protocol (WAP) capability. Depending on the network or systems with which the device 101 is designed to operate, the following steps are performed to connect to the Internet, which are well-known in the art. First, the user opens a. browser (e.g., a minibrowser). The device 101 transmits a query signal searching for service, and in response, a connection is made with the service provider. Next, the user requests a particular web page. The request is sent to a Gateway Server using WAP. The Gateway Server retrieves the information (e.g., the web page) via HTTP from the web server hosting the web page. The Gateway Server encodes the HTTP data as WML (Wireless Markup Language) and transmits the WML-encoded data to the device. The device 101 displays the wireless Internet version of the Web page requested.

As is known to those skilled in the art, WAP is designed to work on any of the existing wireless services, using standards such as Short Message Service (SMS), Circuit Switched Data (CSD), General Packet Radio Service (GPRS), and Unstructured Supplementary Services Data (USSD). Thus, the WAP protocols are designed to operate over a variety of different bearer services, including short message, circuit-switched data, and packet data although the bearers offer differing levels of quality of service with respect to throughput, error rate, and delays. However, the WAP protocols compensate for, or tolerate, these varying levels of service. Since the Wireless Datagram Protocol (WDP) layer provides the convergence between the bearer service and the rest of the WAP stack, the WDP specification lists the bearers that are supported and the techniques used to allow WAP protocols to run over each bearer and is hereby incorporated by reference. It is anticipated that the list of supported bearers will change over time with new bearers being added over time.

The device 101 may include multiple antennas, some of which may be removably attached. In addition and as discussed above, the device 101 may communicate with systems having their own antennas (e.g., via a LAN or PAN) in order to facilitate communications with the desired systems such as those that may be integrated into a vehicle. The communications module 105 of the device 101 also includes a port for wired connection to external devices, which is preferably a USB port. The protocols and other information necessary for communicating with the external systems (i.e., networks) are stored in memory. As discussed above, the device 101 also includes the capability of receiving processed and compressed video (e.g., MPEG-4) and therefore includes the software and hardware for receiving, decompressing, and processing the incoming compressed video for display.

In the preferred embodiment of the present invention, the communication module 105 allows the user to establish and maintain multiple communication links contemporaneously (wired and wireless) such as a wireless voice communication link (e.g., via a 3G network), multiple wireless data communication links (e.g., a wireless LAN and PAN link), and one or more wired links simultaneously. In addition, contemporaneous communication links (such as a voice and data link) with multiple external devices may be accomplished through a single network, such as through the 3G network, 2.5G network or WLAN.

Contemporaneous wireless communication links through the same network may be accomplished by multiplexing of packet data, which is well-known in the art. In addition, information about the incoming data packets sufficient to allow the communication module (or other software) of the device 101 to determine how the incoming data should be processed (e.g., to which module the data should be supplied or to determine how otherwise to process the incoming data) is also supplied to the device. This technique is well-known in the art and the details thereof are, therefore, not provided here. However, this information—the information that allows the communication module to determine how to utilize the data (collectively "utilization information")—may be included in some or all of the packets (e.g., a sub-address), may be determined by the transmission format, data type, communication link, or transmission source, or determined in any suitable manner well-known in the art. In other words, the received data packets are routed by the communications module to the appropriate software and/or hardware such as memory, the headset, the display, an MP3 player, the location module, and/or another application or module based, at least in part, on the utilization information, which may supplied in the packet (e.g., which may simply indicate the source of the data or identify the destination module for the data) or otherwise determined (e.g., from the communication link or format of the received data). Outgoing data is multiplexed and addressed to the respective addresses of the remote devices with which the device 101 is communicating.

Thus, the contemporaneous wireless communication links of the present invention permits the user to participate in a conversation via a voice communication link (e.g., via a 3G, 2.5G, or 2G network) while simultaneously using a data communication link (e.g., via WLAN, PAN, 3G, 2.5G, or 2G network) to receive or send emails, transmit and receive data via the Internet, download audio or video files, upload and download data, or otherwise transmit and/or receive data. Thus, the user can also receive and transmit live audio/visual data—such as live video transmissions (e.g., a video telephone call, receive a television transmission, transmit video camera data), and live audio transmissions (e.g., a telephone call, receive radio transmission, transmit voice data)—while also transmitting and receiving computer data such as emails, word processing files, spreadsheet files, application files, and data to remote computer systems (e.g., such as a web page from a web server) and non-live audio/visual data (previously stored audio data and video data). While the actual reception and transmission of the bits comprising the multiple transmissions may not occur "simultaneously" from a technical perspective, the data from the multiple transmissions is presented to the user and received from the user in the same time periods (or overlapping time periods), which is herein referred to as contemporaneous transmission and/or reception.

The transmission of "live" audio/visual is meant to mean the process of transmitting an audio or video signal immediately, or immediately after processing (which may include storing), after the signal is received at the device 101 (e.g., from a camera, microphone, or from other remote device). The presentation of "live" audio/visual is meant to mean the process of receiving an audio or video broadcast and immediately, or immediately after processing (e.g., after storing), presenting the audio and visual to the user on the audio output device and/or display device. The data that is received live may be transmitted as captured from live events from the source or may be transmitted from a previously stored audio/visual production and transmitted upon request by the user (e.g., a movie transmitted on demand).

The communication module and CPU also cooperate to allow multiple modules to work together. For example, if the user is listening to an audio program via the headset (such as a digital radio program or a MP3 production), the device 101 produces an audible alarm (such a beep) to inform the user that a telephone call is being received, or that another application is requesting the user's attention. Alternately or in addition thereto, and at the selection of the user, a vibratory alarm can be used to inform the user of an incoming telephone call, email, page, or other event.

The communication module may also route certain data to remote devices during live or non-live presentation to the user. For example, a video transmission or computer data (e.g., web pages) received by the device 101 may be routed (e.g., as requested by the user) to a remote display device (e.g., via a wireless PAN to a display in an automobile) that may be large or of better quality than the display of the device. Similarly, audio signals may be transmitted to a remote stereo system (e.g., in an automobile). The data may be processed, such as being compressed and stored for later retrieval, prior to being routed to a remote device.

As discussed, the device 101 of the present invention preferably includes means for communicating via two or more communication networks (e.g., wireless WAN, LAN, and PAN). Thus, when communications with the desired external system may be accomplished by more than one network, the device 101 must determine the available network with which to establish the communication(s). The programmed rules for determining which available network with which to establish a communication (or communications) are stored in memory and based on information of the available networks with which the device 101 is designed to communicate and may also be based on user activity or anticipated user activity. The programmed rules may be designed to provide any desirable result such as increasing efficiency, reducing costs, and/or increasing throughput.

In this example, the determination of the available network with which to establish one more communications is based on one or more of the available bandwidth of each available network (i.e., the amount of data that can be communicated over a given time period), the anticipated bandwidth necessary, the available capacity or relative available capacity (e.g., how full to capacity a network is), the historical (or anticipated) availability of bandwidth (which may include, for example, use, volume, capacity, and/or speed data for days of the week or times of the day), the communication capabilities of the device, the amount of data to be transmitted, and the cost of using each network (e.g., connection time, per amount of data transmitted).

For example, if the available WLAN network has a maximum speed of 50K/sec, an available 3G network will likely have greater available bandwidth. If the user desires to download and watch a movie (which may determined by a user input in response to a prompt or by the user opening an audio/video player for external retrieval of the video file), relatively high bandwidth can be anticipated as being needed. Since the WLAN does not provide enough bandwidth to receive the communication (e.g., movie data file) in a desired manner without buffering, the higher speed network is selected. If both networks have enough available bandwidth, the network is preferably selected based on the costs of use. For example, many Wi-Fi networks are free, while 2G networks have a cost per minute of use. If these two example available networks have enough available bandwidth for the communication, the programming rules determine selection of the Wi-Fi network since it is less expensive to the user. Thus, in this example embodiment the programmed rules will be based on bandwidth availability (anticipated, current), which may be estimated or known (which may be stored as a result of a transmission), and cost.

Prior to communicating with the external system, the device 101 preferably transmits a request for communication via the various networks with which the device 101 is designed to communicate. In addition, communications with some networks (e.g., always on networks) may already be established. Thus, the determination of the available networks with which to establish the desired communication, and information relating to it (e.g., bandwidth data), can be established during the requested communication.

Moreover, the device 101 includes programming for switching communication networks. Thus, when network switching conditions arise, the device 101 establishes a communication with the external device via a second network and preferably terminates the communication established through the first network. Network switching conditions may include one or more of 1) changes in network conditions such as failure of a first network or the first network slowing down (due to high use such as multiple users and/or high levels of data being communicated), such as below a predetermined level (e.g., threshold speed), or increases in noise, 2) the user making a request, or attempting to make the request, to communicate data that is more suitable for communication through a second network (e.g., the user requesting a video file or movie), 3) the anticipated request of the user (e.g., based on the user starting a particular application such as a video player), 4) changes in network availability (e.g., a new network becoming available), 5) changes in conditions of the second network (e.g., more bandwidth or less noise), 6) the available capacity or relative available capacity (e.g., how full to capacity a network is), 7) the communication capabilities of the device, and 8) the historical (or anticipated) availability of bandwidth of network(s) (which may include, for example, use, volume, capacity, and/or speed data for days of the week or times of the day). The device 101 may determine any of the above information itself or receive the information in a transmission from remote computers, which monitor the networks.

In some situations, more than one network may be operated by the same computer system (e.g., of the same service provider). Thus, a multi-network computer system (MNCS) having information relating to more than one network may determine, or assist the device 101 in determining, which network should be used by the device 101 for communications. The MNCS determines the available network with which to the device 101 establishes the communication based on any of data described above, which may be determined itself (e.g., historical data) or received from the device 101 (e.g., based on a user request for a video file). Upon determining the available network with which the device 101 should establish the communication, the MNCS transmits information identifying the network, which is received and used by the device 101 as a basis for determining the network with which the device establishes the communication. Likewise, the MNCS determines whether network switching conditions (described above) arise and initiates the switch by transmitting data requesting a switch (or used by the device 101 determine whether a switch should be completed), which includes data identifying the second network.

As discussed, the programming that controls the operation of the communication module 105 and other modules of the preferred embodiment of the present invention is stored in the memory 160 of the device 101.

Figure 6:
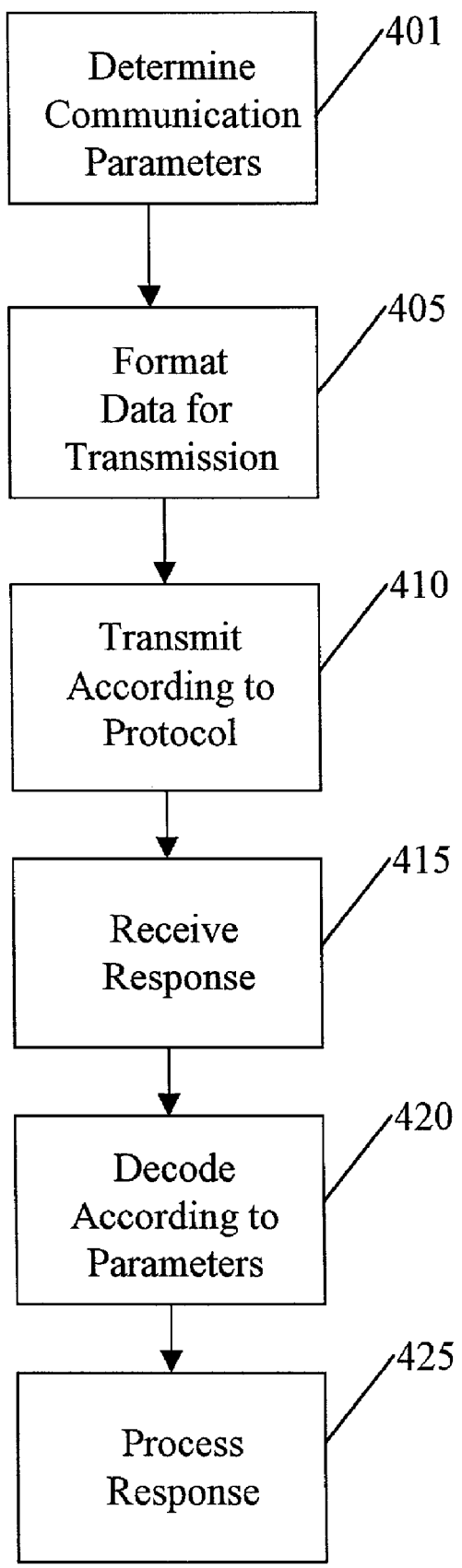
FIG. 6 is a data flow diagram of the method steps for implementing an example embodiment of a system, method, apparatus, and computer program product of the present invention for communication with a remote computer system.

As discussed the communication module facilitates communications, as shown in FIG. 6, by performing the steps of receiving data for communications (not shown), determining communications parameters (e.g., format, protocol, communication network, destination) at step 402, formatting the data for the desired destination at step 405, transmitting the data at step 410. The data is transmitted according to the determined protocol and to the determined destination. The communication module 105 also receives transmissions, which may be responses to device 101 transmissions at step 415. The received data is decoded at step 420, which may include, but is not limited to, unformatting, deformating, transcoding, and/or interpreting (e.g., name value pairs) the received data. At step 425, the decoded data is processed by the communication module or other computer program (e.g., the commerce module, authentication module, or other application module).

In performing these steps and others, the present invention preferably makes use of Web services. As is well-known in the art, a Web services provides a standardized interface that permits software programs in the service provider to communicate with remote programs (e.g., in the device 101). More specifically, a Web service is a software module hosted by a service provider that can be run remotely. In order for it to be available to remote systems, a descriptor of the Web service is published to a service registry. Information about the Web service and how to use it is found in the descriptor. When a service requestor (which in the present invention is a software executing on the device 101 or on behalf of the device) desires to run a Web service, it contacts the service registry. Based on data found in the descriptor, the requestor binds to the service provider and runs the Web service. The directory may also be used to search and identify providers of particular services.

As is well-known, XML is a mark-up language used to define standardized elements of web pages and business documents such as product name, product number, price, and other characteristics (e.g., color, size, etc.) thereby defining what kinds of information each element contains. In the preferred embodiment, the Web service core technologies include UDDI (Universal Description Discovery and Integration), SOAP (Simple Object Access Protocol), and WSDL (Web Services Description Language) and are in XML format. While these technologies and their functionality are known in the art, the following description is provided for convenience. However, the present invention may employ other features available to these technologies not listed here.

As discussed, the service registry of the preferred embodiment is a UDDI implementation and is essentially a catalog of businesses and the web-accessible services they provide. The Web Service Registry provides a mechanism to advertise and find Web Services. The Registry contains categorized information about businesses and the services that they offer and associates those services with technical specifications of the Web service. As discussed, these technical specifications are defined using a descriptor, which in the preferred embodiment is a WSDL document.

WSDL documents describe Web Service function(s), how it communicates, and where it can be found (e.g., an address or destination for communication). In operation, a Web Service requestor (e.g., a device 101) queries the Registry to find the descriptor to determine how to use the Web Service. The UDDI is itself a Web service and the Registry specification defines an Application Program Interface (API) based on SOAP messages with a description of the registry service. Most registries also provide a browser-based human interface. The UDDI Project operates a global public registry called the UDDI Business Registry, which is available to at http://www.uddi.org. Organizations can also set up a private registry to support the requirements of an enterprise or a private community such as for a shopping complex. A private registry can impose additional security controls to protect the integrity of the registry data and to prevent access by unauthorized users. A private registry might contain only private information, it might contain a subset of the public registry information, or it might contain a combination of public and private information.

A UDDI implementation is made up of three different elements. Not all listings in UDDI registries, however, contain all of the elements. The first of the three elements is a "white pages," which contains the basic contact information for each Web service listing. White pages generally includes basic information about the company, as well as how to make contact. Another element is a "yellow pages," which has more details about the company, and includes descriptions of the kind of electronic capabilities the company can offer to users who desire to do business with the company. The yellow pages uses commonly accepted industrial categorization schemes, industry codes, product codes, business identification codes and the like to make it easier for requesters to search through the listings and find exactly what is desired. Third, a UDDI includes a "green pages," which allows the requester to bind to a Web service after it has been found. The green pages include the various interfaces, URL locations, discovery information and similar data required to find and run the Web service.

An "identifier" is a type of property or keyword used to uniquely identify a business or specification in the service registry. Identifiers can be applied to <businessEntity> and <tModel> structures. Identifiers, like categorizations, can be used as part of a search when doing a <find_business> or <find_tModel> request message. Identifiers and categorizations are implemented similarly. Identifiers are attached to <businessEntity> and <tModel> documents through an <identifierBag>structure. The <identifierBag> structure can have one or more <keyedReference> structures that provide the name, value, and <tmodel> UUID reference for locating more information.

Preferably, two general-purpose identifier schemes have been incorporated into all operator nodes, but other schemes can be used as well. The identifier types that are a core part of an operator node include D-U-N-S (tModel name of dnb-com:D-U-N-S) and Thomas (tModel name of thomasregister-com:supplierID). The Dun & Bradstreet® (D-U-N-S) number is a unique nine-digit identification sequence. This sequence provides unique identifiers for single business entities, while linking corporate family structures. This information is available at http://www.d-u-n-s.com. The Thomas Registry® scheme (Thomas) provides identifiers for many thousands of manufacturing and e-commerce companies worldwide. Additional information is available at http://www.thomasregister.com.

tModel documents provide metadata information about a web service specification, categorization specification, or identifier specification. tModel documents are a core data structure in the UDDI specification and represent the most detailed information that a UDDI registry can provide about any specification.

SOAP (Simple Object Access Protocol) includes a communications protocol that facilitates use of the Web services of the preferred embodiment and used to send commands across a communication link (e.g., HTTP internet connection) and includes destination information, content information, and use information. SOAP is used to publish the descriptor into a service registry; to send a service request from a requestor to the registry; to send information from the registry to the requestor; and then to allow the requestor to bind to the service provider and run the Web service.

A message sent via SOAP is in XML format, and is made up of three parts—an envelope, a header and a body. The envelope encapsulates the message header and body, and contains a variety of information required for processing the message, including a description of the kind of data to be found inside the envelope, and information about how that data should be processed. It also contains information about the sender and recipient of the message.

SOAP does not require that a message contain a header, although as a practical matter, messages will include them when SOAP is used in Web services. Information found in headers can perform a variety of functions, such as providing authentication. The data found in headers is organized into header blocks and there can be one or more blocks in a header. The body of the message contains the message data. The data might be a request for information—for example, when a service requestor is searching a service registry for a Web service—or it might be a response to a request for information, such as when the registry sends back a descriptor. The data found in the body is organized into sub-elements and there can be one or more sub-elements in the body.

As discussed, a descriptor document (e.g., WSDL document) is a set of computerized instructions that provide information relating to the functionality of a Web services application and the protocols and formats it uses. WSDL is an XML-based language used to create documents that provide vital information about how the Web services can be located and executed (or run).

In order to run a Web service, a requester first needs to locate the WSDL document that details how to run the services. Once the document is found, it is transmitted to the requester. The descriptor (e.g. WSDL document) is then processed, and based on the information in the received descriptor, a SOAP request (or requests) is transmitted to the Web service provider. That service provider then sends the information requested using the SOAP protocol.

A requester can get a WSDL document in a number of different ways. The document may be located in a searchable, public or private UDDI directory as described above. The WSDL document may also be retrieved from memory and can be transmitted from, requested from, and located in a variety of ways, including via HTTP requests, FTP, and email.

As discussed, a WSDL document describes Web service functionality, details where the service can be located, and then provides specific instructions on how that service can be bound to and run. To accomplish these objectives, a WSDL document includes a number of different important elements. Among the most important ones are "type" and "message" elements, which describe the information to be passed in the Web service. The "type" element is a container for data type definitions using some type system. The "message" element is an abstract, typed definition of the data being communicated and is in essence the information that is going to be exchanged or requested. The "binding" element details how information is going to be passed between the requester and the Web service, and includes information such as the protocol and data format. Bindings may be HTTP, SMTP, MIME or other suitable binding. The "portType" describes the operations that will be supported by the Web service. The "service" details the location of the Web service. Finally, the "operation" element is a description of an action supported by the service. Web services and their use are described, in part, in WSDL 1.1, WC3 Note 15 dated March 2001 and I the Web Service Description Requirements W3C Working Draft dated Apr. 29, 2002, which are hereby incorporated by reference.

Finally, once information regarding a service provider is obtained, the device 101 preferably stores the information for repeat use (either locally or on a remote storage device for retrieval as needed by the device). Specifically, the device 101 stores the list of service providers and their associated data, including the information retrieved from the registry such as the descriptor document (WSDL document), which includes the format and protocol used by the service provider.

As is known in the art, communication devices include numerous layers that cooperate to facilitate the communication with each layer performing a different function. For example, the physical layer, which is layer 1 of the Open Systems Interconnection (OSI) networking model relates to the mechanical, electrical and functional aspects of connections in a communications medium. Other layers include the data link layer, the network layer, the transport layer, the session layer, the presentation layer, and the application layer. Control and data is passed from one layer to the next. As is known in the art, a communication may begin with the application layer on one end (for example, a user opening an application and typing a request). However, in the present invention, the programming of the present invention may initiate the communications as will be evident by the description of the application program below. Thus, the programming of the present invention, which, for example, receives user inputs and transmits data to remote devices, takes actions based on location and/or triggering events, and performs other functions is preferably designed to execute largely in the application layer as will be evident to those skilled in the art.

Preferably, the communication module 105 allows for dynamic adjustment of bit rate, protocol, and format to accommodate communications with different types devices and changing network conditions. In the preferred embodiment, an encryption module is included to encrypt and decrypt data before transmission and after reception for systems employing encrypted transmissions and/or when the application being serviced does not provide encryption. The device 101 supports data protection and user authentication using the Extensible Authentication Protocol—Tunneled Transport Layer Security (EAP-TTLS) protocol, which only requires a password from the end user for authentication, for communicating with external systems supporting the protocol.

Location Module

The location module includes hardware and software to determine the location of the device. Depending on the implementation of the present invention, the location module may determine the absolute and/or relative location of the device. The absolute location may be determined by using a global position satellite (GPS) receiver that is integrated into the device, which can be used to determine the approximate longitude and latitude of the device. Another method of determining the absolute location is through the use of a network-based position-location system, which may use, for example, triangulation from cell towers to locate the device. Network-based location systems are manufactured by TruePosition Inc. in King of Prussia, Pa., or Forest, Va.—based Grayson Wireless, a division of Allen Telecom Inc. in Beechwood, Ohio. Thus, the location data may be transmitted to the device 101 from an external system (e.g., a network-based position location system) capable of determining its location.

Absolute location data may also be transmitted from a nearby device (e.g., an airplane, a bus, an automobile, a ship, etc.), which itself has a means for determining its absolute location or transmitted from a nearby device that is fixed in location and that has absolute location data pre-stored therein (e.g., via WLAN from an access point in a billboard, a road side sign, a vender, etc.). In addition, data in periodic transmissions or in a single transmission from a fixed device could be used with velocity data supplied by a vehicle to determine an accurate and substantially continuous (up to date) absolute location of a device carried in the moving vehicle.

The location data may be used with map data stored in memory of the device 101, or stored in a computer system with which the device 101 communicates (such as in a vehicle computer system or remote computer) to provide a real world location (e.g., a street, intersection, address, complex, or business) as is well-known in the art.

The relative location refers to the location of the device 101 relative to another point of interest such as the distance (or in some applications the time) from a particular point of interest. For example, in some embodiments, in may be necessary to find the closest vender of a given product. In doing so, the relative location of the device 101 from each vender is compared to find the closest vender. The relative location to a point of interest may be determined from the absolute locations of the device 101 and the point of interest. In addition, in some applications the cumulative distance of the thoroughfares (streets, roads, highways, etc.) between the device 101 and the point of interest may be determined and used to determine the relative location of the device 101 with respect to the point of interest. In other embodiments, a communication link with a particular access point (or a plurality of access points) may provide relative location data (e.g., that the device 101 is in a room, facility, parking lot, vender store location, or other area) to the device 101 or an external computer system.

The relative location may also be determined from data transmitted from nearby devices (e.g., via WLAN from an access point in a billboard, a road side sign, a vender, etc.) that includes information of the relative location of the nearby device. For example, the nearby device (e.g., a billboard with a wireless transceiver therein) may transmit information to the device to indicate that the device is at, or within, a predetermined distance of a particular point of interest (e.g., a vender). Alternately, the nearby device may transmit the distances from the nearby device to a plurality of points of interests when the communication link with the device 101 is established. In addition, data in periodic or a single transmission from a fixed device could be used with velocity data supplied by a vehicle to determine an accurate and up to date relative location.

Preferably, the location module includes a GPS receiver with mapping software. In addition, relative location data is determined from the device's 101 communications with access points that form part of a WLAN. However, any suitable means of determining an absolute or relative location that is suitable for the embodiment or an application may be used.

Authentication Module

The authentication module 125 authenticates the user (or in some instances the user's device) through the use of authenticating data. Authentication may be used to confirm the identity of the person carrying the device, to prevent the unauthorized use of the device, and to authenticate the creation, use, transmission, or storage of data at the device 101 of the present invention or at a remote device. The authenticating data may include, but is not limited to, a password, pin number, voice data, face data, iris data, and/or finger print data that may be stored in the device 101 and/or at a remote computer system used to authenticate the user.

The determination as to whether authenticating data is necessary to perform a given action is determined by the remote system with which the action is to be performed (e.g., a purchase made, data stored, information provided) and/or by the programming in the device 101 when predetermined actions are requested (e.g., to make a purchase). For example, authentication may only be necessary when purchases are sufficiently large or other security measures warrant it.

Authentication may be performed in numerous manners, is largely a design choice and its implementation will vary depending on the application, available data, available hardware, the external systems, and costs. For example, in one embodiment, no authentication is necessary when making a small purchase. When making a purchase above a predetermined price threshold (e.g., $500), a first level of authentication may be required such as entering a pin number or password into the device 101 (much like a debit card), which may be transmitted to a third party computer network for validation thereby providing authenticating data to the external system. In addition, the device 101 may request authenticating information from the user in certain circumstance and include programming that does not permit certain activities (e.g., commercial transactions) unless the user enters a valid password (either at power up or upon requesting a commercial transaction). In addition, confirmation that the user has entered a password to facilitate the commercial transaction (i.e., provided authenticating data to the device) may optionally be transmitted to a vender computer system or other remote computer system during the transaction to give the vender additional confidence of the user's authority to use the device 101 and its payment means.

Other means of authentication may include recognizing the user's voice (which is compared to a stored voice), receiving a finger print input at the image module which is compared to stored finger print data, and receiving data of an image of the face or iris of the user at a video input, which is compared to stored data of the same.

Alternately, the user may have an rf tag in the form of an integrated circuit implanted under the skin (or otherwise attached to the person), which contains user identifying information, such as, or similar to, the Verichip® manufactured by Applied Digital Solutions of Palm Beach, Fla. This rf tag can be pinged (transmit an rf signal to) to determine the identity of the user by the device 101 or by a remote system within range of the user. The identification information is transmitted from the rf tag, received by pinging device (or other device), compared with the information associated with the user (which may be supplied to a remote computer system by the device 101 or already present in memory of the remote computer system) to confirm the user's identity or to determine his or her identity.

Input of authentication data may be required at power up or at the request by the user to enter into a commercial transaction or to otherwise use the device 101 in a fashion that has been determined to require an authentication input.

In addition, the authentication data may be stored in memory and retrieved for transmission to a remote computer that determines whether the user's voice, face, iris, finger print, or other input matches the data stored in memory. In addition, transmission of the authentication data of the user's voice, face, iris, fingerprint retrieved from memory may require input of a password or pin number. Upon receipt of the authentication data, validation data is transmitted to the vender, the financial institution issuing payment at the request of the user, or other computer system from the remote computer system performing the validation. Thus, a thief or unauthorized user would have to store new authenticating data (their own data) in memory in order to operate the device. Preferably the new data can only be stored, however, if the necessary authentication input (i.e., voice, iris, face, finger print, or other input) is inputted to permit overwriting the old data or the addition of new data for a new user. In addition, some applications may require that the user transmit a live authenticating image or video data (as opposed to being transmitted from stored data). Live data is transmitted along with data sufficient to confirm that the data is not a transmission of a recording, such as information of the time of day and/or date, data supplied by an external system, location data, and/or other data.

In applications where greater security is needed, a third party computer system (or the computer system of the vender) can store the authentication data (voice, iris, face, finger print, or other data) and compare the data from the user received from a vender input device (e.g., a scanner) with the stored data to authenticate the user. When a valid comparison is made, the third party computer system transmits validation data indicating the authority of the user to perform the requested action (e.g., confirming the user's identity) or information indicating that the person is not authorized to perform the desired action.

In addition or alternately, an image of the user can be stored in the device 101 and displayed on the display of the device 101 to the vender or entry control personnel who can then compare the stored picture with the face of the user. The picture (or other data such as voice, iris, or finger print data) stored in the device 101 can also be compared to a picture (or other data such as voice, iris, or finger print data) stored by the vender (or by the entry control computer system) and/or compared to an identification document (e.g., a passport or driver's license) carried by the user.

In addition, the authentication module includes programming for authenticating a data file at its creation, receipt, modification, transmission, and/or some other operation on the data file. Prior to use, the user supplies authenticating data to the device 101 (e.g., logging in with a password). After (or during) the operation on the data file, the programming embeds, or otherwise attaches or associates, information based on the authenticated data in the data file. For example, prior to creating a text file, modifying a file, upon receiving a file, taking a digital picture, transmitting a file or performing some other action on a file, the user inputs a username and/or password (or supplies other authenticating information as described above) to the device 101 that confirms, or is used to determine, the identity of the user. When the user creates a text file, modifies a file, receives the file, takes a digital picture, (all of which require storing the new version of the file), transmits a file or performs some other operation on a file, the program embeds (or otherwise associates or attaches) information sufficient to identify the user performing the operation when storing the file.

An authorized user may select which data files to include authenticating data and can program the device 101 to include it for all, or select, operations performed by users who are not the authorized user (e.g., a child or employee). In addition, the device 101 can embed (or otherwise associate or attach) information sufficient to identify the device. In addition, other information such as the time and/or location data (e.g., received from the location module or otherwise supplied) may be embedded in (or otherwise associated with or attached to) the data file at creation, modification, receipt, transmission or some other operation on the file when the file is saved.

Thus, this feature can allow a person such as a police officer to take a digital photograph of a crime or accident scene, embed (or otherwise associate or attach) information of the location, time, and/or identity of the person taking the photograph in the digital file, wirelessly transmit the file to a remote computer system for storage and use as evidence. The methods of embedding, associating, and attaching a subset of data in, with, and to a data file are well known in the art. Those skilled in the art will recognize that the method, protocol or format for embedding, associating, and attaching the information sufficient to identify the user, device, location, and/or time may be any method which permits the data to used, extracted, read, or otherwise interpreted at a subsequent point in time and that limits the ability of users to alter the embedded or otherwise attached data.

Recorder Module

The recorder module 115 of the device 101 also includes the features normally associated with a conventional voice recorder such as voice recording and voice playback. The recorder module 115 may also be used to record data being received or transmitted through the communications module 105, produced by an output device such as the display 175 or audio output device 170, and received from any input device 165. Thus, the recorder module 115 can also record data being received for and/or produced at the audio output device and can be used to record both sides a telephone call conversation and to record music that is being received and/or played live (for example, digital radio). In addition, the recorder module 115 may also be used to store video data received and/or transmitted such as a video telephone communications and digital television transmissions. For video telephone communications, the device 101 can record either or both sides of the conversation (both the incoming and outgoing transmissions).

In the preferred embodiment, all data supplied to the audio output device, input device, and display, is stored in volatile memory (e.g., RAM). If the user has elected to record the data, the software implementing the recorder module simply does not overwrite the stored data in volatile memory until the data is moved to nonvolatile memory (e.g., EEPROM). The data can then later be retrieved for audible and/or visual reproduction, converted to text using well-known voice recognition software (in the case of stored voice data), or transmitted to a remote computer for processing (such as being converted to text, indexing) and storage.

The recorder module 115 may be used to store voice annotations for computer data such as a computer file. For example, the user may wish to store a voice annotation for a scanned document such as the spoken words, "Vehicle Registration," which are received at the device's 101 microphone. The voice annotation and document are stored in manner that allows the user to retrieve the annotation alone, with the document, or the document without the annotation. For example, a header of the computer data file may include information identifying all of the voice annotations for the computer data. Thus, when the user retrieves the computer data file, the voice annotations are automatically identified to the user who may select the annotations for audible production. Alternately, they may be automatically produced to the user at retrieval of the computer file or upon some other action. Any suitable scheme for storing the computer data and associated voice annotations may be used. As another example, a file directory may include a list of each computer data file, each voice annotation, and information for identifying the association of each computer data file with its voice annotation(s).

One or more voice annotations may be stored for each page of data in a computer data file. The voice annotation may be attached to any portion or portions of a computer data file such as an image file, an audio file, a video file, a word processing file, a spreadsheet file, address book entry or file, an image within a composite file, or other application data file.

Finally, the recorded voice data can be processed for use as file storage data. For example, the voice data may be converted to text and used as the file name of the computer data file for storage of the computer data. Thus, after the user creates a file, for example by taking a digital a photograph, a digital video, or recording an audio file, the user can input voice data that is used as the filename for storing the created file and also used to determine the destination for storing the data file.

Image Module

The image module 130 includes the hardware and software used to receive and process image data, which may include digital photographs, bar codes, text, and other image data. The image module 130 preferably includes a digital camera that functions to capture still photographs and video data (i.e., motion video). The image module 130 also includes software for converting received image data (e.g., received as an image when the digital camera acts as a copier by photographing text) to text, which is preferably conventional optical character recognition (OCR) software. The image module 130 may optionally also include a conventional scanner and/or bar code reader, which are well known in the art. Other image input devices may be included instead of, or in addition to, the above image input devices such as an infrared transmitter and/or receiver as is deemed appropriate for the embodiment. Finally, the image module 130 may also optionally include hardware and software for receiving and processing fingerprint, iris, or face data used for authenticating the user (e.g., a fingerprint scanner).

The hardware portion of the image module 130 may be detachable or, in some embodiments, may be disposed remotely such as in an automobile and in communication with the handheld portion of the device.

As discussed, the image module 130 allows the user to scan text, bar codes, or other markings or indicia for storage in the device. The data can then be processed according to instructions or other information found in the scanned image or according to a user input. For example, the user could scan a web address and say "connect" to provide a voice command that instructs the device 101 to provide a data communication link to the scanned web site. Alternately, the user can scan a product name or number and input a command (by saying "purchase") to purchase the product. In response, the device 101 retrieves payment information, user information and an address (e.g., web address) of a vender for such products from memory, service registry or other source and transmits the product information, user information, and payment information to the vender to purchase the product.

When the image input device of the present invention is used to capture the image of text (e.g., a document), the data may be wireless transmitted to a printing device thereby effectively acting as a wireless copying system. Thus, the user need not carry each document to a copier for copying but can simply retrieve the copied pages. Multiple devices may transmit the data to the printing device, which, after processing (e.g., normalizing), queues the data for printing like a conventional printer or fax printer. Instead of a handheld device, another embodiment implementing this application of the present invention may be a desktop device that captures the image and transmits it wirelessly (or via wire) to a remote printing device.

The captured images may also be transmitted to a remote computer system for processing such as converting images to text via OCR software, and subsequently printing the data. As discussed above, the user may also annotate the image data with a voice annotation.

Commerce Module

The commerce module 135 facilitates commercial transactions and in particular, performs the steps of exchanging payment information, receiving acknowledgement of satisfactory completion of the transaction, providing an indication of the satisfactory or unsatisfactory completion of the transaction to the user, and processing and storing information resulting from the transaction (e.g., a hotel room number, a ticket number, etc.).

In performing the above steps, the commerce module 135 manages the means for making payment. The commerce module 135 stores data payment information supplied by the user or received from an external source in memory 160 in different categories. In particular, the commerce module 135 stores various categories of information for making a purchase such as credit card data, bank account data, debit card data, telephone account data, email account data, ISP account data, brokerage account data, and/or other data. Each category includes numerous payment account records. For example, data stored in memory 160 for one category includes the credit card number, expiration date, billing address, and credit card holder's name for four different credit cards (a gas card, a MasterCard®, and a Visa® card, and an American Express® card). Likewise, the memory may additionally hold data for two bank accounts (a second category) and two ISP accounts (a third category).

In many of the applications of the present invention, a request to purchase a product is transmitted to a remote computer system. The product request data transmitted is electronically formatted in a manner suitable for the system receiving the request. The format of the request data may be may be received from the vender near the beginning of the transaction, may be retrieved from memory (which was received and stored during a previous transaction with the vender), may be retrieved from memory after being selected by the user, may be selected as a format that is likely to be acceptable for that type of vender, may be supplied by the user, and/or may be retrieved from a database (which may or may not be in the device) such as a service registry or directory that includes formats for the particular vender, the particular type of vender (e.g., a restaurant), the particular product (e.g., an airline ticket from a particular airline), the particular type of product (e.g., food), and/or the location of the vender (e.g., the country).

As discussed, the commerce module 135 exchanges payment data to facilitate payment of the product. In doing so, the commerce module selects a payment account that is acceptable to the vender. Data indicating the types of payment accounts that are acceptable to the vender may be received from the vender near the beginning of the transaction, may be retrieved from memory (which was received and stored during a previous transaction with the vender), may be retrieved from memory after being selected by the user, may be selected as a payment account that is likely to be acceptable for that type of vender, may be supplied by the user, and/or may be retrieved from a database, a service registry, or other source that includes data of acceptable payment accounts for the particular vender, the particular type of vender (e.g., a restaurant), the particular product (e.g., an airline ticket from a particular airline), the particular type of product (e.g., food), and/or the location of the vender (e.g., the country).

In addition, the commerce module 135 preferably selects the payment account in an intelligent manner and that is the most financially advantageous selection for the user such as, for example, selecting the credit card with the lowest interest rate. In addition, the commerce module 135 preferably selects the payment account based on 1) whether the purchase is for business or personal purposes (which may be determined by user input or based on the identity of the vender); 2) whether the assets or credit is available to make the purchase; and/or 3) according to predetermined user preferences supplied by the user.

The commerce module 135 also formats the payment information data in a manner that is appropriate for the receiving computer system. For example, when communicating with an Internet site, credit card data may be included as the values in the variable value pairs for the credit card number, expiration date, name, etc. Other systems may require the data be received in a different format. The format of the payment data is preferably retrieved from memory, (which was received and stored during a previous transaction with the vender), may be provided to the device 101 during the transaction, and/or may be retrieved from a database (e.g., which may or may not be in the device) that includes format data for the particular vender, the particular type of vender (e.g., an internet web site), the particular product (e.g., an airline ticket from a particular airline), the particular type of product (e.g., food), and/or the location of the vender (e.g., the country), and/or may be supplied through the use of Web services. As discussed above, the descriptor found in a service registry may be requested and received to provide the format and protocol data and services data for a particular service provider.

Next, the payment information is transmitted to the desired destination. If requested or necessary for the system, an acknowledgement, confirmation, or other data may be transmitted by the remote system and received by the device 101 according to the protocol of the external system. The device 101 receives the acknowledgement or confirmation of satisfactory completion of the transaction and provides the user with a visual and/or audible indication of the success of the transaction. For example, upon completion of the satisfactory exchange of payment information with a hotel vender, the device 101 audibly produces and displays the words "Check in to hotel complete. Entry code for room 1524 is 123456." Alternately or in addition, the device 101 transmits the indication to the automobile in which the user is riding for display on the vehicle's heads up display. Information indicating the success or failure of the transaction, as well as information resulting from the transaction (e.g., an entry code, an e-book, information for boarding transportation) is also stored in the memory of the device 101 for later retrieval and use.

In one example embodiment, when the commerce module 135 executes a commercial transaction, payment information is transmitted to a remote computer system (e.g., the vender's computer system). The remote computer system transmits this information as part of a transaction request to the user's account institution card (e.g., the user's bank) or an acquirer (e.g., in the case of a credit card). As is known in the art, an acquirer is an organization that collects credit-authentication requests from merchants and provides the merchants with a payment guarantee. If the request is to a bank account (or similar account), the remote computer system receives an approval code, which authorizes the transaction, and an electronic fund transfer is performed to a designated account (e.g., a vender's account or the user's account in the case of a cash withdrawal). Alternately, if approved for a purchase (e.g., in the case of a credit card transaction), the remote computer system receives an approval code and an ACH (automated clearing house) transfer of funds is performed to the vender's bank account, typically on the next business day.

Data Management Module

The data management module 120 performs various administrative tasks including memory management, perform memory back-ups, and defragment memory. Because the device 101 is portable, and preferably carried on the user's body, it is preferable to keep the size of the device 101 relatively small. As a result, there is limited space for components including memory. The data management module manages the data to make optimal use of the available memory and to reduce the likelihood that other modules and applications do not run out of memory. For example, the storage of video is a relatively memory intensive task and will, therefore, use up large amounts memory and use memory more quickly that other tasks (such as, for example, storing a typical text file).

To ensure that memory is available to modules and applications, the data management module transmits data stored in the device 101—or being stored in the device 101—to a remote storage device. The remote storage device might be a third party remote computer, the user's home computer, a storage device in the user's automobile, the automobile of another person the user is riding, a mass transmit vehicle (airplane, bus, etc.), and/or a separate storage device carried by the user.

The data management module is preferably implemented to begin storing data remotely when the remaining available (unused) memory reaches a minimum threshold, such as when, for example, only twenty percent of the memory or one gigabyte remains available. When the minimum threshold is available, the device 101 selects the data to be stored remotely. The selection may be based on a number of factors including the size of the data file. Transmitting larger data files reduces the number of files that need be transmitted. In addition, the activity of the data is another factor. For example, it may be undesirable to remotely store a file that the user accesses often or has recently accessed (e.g., a text file) or that an application or module accesses often or has recently accessed (e.g., an address book data file). Thus, the length of time since the data has been used is another factor for determining whether it should be stored remotely. In addition, the data management will also transmit data for remote storage according to predetermined data storage criteria. For example, the user and/or manufacturer of the device 101 may store data storage rules that are based on the type of the data. One example of a data storage rule is to always remotely store video data not accessed within the past seven days before any other type of data. When no such video data is present in memory, these example rules then dictate that the data management module remotely store audio data not accessed with the past seven days before any other type of remaining data. In addition, the user or manufacture can designate select data for storage locally. In summary, what data is stored is dependent on data storage rules that may be user or manufactured stored rules and based on data type, the source of the data, the location of the user, the time of day, the day of the week, the purpose of the data, the activity of the data, and/or other factors. The rules may also be received and stored from a third party or remote source.

The data management module 120 also manages where the data is to be remotely stored. For example, some data (e.g., word processing files) might be stored at the user's work computer system, while MP3 files are stored on the user's home entertainment system, or the user's automobile computer system. Thus, where the data management module 120 stores the data is also dependent on data storage rules that may include user or manufactured stored rules based on data type, the location of the user, the direction the user is going, anticipation that the user will be at location at a later time (e.g., that the user will be out of transmission range a few minutes hence), recent activities of the user, an external event (e.g., turning off the automobile engine), the intended destination of the user, the source of the data, the time of day, the day of the week, the purpose of the data, and/or other factors.

Preferably, the data management module 120 works transparently to ensure memory is available. However, if data storage rules are not present or are ambiguous to the data type or situation, or in other circumstances, the data management module 120 may prompt the user to provide an input indicating whether (or what) data should be remotely stored and/or where the data should be stored. The data is stored and retrieved in a conventional manner, such as a manner used by a server or other storage device for use by multiple users, and the mechanics of the data storage and retrieval are therefore not repeated here.

If the user elects to retrieve the remotely stored data, the device 101 will automatically establish a communication link by means determined by the data management module 120 (if necessary), and transmit a request to the remote storage device that identifies the file as is well known in the art.

The data management module 120 may establish a first type of communication link to store data and a second type of communication link to retrieve data. For example, when the user is in the automobile and the data management module 120 determines that remote storage is necessary, the data management module 120 can establish a wireless PAN link to store data in the automobile (e.g., of the bus the user is riding, or in the user's automobile) and stores information for communicating with the automobile (e.g., a network address or telephone number) locally. Later, when the user wishes to retrieve the data, the data management module 120 retrieves information for communicating with the automobile from memory, establishes a wireless data link (e.g., by calling the telephone number of the computer system of the automobile or bus), and retrieves the data.

It also intended that the remote computer system receiving the data have a data management module of its own to manage memory, perform back ups, defragment memory, and perform other management tasks.

There may also be circumstances in which the device 101 cannot establish a communication link with a primary remote storage system because the device 101 is physically located out of transmission range, due to interference, a component failure, transmission restrictions, or other reason. Such circumstances may occur, for example, when the user is on an airplane, a subway, or at sea. If the device 101 cannot establish a communication link with a primary remote storage device, the device 101 identifies a secondary storage device. Identification may be accomplished by retrieving the necessary information from a database, by transmitting a request for an acknowledgement from any available storage devices, by entering an area serviced by the storage device (e.g., which transmits its storage device information upon entering the area or intercepting transmission from the device), by transmitting a request to a network server or master, or any other suitable means.

Once the secondary storage device is identified and a communication link established, the device 101 remotely stores data in the secondary remote storage device according to the techniques previously described. In addition, the device 101 may transmit data (which might include a telephone number, an internet address, a network address and ID, and/or other data) that is sufficient to allow the secondary storage device to transmit the stored data to another remote storage device, which is preferably the primary storage device. The data transmitted to the secondary storage device may also include data of instructions to transmit the stored data to the primary storage device immediately, after a time delay, or after occurrence of an event (e.g., when the secondary remote storage device is able to establish a communication with the primary remote storage device). Alternately, the secondary storage device includes preprogrammed instructions relating to when and how the data should be transmitted to the primary storage device. In addition, the device 101 transmits user (or device) information (e.g., a telephone number) that is stored by the secondary storage device and associated with the stored data. The user or (device information) is used by the secondary storage device to identify and retrieve the data if, and when, the user transmits a request to retrieve the data and/or to store the data on the primary remote storage device.

The data management module also participates in the synchronization of multiple remote storage devices and the device. For example, periodically, or upon request by the user, the memory of the user's home computer system, home entertainment system (e.g., storing video and audio files), work computer system, automobile(s) computer system, and/or device may be synchronized so that they all the devices, or some subset of the devices, include all the same data files or include all of a subset of the data files (e.g., word processing file, video files, calendar data, address book data, audio files, etc.). The subset may be selected by the user in response to a prompt or retrieved from memory (e.g., according to the user's selections stored in the user profile).

In addition to the above tasks, the data management module also manages the memory 160 locally determining where data should be stored. In addition to the conventional memory management processes, the data management module also stores data locally according stored storage criteria that, for example, is based on data types and the types of memory available locally. For example, certain types of memory such as a SmartMedia® card, a CompactFlash® card, a Memory Stick®, a MultiMediaCard®, a DataPlay disc®, or a SecureDigital® card, is designated by the storage criteria for storage of video data. Preferably, any type of removable memory is designated for storage of video data or another particular data type (or vice versa) and the data management module prompts the user to replace the removable memory when the existing removable memory is full or nearing full capacity. In response to the prompt, the user replaces the removable memory. In addition, prior to a prompt, or in response thereto, the user may indicate that the device 101 should download the data in the removable memory device to a particular remote storage device (e.g., when full or nearing full capacity).

Application Modules

As discussed, the preferred embodiment of the present invention includes numerous applications. However, the decision to include or not include a particular application module is a design choice. Likewise, the following example embodiments, and their functionality, is not intended to limit the scope of the present invention, which will operate with numerous other application modules. Furthermore, the applications, the functions that are intended to be provided, and the systems with which the device 101 is intended to operate/communicate are some of the factors that will determine the composition of the hardware and software for a given embodiment of the present invention. Thus, various embodiments of the present invention may include different hardware and software configurations depending on costs, the functions provided, and the systems with which the device 101 is intended to operate/communicate as will be evident to one skilled in the art. Finally, steps disclosed in a given example may be used with other applications illustrated by other example applications in which the steps are not specifically disclosed as will be evident to those skilled in the art.

The modules and other applications described herein often require communicating with external computer systems. One method of communicating with the external system is shown in FIG. 6 and includes the steps of determining the format, protocol, medium for communicating and/or other communication parameters for communicating with external computer system at step 401. Next, the data, which may be a request, a command, an informational transmission, or other transmission, is then formatted for the external system according to the communication parameters at step 405. At step 410, the formatted transmission is transmitted over the transmission medium, and according to the protocol and other communication parameters for the external system. In many instances, the device 101 may receive the initial communication transmission or receive a response from the external system as shown at step 415. At step 420, the incoming transmission is stored and decoded. The decoding includes any processing that is used to convert or change the received data to a form that is usable by, or to provide data for, another application. For example, the decoding may include parsing and storing name value pairs, decompressing the incoming data, decrypting the incoming data, transcoding the incoming data, removing headers and trailers, decimating the incoming data, extrapolating the incoming data, parsing the incoming data, storing data in data structure(s), and/or any other processing that prepares the incoming data for use by another application. Finally, at step 425 the decoded data is provided to another application for processing such as audibly and/or visual production, sorting, removing duplicate data, performing location related processing (e.g., determining the closest), identifying a vender with which to engage in a commercial transaction or transmit a request to, and/or other processing by commercially available software applications or applications described herein.

Points of Interest

The device 101 of the present invention allows the user to find a point of interest based on its location and, if desired, other characteristics. One example application employing this capability is for determining the point of interest within an area that is closest and which, if desired, also meets other selection criteria.

Figure 4:
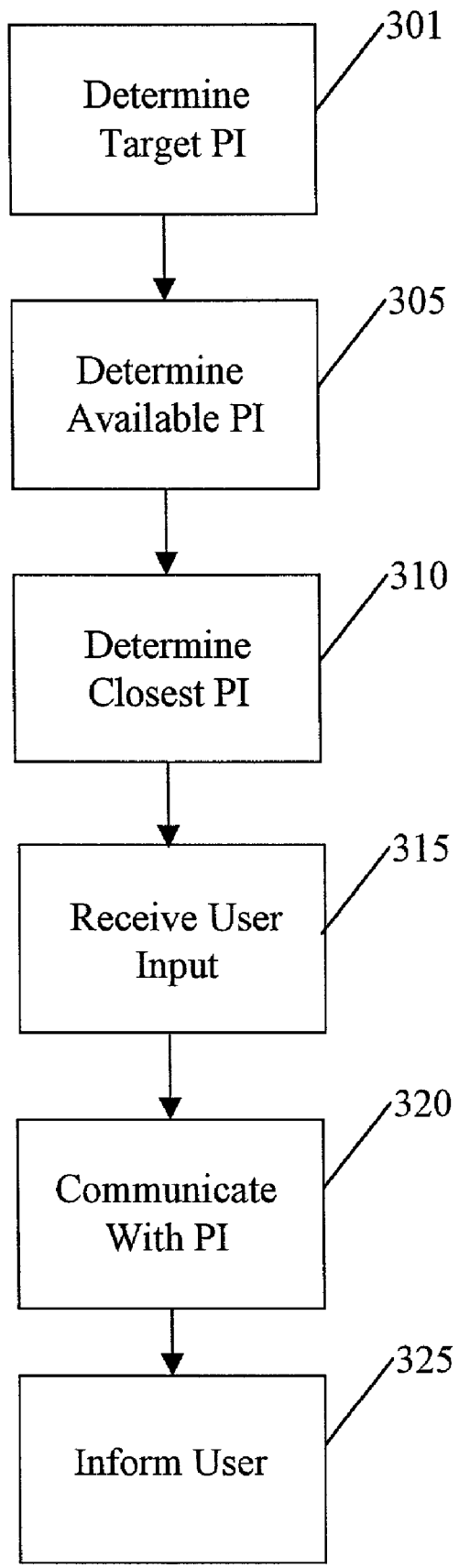
FIG. 4 is a data flow diagram of the method steps for implementing an example embodiment of a system, method, apparatus, and computer program product of the present invention for determining the closest point of interest.

Steps for performing this example application are shown in FIG. 4 and include determining a target point of interest (PI) at step 301, determining the available PIs at step 305, determining the closest PI at step 310. In this example, the application also optionally includes the steps of receiving a user input at step 315, communicating with the PI (e.g., based on the user input) at step 320, and informing the user of the results of the communication at step 325.

In addition, after determining the point of interest (in any of the applications), the device 101 can optionally enter into a commercial exchange on behalf of the user, for example, to purchase a product (e.g., step 320).

The device 101 determines the closest point of interest in response to a user request, at a particular time, day, and/or date, in response to a user action (e.g., purchasing a product), in response to the occurrence of an event (e.g., a flat tire, entering a particular area such as a city or hotel lobby, or fuel levels reaching a predetermined depletion threshold) that may or may not be sensed by the device, data stored in memory, at predetermined time intervals, and/or according or based on other parameters or events.

The criteria for the point of interest can include any desirable, and/or exclude any undesirable, characteristic. For example, the point of interest could be a vender for a particular product (e.g., a vender for tires); type of vender (e.g., a gas station or restaurant), subcategory of a vender (e.g., a fast food restaurant); vender with a particular product in stock or available (e.g., automobile part vender with a particular part available,), a restaurant with no wait for a table, or a particular vender (e.g., McDonalds®). In addition, the determination of the point of interest in some instances may include minimal selection criteria. For example, the point of interest could simply be determining the closest a public place (e.g., a restroom or park), identifying all the shopping complexes in the given area, or any other place of interest. The "area" may be any area such as a city, county, state, or facility.

In addition, the device 101 can also determine the closest point of interest to another location (e.g., the user's destination) or set of locations (which, for example, includes the user's intended travel route. Thus, for example, the device 101 can determine the closest shopping complex and the closest McDonalds® restaurant to the shopping complex.

Data presented to the user (e.g., via the display) as a result of the determination may include simply the determined point of interest, a list of determined points of interest, a list with distances to each, a list with travel times to each or other data, and/or any other desirable data.

At step 301, the data of the target point of interest is determined and may be supplied by the user or retrieved from memory based on the circumstances (e.g., location or triggering activity), a product, data present in the user profile, and/or other input. For example, upon sensing that fuel levels have reached a predetermined depletion level, the device 101 determines the closest gas station, which is a type of vender retrieved from memory. Alternately, if the user has entered his or her desire to purchase fuel only from select fuel venders such as Mobil® and Shell® (information of which is stored in the user profile), the device 101 determines the closest of these venders. Likewise, upon receiving a user input of a request (or at a particular time of the day), the device 101 determines the nearest restaurant (type of vender), fast food restaurant (sub-category of vender), or McDonalds® (particular vender) according to the user's preferences (i.e., a user input or user profile).

Determining the closest point of interest in the preferred embodiment is accomplished by retrieving data of the available points of interest in the given area from a database at step 305. The database may be stored locally (in the device) or remotely (e.g., in an automobile, a web server, at the user's home, etc.) and may, for example be a service registry, a business listing (e.g., an electronic Yellow Pages), a Web site, or other database. The initial determination is preferably limited to a predetermined area or smaller space and may be a search for points of interest having an address that includes a country, state, country, city, zip code, and/or street.

In another embodiment, determining the closest point of interest includes broadcasting a request for a response to points of interest that meet the selection criteria and receiving responses that include points of interest satisfying the selection criteria at step 305. The responses preferably also include location data (which may be the address, a longitude and latitude, or the address), which is used to determine the closest point of interest as is well known in the art at step 310.

After the available points of interests meeting the criteria are determined, the closest point of interest meeting the selection criteria is determined at step 310. This step preferably includes determining the distance (e.g., by traveling the streets and thoroughfares) to the available points of interests meeting the criteria and selecting the available point of interest meeting the criteria with the smallest distance. Alternately, step 310 may include computing the time to travel to the various available points of interests meeting the criteria—which may factor in traffic delays—and selecting the available point of interests meeting the selection criteria to which the user has the shortest travel time.

In addition, the device 101 can find the closest point of interest that meets the first the criteria and then determine whether that point of interest meets second criteria. For example, the software might determine the closest auto parts vender and then query the vender computer system or a third party computer system to determine whether that particular vender offers a particular product and/or has a particular part in stock. Thus, this process includes the steps of determining a first target point of interest satisfying a first criteria, determining whether the first target point of interest satisfies a second criteria, if said first target point of interest does not satisfy said second criteria determining a second target point of interest satisfying the first criteria, determining whether the second target point of interest satisfies the second criteria, and subsequently performing the other steps described herein such as steps 320 and 325.

After determining the closest point of interest meeting the criteria at step 310, the device 101 may optionally (at the selection of the user) provide directions thereto and may request purchase of a product (e.g., placing an order for food) and pay for the product at step 320 (skipping step 315 in this example embodiment). The request may be transmitted as a fax, as an electronic transmission (e.g., to the point of sale) such as an email, an instant message, an HTML transmission (e.g., a Post command with associated variable/value pairs), a voice transmission (e.g., synthesized voice), or any format and protocol suitable to the vender. Preferably, the format, protocol, and services are determined through the use of Web services by retrieving the descriptor document from a service registry and transmitted via a SOAP transmission.

As an example, the user, riding in an automobile, enters a voice command which is received by the device 101 at step 301, and in response, the device 101 determines the closest fast food restaurant performing steps 305 and 310 as described above. The device 101 produces an output (either visually or audibly) identifying the closest fast food restaurant, its location, and estimated driving. The user may then elect to travel to the identified restaurant and provides a voice command indicating that he or she wishes to do so and/or whether he or she needs directions.

In response, the device 101 provides driving instructions to the user, which are displayed on the device 101 or optionally on a heads up display that is projected onto the inside of the windshield of the automobile. As the user approaches an intersection, an arrow is projected onto the windshield by the heads up display to indicate to the driver that the driver should turn left or right. The arrow blinks faster as the driver approaches the intersection and/or changes colors to indicate the closeness of the location at which the driver should turn. In addition or alternately, the device 101 may provide audible directions as are well-known in the art.

In this application of the present invention, when the device 101 is within a predetermined distance of the place of commerce exchange such as a point of sale, a vender location, a place for delivery of goods, or a place for pick up of goods, the device 101 communicates with a computer system (such as that of the vender computer system) through a wireless link to facilitate the transaction, which includes exchanging the payment information. In addition or instead, the device 101 may enter into the commercial exchange based on input from the user at step 315 such as when the user makes a request to purchase (and which may be irrespective of the distance from the place of commerce exchange).

The type of wireless link may be any link that is suitable for the particular vender and may be retrieved from memory and/or determined or based on information in a service registry. Thus, if the vender accepts fax orders, a telephone communication link for faxing the order may be established. If the vender accepts email, an email transmission is sent. If the vender computer system offers Web services a SOAP transmission is employed to place the order for the product (e.g., the food).

As a result of the communication at step 320 of this example, the user receives the product, the device 101 receives information as the product, and/or the device 101 receives information sufficient to use the product (e.g., an entry code or order number). In addition, as a result of the communication the vender preferably prepares the product for delivery to the user as instructed in the request from the device 101.

For example, in the above scenario, when the user selects a point of interest from those presented, the user then supplies an input to the device 101 as a request to place food order. The food order may be a list of items previously stored in memory that are routinely ordered, which may form part of the user's profile, and that is selected from a number of lists associated with that user and that restaurant. In addition, the entire restaurant menu, or a subset thereof, may be stored in memory and retrieved (for example, at the time the user selects the restaurant and prior to being within the predetermined distance) to allow the user to place his or her food order. The lists or menu may be displayed to the user on an automobile display (e.g., on the heads or a in dash flat panel display) and selected by voice commands from the user at step 315.

Items stored in memory may be entered manually (such as predetermined food order lists or the entire menu), may be received and stored each time the user purchases a different combination of items (in the case of a list food items), may be periodically transmitted (in the case of the entire menu) such as when the menu changes, may be downloaded, or any received through other suitable means.

When the device 101 is within a predetermined distance of the restaurant (or when the user supplies information of the request), a communication link between the device 101 and the vender is established (preferably by the device 101) to request purchase of the desired food (the food order) at step 320. As discussed, in addition to placing the food order, the device 101 (employing the commerce module as discussed above) and the vender exchange payment information, which is also retrieved from memory of the device 101. The results of the transaction, which preferably indicate the success of the transaction, are then presented to the user visually or audibly at step 325.

Therefore, instead of entering the restaurant to place the food order or entering a drive through to place a food order—both of which typically result in waiting to pay and waiting for preparation of the food—the food is already prepared and paid for when the user arrives.

In addition, the device 101 may optionally transmit location information to the point of interest during the communication with the point of interest at step 320. This information, or other data, can be used to estimate the arrival time of the user by the vender or device 101 (in which case the data is transmitted to the vender). As a result, the vender can prepare the food (or other product(s)) for the customers so that the product is fresh and in the order in which the customers are likely to arrive instead of the order in which the customers place the food orders, or some combination thereof.

Multi-Vender Search

Another example application of a preferred embodiment of the present invention retrieves and processes data from a plurality of service providers (e.g., venders). Software on the device 101 processes the data received from the plurality of venders, which may include, for example determining whether a product is available, comparing the price of the product offered by the plurality of venders, and other processing of data. The results of the processing may be supplied to the user and/or used as a basis for taking additional action such as purchasing the product from the vender with the lowest price or making a request (e.g., for additional information).

Figure 5:
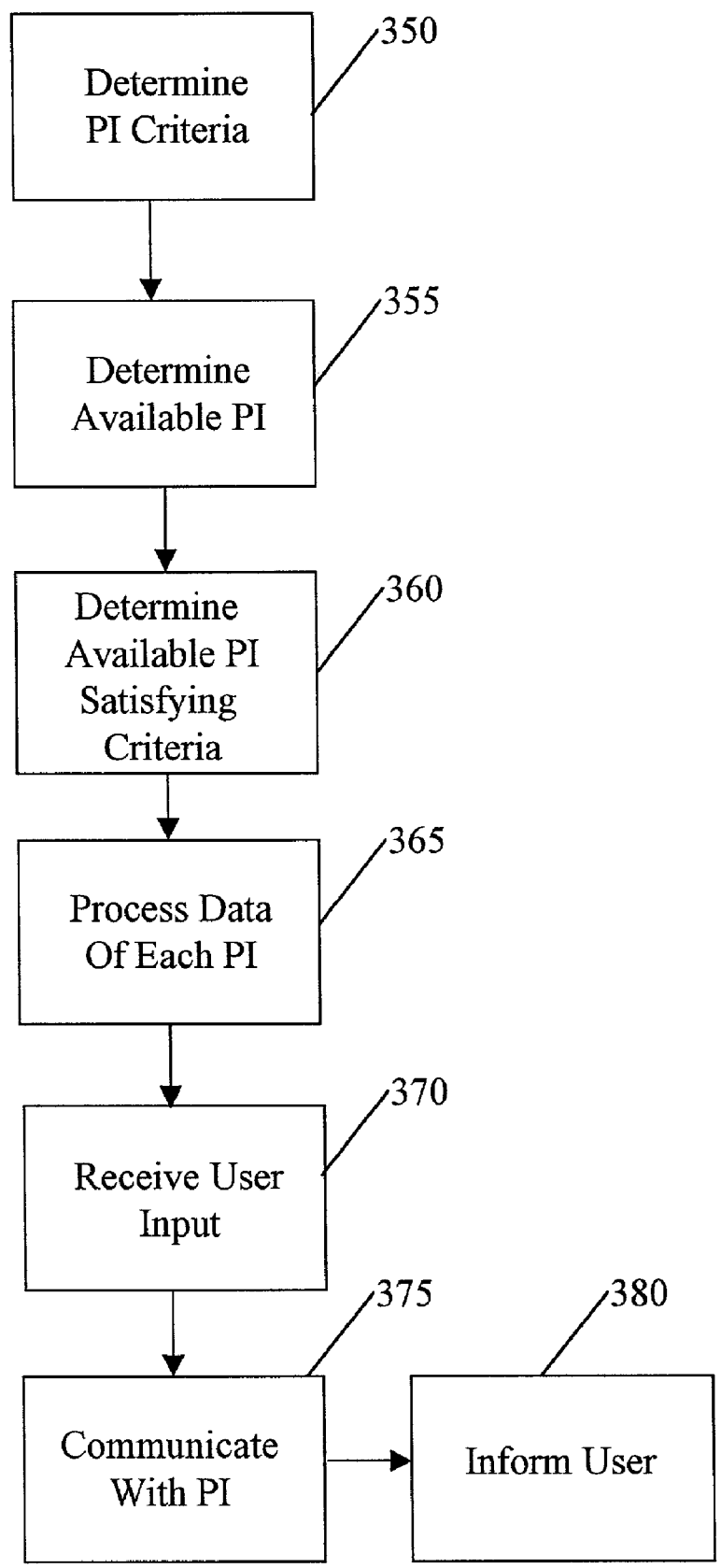
FIG. 5 is a data flow diagram of the method steps for implementing an example embodiment of a system, method, apparatus, and computer program product of the present invention for determining a point of interest satisfying criteria.

As shown in FIG. 5, this example application of the present invention includes a computer program and hardware for determining the PI criteria at step 350, determining the available PIs at step 355, determining the available PI that satisfy the criteria at step 360, processing data from the PI at step 365, receiving user input of the processed data at step 370, communicating with a PI at step 375, informing the user of the results of the communication at step 380.

For example, a user may wish to purchase a product for the lowest price. To find the lowest price, the device 101 determines the venders offering the product (or who might offer the product), obtains price information, determine the vender with the lowest price (and has the product available), and transmit a request to purchase the product. In this example the identification of the venders is limited to those venders in a given area (e.g., a city, zip code, street, county, state, or country).

At step 350, the device 101 is provided with product identifying information and processing instructions. For example, the user provides the product identifying information and instructions through a voice input. This includes, for example, the user stating the processing instruction such as "find lowest price" followed by product identifying information such as manufacturer Calloway®, Big Bertha® driver. Other product identifying information may also be supplied such as product numbers, model numbers and other characteristics such as, for example, size(s), color(s), quantity, etc. In addition, other vender criteria may be supplied such as limiting the search to venders in a particular geographical area such as a county, city, shopping complex, state, and/or other area.

In addition or alternately, the product identifying information or other inputs to the device 101 may be received from another source such as image data from a scanner that has scanned a barcode, text, or other image or data from a radio frequency tag. While the data preferably includes product identifying data, it may also include vender identifying data (e.g., internet address, phone number, network address, etc.) as well as data for communicating with the vender (e.g., data that might be found in a descriptor document such as data relating to the format, protocol, and other like data). The image data might instead include the Dunn & Bradstreet or Thomas Registry vender identifying information and a service registry for retrieving data for communicating with the vender.

After the product identifying data and processing instructions are provided to the device 101, the device 101 determines the available venders that can provide the product (in accordance with any other vender criteria supplied) at step 355. In doing so, the program may retrieve data of venders from local memory, a remote computer system, and/or transmit a request for such venders to a public, private, or local (e.g., shopping complex) service registry (e.g., a UDDI implementation).

Determining whether a point of interest satisfies the criteria at step 360 may take one or more steps depending on the criteria, where the necessary information can be obtained, and other factors. For example, if the necessary information is in memory of the device 101, no communication with the PI is necessary. Likewise, if the necessary information is in a service registry, it can be retrieved from the service registry instead of contacting the PI. In some instances, some combination of the memory, a service registry, and information requested from the PI may be required to determine whether the PI satisfies the criteria. In this example, a communication with the PI to obtain some of the information necessary for determining whether the PI satisfies the criteria is performed.

Once the available points of interest (e.g., venders who offer, or who may offer the product and meet other criteria such as location) are determined, the device 101 determines a destination for transmitting a request for the required information (addressing information) and for the format and protocol for communicating with the identified vender computer systems (communication parameters). This information may be transmitted from the service registry computer system in the form of the descriptor document (e.g., a WSDL document). Alternately, all of some of the data may be retrieved from local memory or a remote computer system at which the data was stored during a previous transaction.

Once the addressing and protocol information is determined, the device 101 generates a vender request for the desired action that is based on the product identifying information, the processing instructions, and the vender's communication parameters. In other words, the device 101 generates a vender request (which may be different for each vender) by formatting and configuring at least a portion of the processing instructions and/or product identifying information in a format and configuration that the vender's computer system can read (e.g., receive, interpret, and/or respond to). In this example, the instruction is to a request for a price and the product identifying information is the manufacturer and product model information and, in particular, data representing "manufacturer Calloway®, Big Bertha® driver."

Each formatted vender request is transmitted to the respective vender computer system according to the vender computer system's previously determined addressing, format and protocol information. In addition, the communication link and protocol may be different for each vender computer systems so that some links are via a 3G network and others are through a WLAN. (Note: the protocol information may dictate that a communication link first be established, which might include handshaking and other well-known communication protocol that does not form part of the request.)

The vender computer systems (VCSs) receive and process their respective requests, which in this example includes interpreting the request and searching a database for the price of the identified product. After the price is retrieved or otherwise determined, the price is transmitted to the device, preferably in XML format, to determine whether the vender satisfies the selection criteria at step 365. Other data may also be transmitted such as availability, location data for the vender, taxes on purchase of the product, delivery charges for the product, available times for delivery or receipt (e.g., pick up) of the product, etc.

Some VCSs may not respond. Other VCSs may indicate that they do not have the desired product. Still other VCSs may transmit information indicating they are out of stock of the desired product. Thus, only those VCSs that respond with price of the product and indicating availability of the product (which may simply be indicated by the transmission of the price) are determined to be a PI fully satisfying the criteria at step 360. Other applications of the present invention may employ other PI criteria (e.g., which may not include availability or price) such as located within a five mile radius, with certain store hours, certain vender, vender type, manufacturer products, with sales, the date, the time, any commercial characteristic(s), and/or any other determinable criteria.

Vender requests may be transmitted sequentially, after which the device 101 waits for a response before sending the next vender request or contemporaneously (vender requests are transmitted to each vender without waiting for responses from the first vender).

The device 101 receives and stores the response from each VCS and processes the data according to the processing instructions. In this example, the device 101 sorts the responses from the venders according to price and displays the data in order of ascending price. The displayed data preferably includes the price, vender identifying information and location information. Additional information may also be displayed such as availability (if the vender was not screened out based on availability), distance information, taxes on purchase of the product, delivery charges for the product, available times for receipt (e.g., pick up) of the product, and other data.

Upon viewing the presented data of one or more responses from the VCSs, the user supplies an input to the device 101 at step 370 that in this example is a command to transmit a request to purchase the product from a particular vender. In response, the device 101 communicates with vender at step 375 using the determined communication parameters and transmits a request to purchase the desired product. Thus, the device 101 transmits product identifying information, which may include a product number, name, model, quantity, size, color, duration (e.g., in the event of a rental), dates (in the case of travel tickets or reservations), and/or other product information. In addition, after receiving a request from the VCS, or at some other point in time (as determined by the protocol and format for the VCS) the device 101 exchanges payment information as described above. At the end of the transaction, the device 101 informs the user of the success of the transaction at step 380, which may take the form of, or additionally include, information of the total amount of the transaction, a delivery/pickup location, a delivery/pickup time, and/or other data.

Alternately, when supplying the initial user input at step 350, the user can input instructions to the device 101 to purchase the product from the vender who returns the lowest price, the lowest total price, lowest price and availability of product, or based on other data received from the vender(s). Given this instruction, the device 101 informs the user of the success of the transaction, but not display the results steps 365 thereby eliminating step 370.

Hotel

Another similar use of the above-described application is for hotel commerce. For example, the user—who is riding in an automobile or other vehicle—may wish to find the closest hotel meeting a given criteria (e.g., with availability and below a selected price). In response to the user request, the device 101 determines and presents a selection of the closest (e.g., the closest three) hotels that meet the criteria by means described above. The user then selects one of the hotels from which to request further information or to purchase a room rental.

Alternately, the user may already have a reservation with a hotel in which case the user preferably has previously input the destination to the device 101 and when the user (and device 101) is within the predetermined distance of the destination hotel, the device 101 automatically (or after prompting the user for permission to check in) checks the user into the hotel as described below.

To rent a room or accomplish check-in, a communication link between the device 101 and hotel computer system (or a computer system acting on behalf of the hotel) is established by any means described herein. The type of wireless link may be any link that is suitable for the particular hotel and may be retrieved from memory, based on information in a service registry or other source. Thus, if the hotel accepts fax orders, a telephone communication link for faxing the order may be established. If the hotel vender accepts email, an email transmission is sent. If the hotel computer system offers Web services a SOAP transmission is employed to place the order for the product (e.g., the room).

If a reservation was previously made, after the communication link is established, the device 101 transmits user identifying information which includes the user's name, a confirmation number (in the case of a reservation), a telephone number, an account number, and/or any other information necessary for check in.

If a reservation was not previously made, room availability is determined and, if there is availability, a request to rent a room is transmitted (which may be transmitted in response to a user input). This request (or the request for availability) includes information about the length of the stay, number of guests, and the type of room requested (e.g., smoking versus non-smoking, the view, etc.).

After the request to rent a room is granted, the payment information is exchanged between the device 101 and the hotel computer system. If a reservation was previously made, the hotel computer system may simply use the payment information (e.g., credit card information) that was supplied when the reservation was made to obtain payment.

After payment information sufficient for check in is supplied to the hotel computer system, the hotel computer system transmits check in information to the device, which includes a room number and entry code. The entry code may be a number manually entered into the door by the user that unlocks the door or may be a multi-digit code that is wirelessly transmitted (preferably along with user or device authenticating data) from the device 101 to unlock the door via a wireless PAN.

In addition to receiving data permitting entry into the room, the hotel computer system transmits information sufficient to allow the device 101 to present options to the user allowing the user to purchase additional products. For example, a room service menu may be transmitted to the device 101 from which the user may place a food order. Other information allows the user, for example, to purchase tickets to shows or other entertainment, order movies, establish credit for gambling, and receive data for obtaining discounts for products or services.

When the user elects to check out, a link is established between the device 101 and the hotel computer system and the device 101 requests check out data, and receives and visually presents the bill to the user for review and approval. After receiving an input indicating approval from the user (e.g., receiving the final total amount of the bill), the device 101 finalizes payment by exchanging payment information (or indicating that previously supplied payment information should be used) and stores the information in memory. Thus, the present invention eliminates the need to stand in line during check in or check out.

It will be evident to one skilled in the art that this embodiment, with minor modifications, has numerous other applications including, but not limited to, the reservation and purchase of airline, train, bus, and watercraft tickets; the purchase of tickets to movies and other entertainment (such as sporting events, live plays, concerts, movies), paying tolls, golf tee times and green fees, purchasing fuel, and many other applications.

Concert

In addition to the above, the present invention may also be used to facilitate entry to a facility, event, or area, preorder products for entry; and supply facility or other information to the user at entry; and supply user information to the event computer system.

For example, after purchase of a ticket to a concert, sporting event, or other event, and typically well in advance of the day of the event, the ticket information, including the seat information (if necessary) and a unique entry code is stored in memory of the device. In addition, directions to the event, as well as directions to the user's seat may also be received and stored in memory the day of the event, at the time of the purchase, or some other time prior to the event.

When the user is within a predetermined distance of the event, a communication link is established between the device 101 and the event's entry control computer system (ECCS). The device 101 transmits the entry code to the ECCS, which then provides an acknowledgement to that user's entry code is valid as well as instructions for the best (or only) entrance the user should enter. To enter the facility, the user must have an entry code and provide an indication to the ECCS that the user has a valid entry code. To provide the indication, the device 101 may be simply display the valid entry code along with other authenticating information at the entrance of the facility. The displayed information may be a barcode that is displayed on the device's display and which is read with a barcode code reader as the user passes through the entrance.

Alternately, the device 101 simply transmits information of the user, such as the user's name, and the user simply shows his or her identification (e.g., driver's license) to personnel, or to an image input device connected to the ECCS, as the user enters. In another alternative, the device 101 transmits the entry code along with data that is consistent with data in a barcode on a fixed medium such as a barcode that is on the user's identification (e.g., driver's license) which is scanned or read by a barcode reader as the user passes through the entryway. In the preferred embodiment, the device 101 transmits the entry code along with user authenticating information such as data of the user's fingerprint, iris, voice, face, or other substantially unique physical data. As the user enters, the transmitted user authenticating data is compared with the authenticating data of the person entering the facility (user's fingerprint, iris, voice, face, or other substantially unique physical data) to ensure that the person entering the facility is the user authorized to do so (i.e., there is a match of the transmitted data with the data received (scanned) as the person enters).

As another alternate to the preferred embodiment, the user authenticating information may be supplied to the ECCS at the time of the purchase of the tickets so that that there is no need for a communication between the device 101 and the ECCS at the time of entry to facilitate entry (i.e., the person entering need only supply the authenticating data when entering the facility such as, for example, permitting scanning of his or her fingerprint). In still another alternate means, the user's authentica ting data (e.g., fingerprint data) and name is stored at a third party authenticating computer system which receives the fingerprint data (and user's name) from the ECCS and compares it with the stored data to confirm the identity of the user for whom the ticket was purchased.

The user may preorder food or drinks, as described above, and the ECCS determines the location of a food preparation center (e.g., a concession) that is reasonably close to the user's seat and, optionally, that can most easily prepare the food by the estimated arrival time (or closest thereto). The identity of the food preparation center and/or its location is then transmitted along with a food menu to the device 101. In response to a food order, the ECCS transmits a time the user should arrive to pick up the food. Thus, such. a system can reduce or eliminate waiting to enter the facility, waiting time to receive food, and counterfeit tickets.

In addition, the ECCS transmits a request and, in response, receives user information from devices carried by persons entering the facility, area, or event. The requested and supplied user information may include demographical data or any other desirable information. Similarly, any of the embodiments and applications disclosed herein (such as the fast food and hotel applications) may additionally include transmitting such data about the user from the device 101 to the remote computer system.

Matching

Through the use of the communications module, the device 101 may be programmed to communicate information with other person's using a device 101 of the present invention or another remote computer system. For example, upon receiving a user input indicating the user's desire to do so, the device 101 is programmed to query all other devices within communication of the device 101 for data, via the PAN transceiver (e.g., Bluetooth® network), via the WLAN transceiver, or within a predetermined distance. The query may be for any desirable data. For example, upon entering a business conference the user may "turn on" the feature and request the device 101 query all other devices for user information such as the information that would be present on a business card. The user may also make the request a selective query so that only data from users or devices meeting a certain criteria is requested and, if received, stored. For example, a user who is a sales representative may desire data from people who work for companies that are more likely to be potential customers and may not want data from other people or people who are already customers or competitors. In response to a request, the other user's device 101 transmits the requested data, a portion of the requested data, transmits a response that the request is denied, or does not respond.

Likewise, the user may input response instructions for responding to requests for data (queries) from other user devices 101. For example, the user may not wish to transmit the requested data to devices 101 of users who are employed by companies who sell certain products or who are competitors. In doing so, the device 101 may be programmed to filter out certain requests (e.g., not respond) or respond with a communication indicating that the data request is denied. In addition, the user may elect to transmit only certain data (e.g., an email address but not a phone number), request only certain data, and only to respond if the requesting device 101 supplies certain data.

The communication criteria, which determines whether or not data is desired from the second user by the first user, may be any criteria and may include, for example; 1) user information of the other (second) user (e.g., company name, sex, age, birth date, address, job position, height, weight, ethnicity, income, and other demographical information.); 2) device information of the other user's device (e.g., manufacturer or model), whether the other user has a service; 3) product data such as whether the user has any product or a particular product for sale, whether the other user wishes to buy any product or a particular product; 4) user activity data such as interests and hobbies of the other, frequent activities of the other user (e.g., skiing), past activities of the other user (e.g., where they have been), anticipated activities, and/or 5) other characteristics or desires of the other user—hereinafter collectively referred to as communication criteria data.

Communication criteria data (CCD) is entered into the device 101 by users in categories such as user information, user activities, products data, and other data, some of which may form part of the user profile. In addition, communication criteria data includes user activity data stored from the previous activities of the user such as the locations or venders visited and stored (e.g., stored by the location module) and/or information of products (e.g., transportation data) purchased (e.g., stored by the commerce module).

Querying of other user's devices may be performed periodically or upon entry to a geographical location (e.g., a room, building, vender, street, etc.), which is indicated by a transmission from an access point at, or within, the geographical location.

Communication may be accomplished with any suitable protocol such as HTTP/IP with predetermined name value pairs used for each category and a standard format for each value in each category. For example, Bdate may be a variable (name) representing the user's birthdate, which is paired with data representing the user's birthdate in the format of mm/dd/yyyy (e.g., bdate=02/15/1983). Queries to other devices 101 are preferably transmitted using the same format and submitted and converted to a SQL database by the receiving device 101. A successful query (a search that returns a valid result greater than zero) indicates that the other user has communication criteria data that matches the desired communication criteria data. In addition to the query, the transmission may include information relating to one more actions requested by the user upon a successful query. Alternately, a successful query may simply result in a transmission from the queried device 101 indicating that the query was successful and include information indicating what portion (or which query) was successful. For example, the query might transmit a query for CCD data that the user is over forty years of age and a male or over thirty years of age and a female. In the response, the queried device 101 transmits data indicating that the user is a male over forty years of age (an affirmative response) and may also, at the election of the user, transmit the user's age, which in this example is fifty-five. In addition, additional information is sufficient to establish a communication link (e.g., a network address for the successfully queried device) may also be provided. After receiving the communication indicating the query was successful, the requesting device 101 then transmits a request to the queried device. In response, the queried device 101 may transmit the requested or other information, prompt the user to take an action, prompt the user for information, prompt the user for permission to transmit information and/or otherwise respond.

The user of the device 101 can program the device 101 with response instructions (for example in the user profile) that determine how and whether the device 101 responds to queries and different types of requests.

Thus, the first device 101 (or other computer) transmits a request that includes a query for CCD to a second device 101. The request itself may include certain CCD stored in the device 101 or the requested device 101 may respond with a request for CCD of the first device 101. Upon determining that device 101 includes satisfying CCD data, any action may be requested (or requested in a subsequent transmission) (by either device101) such as requesting data from the user's device, transmitting data to the user's device, requesting information from the user, and/or requesting a service of the user. For example, at the request of the user, in an emergency a device 101 may transmit a query (and request) to other devices within communication range of the device 101 (e.g., via the WLAN) for a doctor, nurse, or police officer. Thus, only users who are a doctor, nurse, or police officer would be informed of the request by their device, which is preferably identified as an emergency request. The request, in this example, is a request to render assistance and may also include information relating to the location at which assistance is needed. Users of the device 101 can program their devices to respond differently to different requests (and at different times). Thus, the doctor or nurse may elect to program their device 101 to only accept requests that are emergency requests.

Some or all the communication criteria data may also be stored in a correlating computer system when the user enters a geographical area or travels within communication distance of the Area Computer System. The Area Computer System (ACS) may operate and/or communicate via a network associated with a facility (e.g., a shopping mall, a stadium, an entertainment arena) or geographical area (e.g., a MAN, an auction site, etc.)

The ACS receives and stores the communication criteria data, queries, and response instructions for each user device 101. The ACS determines the user devices that have communication criteria data matching each user device query and transmits the data responsive to the queries of each device 101 and in accordance with the response instructions, which may optionally inform the user of the match. Thus, the ACS may retain and provide the communication criteria data to users after the user of the device 101 to which the communication criteria data has left the geographical location or requests the data. The ACS, thus, may also be used to transmit messages (e.g., emails) to all devices (or select devices having certain communication criteria data) that come within transmission range of the ACS.

As an example, as each user enters the area or facility, the user's CCD, queries, and response instructions are requested by and transmitted to the ACS. Internally to the ACS, the ACS then compares the CCD with all the previously stored queries of all the earlier arrived users. For each query to which the user's CCD satisfies, the ACS processes the user's response instructions to determine whether the user wishes to supply the requested data. For those queries to which the user wishes to respond, the ACS stores the requested CCD data in a data file corresponding to each requesting query. Next, the ACS compares the CCD of each earlier arrived user with the user's queries to determine the users' CCD to satisfy the user's query. After identifying each match, the ACS processes the response instructions associated with each set of CCD to determine whether the requested data should be supplied. For the requested data that is to be supplied, the ACS stores the CCD data in a data file corresponding to each query for the user. When the user leaves or requests the data file, the data file is transmitted to the device 101.

In addition to exchanging data, the device 101 can take immediate actions based on the data received. For example, based on a first set of CCD meeting a CCD requirement set, the device 101 transmits (if programmed by the user to do so) a request for an appointment (e.g., for a telephone call, a lunch, a meeting, etc.) that may include the time periods that are available to the requesting device's user and the length of the desired appointment. In response, the requested device 101 determines whether its user has supplied permission to schedule such appointments and if not, transmits a response denying the request (or does not respond at all). If the device's user has provided an input (that is stored in memory) permitting the scheduling of such appointments, and the requesting device's information (e.g., its CCD data) satisfies the activity requirement criteria for the activity (i.e., scheduling the appointment), the device 101 selects an appointment time (e.g., such as the earliest) from the available time periods transmitted by the requester or, if not transmitted, transmits time periods that are available for the requested device's user. The requesting device 101 then transmits a confirmation of the appointment if the requested device 101 transmits a time period selected from the time periods transmitted by the requesting device. If the requested device 101 transmits its available time periods, the requesting device 101 selects a time period and transmits information of the selected time period to the requested device 101, which responds with a confirmation of receipt. In addition, the device 101 informs the user that a request has been made and may prompt the user for permission to make any appointment or an appointment for a particular time. Information of the available time periods is preferably determined from data that is stored in memory and used, for example, by a calendar applications program. In addition, it is preferable that the requesting device 101 issues requests to interface software (e.g., in the communications module) that determines availability or other information as opposed to the requesting device 101 being given access to the data itself.

In addition to the above, the communication criteria data stored in the user's device 101 and the location of the user may also be used by remote computer systems, for example, to target advertising and provide the user with location relevant information.

Shopping Mall Scenario

Figure 7:
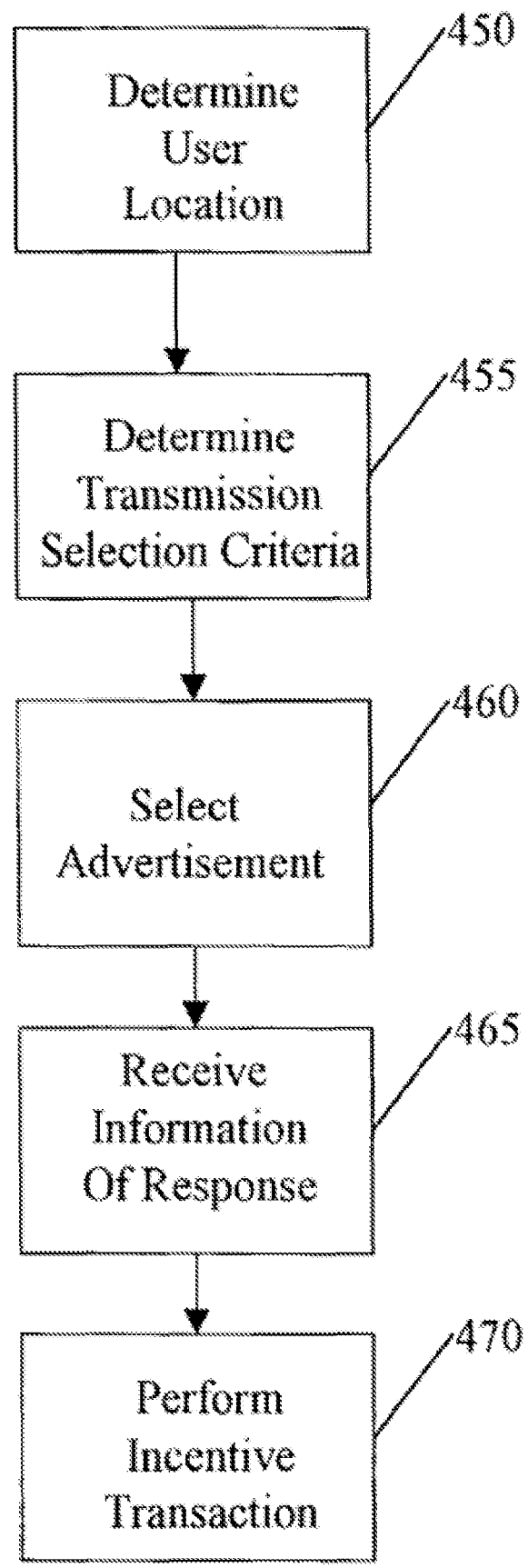
FIG. 7 is a data flow diagram of the method steps for implementing an example embodiment of a system, method, apparatus, and computer program product of the present invention for providing location based mobile advertising.

One example of such a system employs an ACS designed to coordinate the delivery of advertising and content for the shopping complex. Referring to FIG. 7, the ACS establishes user location information at step 450, determines transmission selection criteria (temporal data, CCD, targeting criteria, etc.) at step 455, and selects and transmits an advertisement at step 460. In addition, in some instances the ACS will receive information relating to the user's response (receipt, viewing, presentation, or action in response) to the transmission at step 465 and perform an incentive transaction at step 470.

Figure 2:
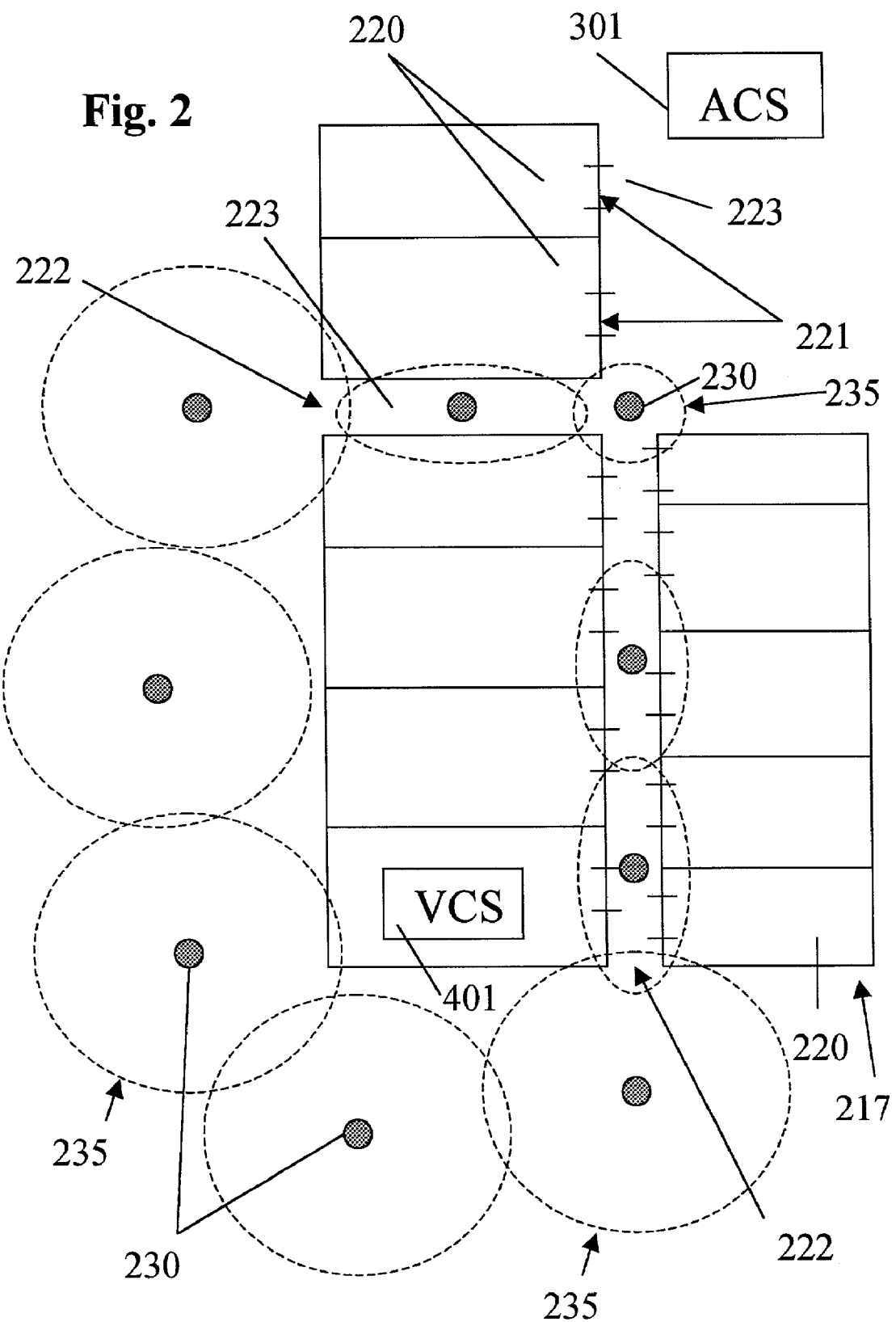
FIG. 2 is a schematical representation illustrating an example of an area, including a facility, for use with a method, system, apparatus, and computer program product of the present invention.

For example, upon entering a shopping complex (e.g., a mall), the ACS determines location data of the user carrying the device 101. The ACS preferably determines the location (e.g., relative location) of the device 101 by determining which WLAN (or wireless PAN if the PAN includes addressable access points) access point through which the device 101 is communicating. FIG. 2 is schematical representation of a facility 217 such as a shopping complex that includes a plurality of access points 230 that facilitate wireless communication between device 101 and the ACS 301. The connections between the ACS and the access points 230 are not shown and may be wireless or wired (e.g., Ethernet). The dashed lines 235 surrounding each access point 230 represent the communication range of the associated access point 230. In FIG. 2, the five access points with the largest communication ranges 235 are positioned in the parking area adjacent the facility.

The facility 217 includes a plurality of vender store locations 220, each having an entrance 221. In addition, the facility 217 includes a plurality of entrances 222 connected by one or more thoroughfares 223 that the visitors walk through to gain access to the 10 vender store locations 220.

Each access point (AP) 230 of this example has a separate network address so that data received from the user device 101 and provided to the ACS is determined by the ACS to have come from a particular AP 230. Thus, knowing the AP 230 with which the device 101 is communicating, and the range of the AP 230 (if desired or necessary), the ACS can determine the approximate location of the user in the parking area, in a thoroughfare 223, and/or in a vender store location 220. In addition, as the device 101 communicates through a sequence of APs 230, the ACS can determine a plurality of locations for the user and, therefore, determine anticipated location data for the user carrying the device. Anticipated location data may also be determined by determining intended activity (e.g., from CCD), receiving product purchase data from a VCS (indicating the user will be traveling to the vender), and/or receiving past GPS data. Thus, the selection of an advertisement based on location data may be a selection based on the current location data or anticipated location data.

The number, placement, and communication range of the APs 230 are design choices. If more accurate location data is desired, more access points 230, perhaps with smaller communication ranges, may be used. While in this example embodiment, the location data is determined through an access point location method, alternate embodiments may simply request that the device 101 transmit location data that is determined by the device's GPS receiver or through other means. In addition, depending on the network and other design factors, the access points may or may not have overlapping communication ranges.

Preferably ACS bases the selection of the advertisement on location data of the user such as, for example, the current location of the user or the anticipated location of the user, which may relate to what door the user will likely enter, what vender the user will likely travel near or is near.

In addition, the device 101 preferably transmits select CCD to the ACS in response to a request from the ACS. Upon receiving the transmitted CCD from the device 101, the ACS determines a selection of transmission(s), such as advertisement(s), for transmission to the device 101, which may or may not also be selected based on location data. The selection of the advertisement may be based on any category or specific CCD data such as the user information (e.g., the user's employer, gender, age, birth date, address, job position, height, weight, ethnicity, income, and/or other demographical information.); device information of the user's device 101 (e.g., manufacturer or model); product data (e.g., whether the user has any product or a particular product for sale, the identity of any product the user wishes to sell, whether the user wishes to buy any product or a particular product, the identity of any product the user wishes to buy); user activity data (e.g., whether the user has a particular interest or hobby, frequent activities of the user, past activities of the user (e.g., where they have been), anticipated activities); and/or other characteristics or desires of the other user.

In addition to or instead of being based on the CCD and/or location data, the advertisement may also be selected based on temporal data such as the time (e.g., morning versus afternoon), day (e.g., weekend versus weekday), or date (e.g., a holiday, birthday of the user's wife). The temporal data may be received from the device 101 (in response to a request), determined by the ACS, or some combination thereof.

Thus, ACS selects the advertisements based on location data, temporal data, and/or the CCD, from a plurality of advertisements for numerous venders stored in memory. Each advertisement stored in the ACS preferably includes targeting criteria used for selecting users to which the advertisement or all advertisements for a vender are transmitted. The targeting criteria may include any subset of location data, CCD and/or temporal data, but may also include other data (for example, data that is not available for a particular shopping complex).

Selection of the advertisements are based, at least in part, on the degree to which the targeting criteria of the advertisement matches the CCD, location data and/or temporal data of the user. For example, ads for a particular vender, such as a coffee shop, may include targeting criteria that dictates that all users with location data that includes entering a particular door (and who, therefore, are likely to pass by the vender), and who enter prior to 11 AM (temporal data) are to receive an advertisement for coffee along with an electronic coupon offering a ten percent discount. Some advertisements may not have associated targeting criteria as the advertiser may not wish to target the advertisement, but instead have all users receive the advertisement. In addition, selection of an advertisement may or may not require a complete match of the targeting criteria with location data, CCD and/or temporal data (depending on the desire of the advertiser).

In addition to selecting the advertisement(s) based on the location data (if any), temporal data (if any) and/or the CCD (if any), and targeting criteria, the ACS may also select the advertisement based on the transmission value of the advertisement. The advertisements may have an associated transmission value (or bid price) that determines how much the advertiser (or other entity) is willing to pay to have the advertisement (or other transmission) transmitted to the user (who may or may not satisfy the targeting criteria) or to have the user respond to the advertisement (or other transmission). The transmission value for a particular vender (or in some cases for a specific transmission such as an advertisement) may be different depending on the advertisement, the CCD, the location data, the temporal data, the ad targeting criteria, and/or some combination of the aforementioned. For example transmission values may be different for different times of the day, locations, products, responses, and if based on different triggering events.

A response to an advertisement may include any desirable user action such as providing information to the ACS or vender (or VCS), purchasing a particular product, purchasing any product from the vender, entering a vender's store location, using a coupon, registering user information with the vender, or any other requested or desired action.

After the ACS selects the advertisement(s) based on the temporal data (if any) the CCD (if any), location data (if desired), and transmission value (if any), the ACS retrieves the advertisement(s) from memory and transmits the advertisement(s) to the user's device 101. Upon reception at the device 101, the device 101 determines whether the user wishes to accept the advertisement based on transmission filtering information stored in memory. The transmission filtering information may be supplied in, or derived from, the user profile or otherwise supplied by the user.

If the transmission filtering information does not filter out the advertisement, the device 101 produces a visual or audible alarm to inform the user that advertisements have been received. In some instances, which may depend on the user profile, the advertisement characteristics, and other considerations; the device 101 may not inform the user of the advertisement until a later time (e.g., when the user is leaving the shopping complex or traveling near the vender). Thus, even though transmitted at a particular time, the advertisement, in some cases, may not be presented to the user until conditions transmitted by the ACS indicate that the advertisement should be presented to the user.

Either automatically upon reception or upon request by the user, the user views the advertisements if they are visual advertisements and/or listens to the advertisements if they are audible advertisements. Some of the advertisements may simply include a notification of a sale in progress or notification of a new or existing product offering. Other advertisements may include a coupon that provides a discount for a purchase at a particular vender or for purchase of a particular product as an added effort to entice the user to visit the vender.

The coupon can be printed out and presented to the vender at the time of purchase of a product as is done with conventional coupons. Upon inputting a request to print the coupon (which is transmitted to the ACS), the ACS transmits identification of the closest printer in the shopping complex, and prints the coupon for the user or requests that the vender's computer system print the coupon for at the vender store location. Alternately, the coupon could be printed for the user as the user enters the vender's store location (with or without the advertisement having been transmitted) based on CCD and/or temporal data received by the vender computer system.

Preferably, however, the coupon is electronically transmitted from the device 101 to the point of sale system at checkout, which responds by discounting the product and alleviates the need to print the coupon. In either case, the point of sale (and/or device if the coupon is electronically presented) transmits information to the ACS indicating that the user used the coupon.

Preferably, the ACS transmits content such as audio content (e.g., music, new programming, talk shows, sports radio) that is received from a remote source, formatted for transmission to the device 101, and transmitted to the select users. The users can transmit a request for the desired content as is well known in the art. Periodically, the ACS selects and transmits the advertisement according to the process herein described.

However, some users may still not wish to receive advertisements or other transmissions and consider them an annoyance. To provide incentives to the user to view and/or use the advertisements, the preferred embodiment provides a means for providing financial incentives to the user for viewing (listening to or looking at) advertisements. In providing such incentives it preferable that the user provide some indication to the device 101 that the user has viewed the advertisement and that the device 101 provide an indication to the ACS that the user has viewed advertisement or that the ACS has presented the advertisement to the user. For example, after viewing the advertisement the user may be requested to provide a user input, which may include scrolling down to the end of the advertising and actuating any user input (e.g., pushing any button), actuating a user input requested in the advertisement, answering a question, or in some way confirming the user's viewing of the advertisement(s). Incentives are also provided for responding to advertisements and/or taking requested or desired actions, which are preferably greater than incentives for viewing an advertisement or when the device 101 presents the advertisement.

After receiving an indication that the user has viewed the advertisement(s), that the advertisement(s) has been presented, that the user responded to an advertisement or taken desired or requested action (hereinafter collectively referred to as a user advertisement response), the ACS performs an incentive transaction.

The incentive transaction provides the user with some form of direct or indirect benefit such as financial gain. For example, the incentive transaction may include electronically transmitting funds to the user's bank account, crediting the user's credit card, crediting the user with frequent flier miles, crediting the user with credit card use award points (or other award points used for purchasing products), providing the user with CPU time for executing software, and/or providing the user with a gift certificate, a rebate, or a refund. The incentive transaction may include transferring funds or crediting funds to any payment account of any user as described above. Preferably, the incentive transaction reduces (or offsets) the user's monthly fee(s) for use of the device. The ACS may perform the incentive transaction immediately, at the end of the day, periodically, or at any suitable time or interval. In an alternate embodiment, the ACS stores the financial incentive data and periodically transmits it to a remote computer system, which performs the incentive transaction.

The user may be provided incentives to use a coupon, to visit a vender, to travel to a particular location (e.g., near a vender or group of venders), to use a particular thoroughfare (e.g., a hallway or a road when in an automobile), to test or try a product or service, to purchase a product, to purchase a product advertised, to purchase any product from a particular vender, to purchase any product from a advertised vender, to supply user profile data, to supply CCD, to answer a set of questions (i.e., a survey), to supply location data, to perform some other action, and/or supply or review other information. Preferably, the advertisement includes information sufficient to communicate to the user the value of the incentive transaction—which may be related to, based on, or equal to the transmission value (e.g., bid price) of the advertisement.

As discussed above, the user may elect to screen out advertisements by supplying transmission filtering information to the device. One type of transmission filtering information includes incentive value information. For example, the user may elect to not accept advertisements for which value of the associated incentive transaction results in an incentive value below a predetermined minimum value and/or may elect to only accept those advertisements that result in a certain type of benefit such as accepting ads resulting in a credit card credit, airline frequent flier miles, or gift certificate, but not accepting advertisements that offer a coupon or rebate.

Many WLAN, such as Wi-Fi networks, are free to users who have the ability to establish a connection. However, present invention facilitates providing compensation to the network owner for use of the network. Thus, just as advertisers may place bids for advertisements and their placements, use of a network, such as a Wi-Fi network, by a user can be made conditional on the user performing a desired activity such as accepting advertisements, viewing advertisements, supplying information (e.g., CCD), responding to advertisements, using the network for limited purposes (e.g., noncommercial, not transmitting advertisements), visiting a vender, traveling to or away from a particular location, and/or performing some other activity. Thus, when the user establishes a connection, the network computer system (e.g., the ACS) prompts the user to agree to the conditions for use of the network. When the ACS receives data indicating the user's consent, (transmitted from the device 101 as a result of a user input or determined from data in the user's profile), the ACS permits the device 101 to connect with and use the network.

Purchasing of products is preferably done via a wireless exchange of payment information as described above and would, therefore, reduce or eliminate the need for check-out personnel for the vender. Thus, the vender may provide incentives (resulting in the incentive transactions described above) to the user in response to the user paying for products via a wireless exchange of payment information instead of paying in a conventional manner.

The ACS preferably receives notification that the user has purchased a product from the VCS but may also receive the data through interception of the payment exchange data or from the device 101. Preferably the notification includes information identifying the product (or type of product), the amount of the product, the vender, the user's location, and/or other product purchase information that is used to select one or more advertisements for retrieval and transmission to the user. For example, upon purchasing a tennis racket, the ACS may select, retrieve, and transmit an advertisement (which may include a coupon) for tennis balls or some other complementary or supplemental product. The advertised product may be offered by the same or a different vender. In addition, the advertisement selected, retrieved, and transmitted may advertise a vender that carries products that are complementary or supplemental to the product(s) purchased and/or that are in the same price range. In addition, the point of sale system (VCS) of the vender from whom the purchase is being made (or another vender) may transmit an advertisement to the user's device 101 for a product complementary or supplemental to the product purchased or for some other product offered by the vender (or other vender).

In addition, the ACS is also provided with ongoing CCD (e.g., activity data such as that of a purchase) and location data of the user (new data). The new data is transmitted to the ACS in response to a request transmitted by the ACS. Alternately or in addition thereto, the new data may be periodically transmitted to the ACS from the device 101 as requested by the ACS during an initial communication with the device. Alternately, the ACS may receive the location information from a fixed network node or a point of sale that is in communication range of the user's device 101 (meaning that the user is near the node or point of sale). Advertisements can then be selected, retrieved, and transmitted based on subsequent temporal data, location data, and CCD.

In addition or instead of receiving advertisements from the ACS, each vender may transmit advertisements to the device 101 and which may also be selected based on temporal data, location data, and/or the user's CCD. Thus, for example, as the user walks or drives near the vender's location, the vender's computer system (which may also be the vender's point of sale system) selects and transmits advertisement(s) to the user, which may include an electronic coupon and may also result in providing the user with incentives (i.e., an incentive transaction) as described above.

In addition, the ACS or vender's computer system may query the device 101 for demographical or other data about the user, which can be used to provide a statistical profile of person's more likely to purchase a particular product, enter a vender's store, and/or otherwise provide information that might be used to determine advertising criteria.

The device 101 can also be used to provide data to a data collection computer system, which can then provide statistical data or other information based on the collected data to other systems. For example, the device 101 can supply data that provides statistical information of the visitors' ages, incomes, genders, and other information of persons with devices entering a particular geographical area, facility (e.g., shopping complex), vender store location or performing another activity (such as making a purchase, sell, exchanging information, etc.). This data could then be supplied to advertisers and/or used to select advertisers and/or advertisements and may form the basis for targeting criteria.

The device 101 can also be used to provide data, which is non-user specific. More specifically, the data collection computer system receives information of the number of users (e.g., drivers) within the geographical area or performing the selected activity. The received data may simply include location data, confirmation that the device 101 is within the geographical area or that the user has performed the activity. Additionally, the data may also include information relating to the users' ages, incomes, genders, items purchased, prices purchases, venders visited, venders from who product purchased. The received data is store in memory and may be used to provide various statistical information such as the average income, age data, gender breakdown, other demographical information, and other desirable statistical information as is well-known in the art. As discussed, not all persons will carry the device 101 or permit collection of the statistical data— even if the above described incentives are provided. Thus, in some instances it may be desirable or necessary to extrapolate information from the collected data. For example, if fifty percent of the persons in a given geographical area have the device 101 and permit the collection of data, then the estimated number of people in the area will be twice the number indicated by the collected data. Similar extrapolation and other statistical techniques well-known in the art can be used to provide other estimates such as to income, age data, gender, other demographical information, and other desirable statistical information.

The use in this technique can be used, for example, to determine how many users are traveling on a particular road, street, or highway or within a particular geographical area (e.g., a store, restaurant, facility, etc.). As with many such applications of this type for the present invention, the collected data is preferably extrapolated (because not all drivers have the device 101 or permit collection of the data) to estimate the number of drivers on the particular thoroughfare or used in combination with other data to arrive at the estimate. Thus, the data can used to determine the relative capacity of the thoroughfare as well as how fast the traffic is moving and need not utilize or request user specific data.

The data collection computer system may also act as a VCS that supplies information based on the collected data such as the number of people within the vender store location, the number of a particular type of product sold (and demographical data of the purchasers), number of products purchased by a users, and other vender collectable data. In addition, incentives, as described above, may also be provided to those users who permit the collection of such data.

Figure 3:
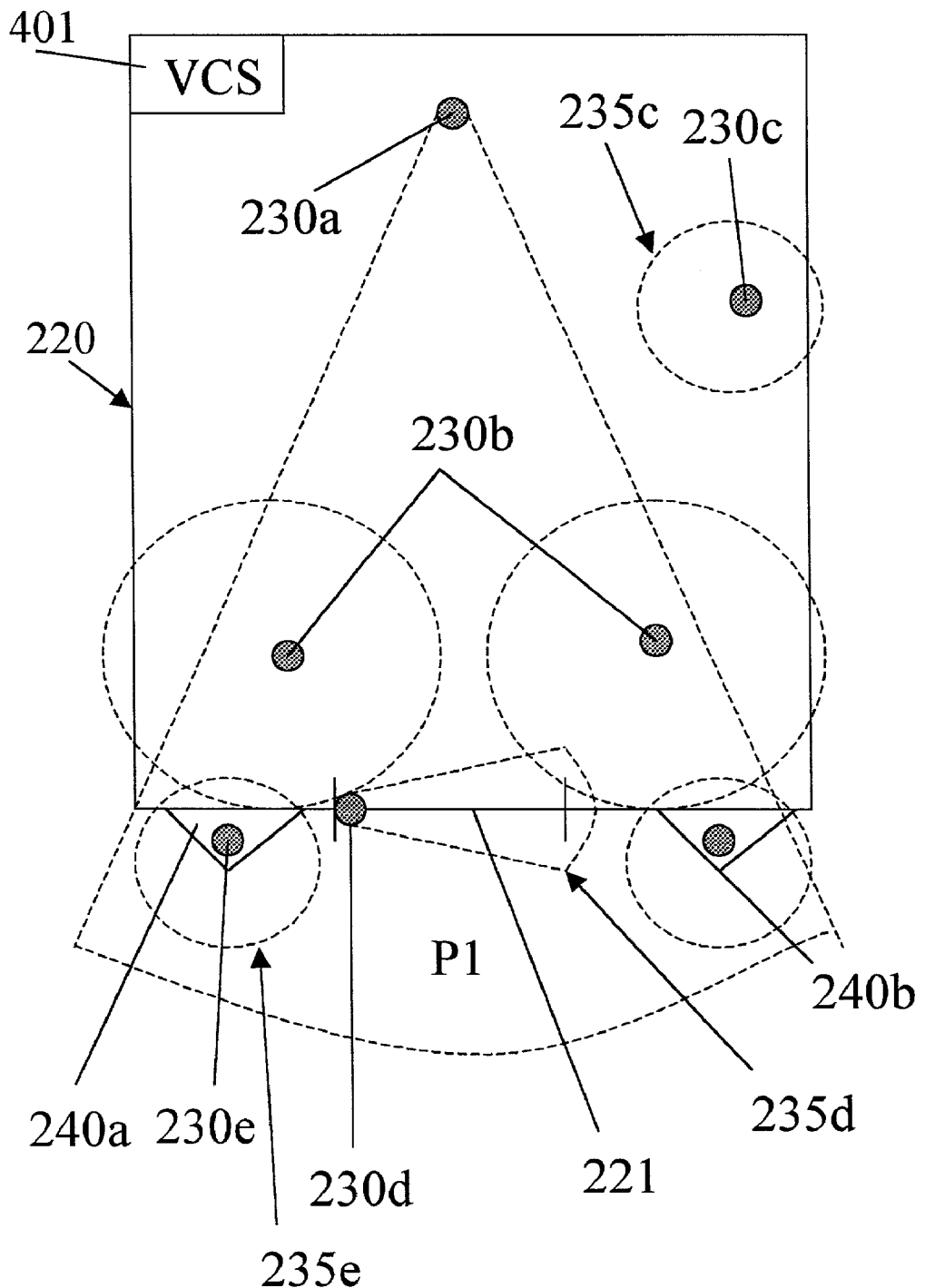
FIG. 3 is a schematical representation of an example vender facility for use with a method, system, apparatus, and computer program product of the present invention.

Advertisements may also be presented to the user by a fixed presentation device for audio and/or visual presentation to the user. The advertisement can be selected and transmitted, as discussed herein, from the ACS or vender computer system (VCS) to the fixed presentation device or selected and presented by the fixed presentation device itself, which includes, or forms part, of a computer system. Referring to FIG. 3, as the user approaches a vender's location in a shopping complex, the VCS, through an access point 230*a* capable of communicating with devices positioned near the front of the store, establishes a communication link with the user's device 101. Upon retrieving select CCD data, the VCS selects an advertisement according to one more of the methods described herein. The advertisement is transmitted (or played) and visually and/or audibly presented to the user on a video and/or audio output device 240*a-b* (e.g., television with speakers) at the front of the store so that the user can see and/or hear the advertisement without entering the store.

The advertisement, in this and other applications described herein, is preferably customized for the user and includes at least some of the user's CCD (user information) and/or vender stored user information.

For example, the advertisement preferably addresses the user by name by audibly stating, for example, "Good morning Mr. Johnson. Our dress slacks, which you previously purchased, are now on sale and your size is available. Please come in and have a free cup of coffee. In addition, as preferred customer we're giving you a coupon for an extra ten percent off the sale price." Simultaneous with the audio presentation, the display presents a visual presentation of the slacks the user previously purchased and which are on sale.

This fixed presentation device system may be especially suitable for use with a device 101 of the present invention that is embodied as a radio frequency identification (RFID) tag, which may take the form of a Smart Card and/or be attached to the user's key chain, belt, a clothing pin, or other easily carried form. The high frequency RFID systems (850 MHz to 950 MHz and 2.4 GHz to 2.5 GHz) offer transmission ranges of more than 90 feet. Thus, the VCS system transmits an rf signal from access point 230*e*, which is received by the user device 101 embodied as an rf tag. In response, the RFID tag transmits the identification information through access point 230*e* to the VCS or other requesting system, which then retrieves Vender Stored User Information (VSUI) if any, selects an advertisement using one or more of the methods described herein, presents the advertisement to the carrier of the RFID tag via fixed presentation device 240*a*, and/or performs other functions. The RFID tag may be passive or active depending on the implementation of the system as is known in the art. Means for tracking the location of a moving RFID tag, such as one embodying the present invention, are well-known in the art and therefore, not repeated here. However, those skilled in the art will recognize that an RFID tag embodying a device 101 of the present invention can be used to determine the location of the user continuously, or at particular locations, throughout a facility, arena, shopping complex or other area.

Advertisements presented at fixed presentation devices may also be selected by selecting the most suitable advertisement for presentation to a plurality of users. For example, if the advertisement selecting computer system (e.g. the VCS or ACS) determines that sixty percent of the persons who can view the advertisement are above thirty years of age (based on retrieved CCD data), the advertisement selecting computer system will select an advertisement with targeting criteria that is appropriate for that age group. The advertisement selecting computer system preferably selects the advertisement based on the CCD, temporal data, location data, transmission value, and/or based on data of persons who can view (see and/or hear) the presentation device, who are likely to view the presentation device (e.g., are within a predetermined range, not involved in other activities, have an unobstructed view, and/or other characteristics), who have shown an interest in viewing the advertisement, and/or based characteristic(s) of the persons or surroundings.

In addition, the number of advertisements and timing of the advertisement in all of the applications described herein— start, stop, and duration time—may also be based on CCD, temporal data, location data, whether they can view (see and/or hear) the presentation device, for how long they are likely to view the presentation device (e.g., are within a predetermined range, not involved in other activities, have an unobstructed view, and/or other characteristics), whether they have shown an interest in viewing the advertisement, transmission value, and/or based on some other activity, location, or characteristic of the person(s) or surroundings.

When the user views an advertisement (whether or not presented on a fixed presentation device 240*a*), the user can elect to receive additional information either from a fixed presentation device or another remote device. For example, if, in the above example, Mr. Johnson wishes to obtain more information, he can transmit, for example, a request to determine whether a particular color is available in his size. In response, the VCS transmits information for determining whether Mr. Johnson's size is available in the particular color, which is received and presented to the user.

Likewise, the fixed presentation device 240 might include notice of a coupon. The user can request electronic transmission or printing of the coupon by transmitting a request to the VCS (or ACS). Transmitting the request can entail simply actuating an actuator (e.g., a button) on the device, which establishes a Bluetooth communication link (via access point 230e) in which the coupon is automatically transmitted. Preferably, for those embodiments of the device 101 that include a display, the display includes information (e.g., information relating to the advertisement) regarding how to make the request.

In addition, some presentation devices (or VCSs) might transmit a request to download the coupon and the user simply provides an input to the device 101 as to whether the coupon should be accepted and stored. Similarly, some advertisements may include instructions for obtaining additional information (such as a coupon), which may include establishing a communication link with a predetermined destination (e.g., calling a phone number), or providing a password (e.g., which may be provided to enter a facility, used as a coupon, or for some other advertised activity).

For those embodiments of the present invention that are an RFID tag, the fixed presentation device 240 (or other external input device) may include a user input device (e.g., a keyboard, mouse, and/or microphone with appropriate voice recognition software) can be used by the user—as instructed by the presentation device 240—to make the request such as retrieving the additional information, making a purchase, or performing some other action relating to the advertisement or advertised vender.

Finally, with the continuous or frequent receipt of advertisements, the memory of the device is likely to fill to capacity. Consequently, the present invention includes programming (which preferably forms part of the data management module) that provides a means for automatically managing the amount of memory available for storing advertising. Specifically, the device 101 includes programming that automatically deletes advertisements after a predetermined time period and/or when a predetermined amount of memory has been filled with advertisements in which case the oldest ads are deleted first. In addition, if the network advertising system is so designed, the device 101 deletes those advertisements that have not been refreshed within a predetermined time period. For example, venders within communication range (e.g., via a WLAN access point) periodically retransmit their advertisement and when the advertisement is not received for the predetermined time period, the device 101 deletes the ad. The vender may not retransmit the advertisement because the device 101 is out of communication range, the vender has set a maximum predetermined number of retransmissions for the advertisement or user, the vender has set a maximum amount of advertising resources (e.g., bid prices, bandwidth, or other resource) to be used for a user, and/or some other reason.

In addition, advertisement may also be deleted based on the location of the user so that advertisements for venders the furthest away are deleted first and/or advertisements for venders (or products) that offered at locations greater than a predetermined distance are deleted, or in a area (e.g., a shopping complex) in which the device 101 is no longer present or communicating. Location information of the vender associated with an advertisement may be included with the transmitted advertisement, or transmitted separately such as in map data.

Advertisements and or other transmissions may also be sent by other user devices as well and based on location data, temporal data, CCD, ad targeting criteria, and transmission value and may also include incentives and result in an incentive transaction. In addition, advertisements selected based on location data, CCD (including activities of the user), temporal data, and/or ad targeting criteria may be transmitted to the user at a later time or for presentation at a later time. For example, based on the location of a user in a shopping complex (standing near a vender for a predetermined time period), casino (e.g. standing near a gaming table for a predetermined time period), other facility, or area the ACS or VCS can transmit (e.g., via email) the selected advertisement for later receipt and, in the case of a coupon, use during a subsequent visit to the area.

Vender Information

The device 101 also includes software for finding a product within a vender location within a shopping mall. To do so, the device 101 transmits a request for the product or vender to the ACS (or other remote computer with access to the information) and receives a response with the requested information if the vender or product is present. In addition or alternately, the device 101 transmits a request for the product or vender to the venders that are within the shopping complex and receives responses with the requested information if the vender is present or if from the venders having the product or other responsive information.

In addition, at the request of the user, the device 101 can transmit a list of items desired by the user to the vender computer system. In response, the vender computer system transmits an associated location for each item on the list (such as an aisle location) and optionally a price for each item and a total price for the list. The user can then use the device 101 to scan the bar code (or receive it through an rf ping) on each product as the user places the product in the cart. As the user leaves the vender store location (for example, when crossing the outgoing door threshold), the device 101 exchanges product and payment information with the vender computer system to facilitate payment for the products. As an alternative, the user can instruct the device 101 (e.g. by a voice input) to transmit the list of products to the vender prior to arriving. Vender personnel can then gather the products and prepare them for pick-up by the user or delivery.

The user can also instruct the device 101 (e.g. by a voice input) to transmit a request for other vender information from a remote computer system (which may or may not be the vender computer system), prior to arriving at a vender location. For example, the user can instruct the device 101 to request information relating to the volume of business currently present at the vender. In response, the computer system transmits responsive information such as the wait time for service or entry, the number of people present at (and/or inside) the vender store location, the percentage of maximum allowable number of patrons that are present, the average, mean, or estimated wait time to check out (e.g., purchase an product), the availability or probability of obtaining service (e.g., seating in a restaurant), the number of parties already waiting to be serviced (e.g., to be seated or to purchase a product), an audio or video data transmission of a pertinent portion of the vender location (e.g., the line to be seated), and/or the availability of a particular product. The vender information is preferably derived from conventional monitoring equipment, the point of sale system, and/or supplied to the remote computer system (such as the vender compute system) by a video camera or by vender personnel as needed. In response to receiving the vender information (or upon receiving satisfactory vender information), the user may instruct the device 101 to transmit a request for a product, a reservation, or other service.

Vender Stored User Information

Figure 8:
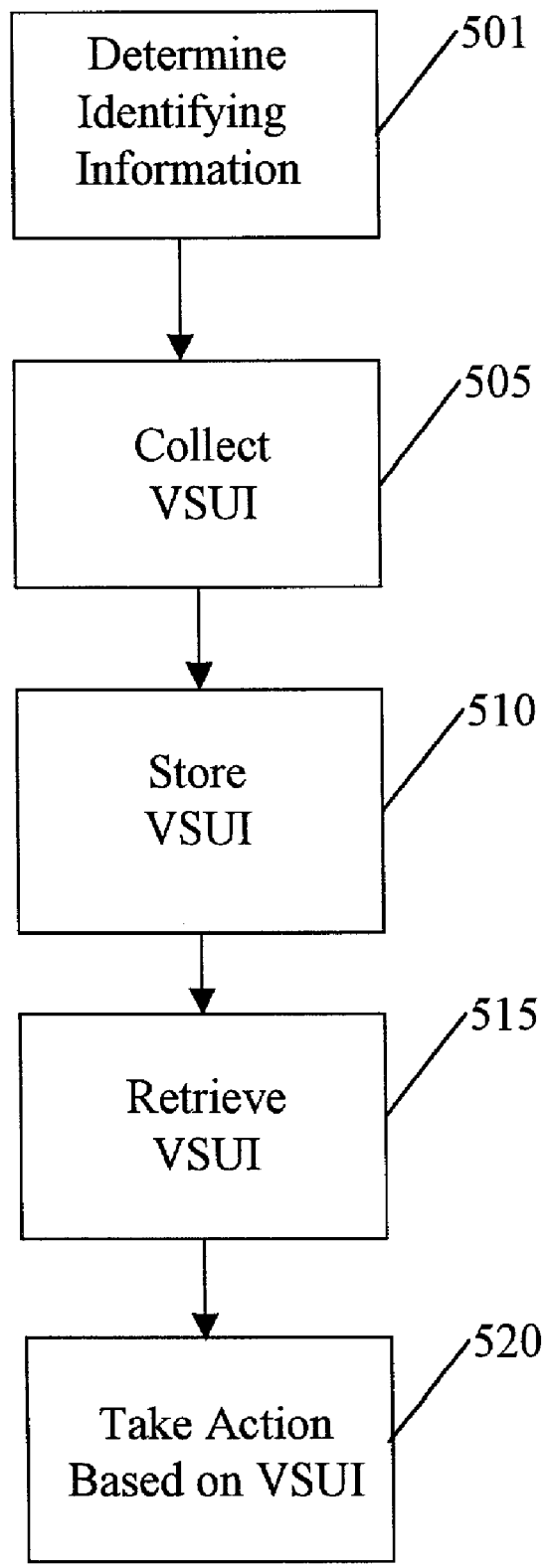
FIG. 8 is a data flow diagram of the method steps for implementing an example embodiment of a system, method, apparatus, and computer program product of the present invention for providing mobile advertising.
Figure 9:
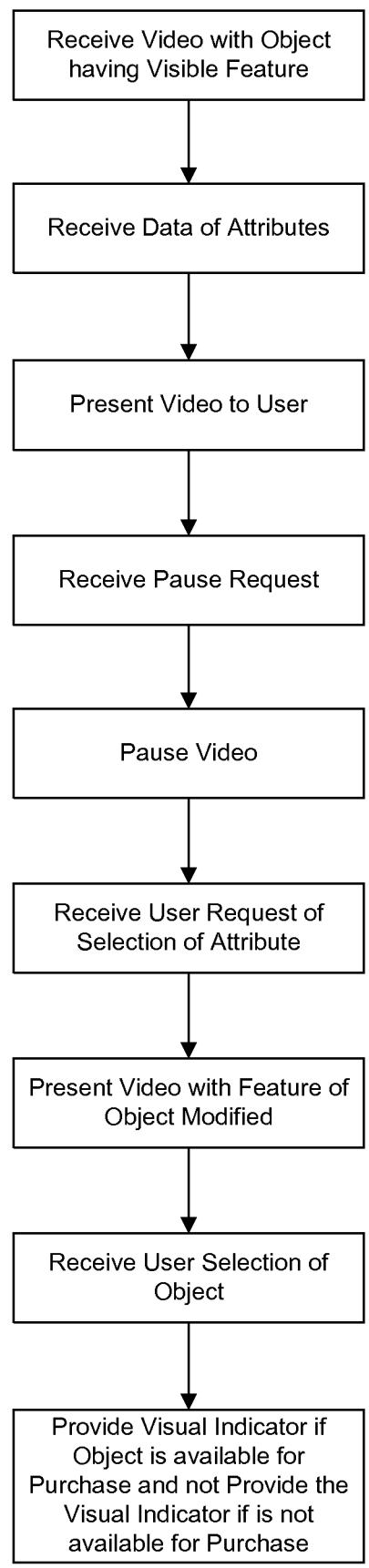
FIG. 9 is a flow diagram of an example embodiment of the present invention.

In addition to the above, user or device specific information (vender stored user information or VSUI) can be stored in the VCS, the ACS, in another remote computer system, on the device, or some combination thereof. After the user returns to a particular location, the VCS can identify the user (or device) and retrieve the VSUI for that user (or device). Referring to FIG. 8, the steps include determining the identifying information at step 501, collecting the VSUI at step 505, and storing collected VSUI at step 510. At a later time (e.g., when the user returns to the location), the steps include determining the identifying information at step 501, retrieving the VSUI for that user (or device) at step 515 and taking action based on the retrieved VSUI at step 520. The action taken at step 520 may include any desirable action such as selecting a particular advertisement as is discussed in more detail below.

In the preferred embodiment, the device and/or user is identified by a unique identifier already stored in the device 101 such as the devices telephone number, user's home telephone number, IP address, social security number, email address, and/or other identifying information. In addition, identification of the user and device 101 may be accomplished through device identifying information (e.g., a device serial number), device (or memory) manufacture make, and/or serial number, and where multiple users use the same device 101 (e.g., employees), user distinguishing information (e.g., the first name of the user or employee identification number) that allows the computer to distinguish between users. Information identifying the particular user, from a plurality of users, is preferably stored in memory and determined based on a username supplied by the particular user when the user turns on the device 101 or otherwise supplies it. In the preferred, there is no need to store data on the device 101 and the VCS simply retrieves information sufficient to identify the user from a storage device. Determination of identification information may or may not include information for identifying the user by name, but allows the VCS to store and retrieve data about the user and/or device as described in more detail below.

At step 501, a communication link is established between the device 101 and the VCS and the VCS and identifying information is requested by the VCS and transmitted by the device 101 in response to the request. Alternately, establishing the link may provide sufficient identifying information to the VCS to alleviate the need to request identifying information (e.g., device identifying may be supplied when the communication link is established in the form of a Global ID other unique device identifying information).

In an alternate embodiment, a remote computer such as a VCS or ACS may request to store, and store data on the device. The request to store data (or for identifying information) can be included with a request to establish a communication link with the user device, when the user enters a geographical area (such as inside a store), when the user enters communication range of the VCS via a particular network (e.g., a WLAN), at the occurrence of an event (e.g., at purchase of an product from a vender), or any other time or place desirable.

For example, after the user enters the vender store location, and a communication link is established between the vender's computer system (e.g., the point of sale device) and the user's device 101 (e.g., via a WLAN), the vender's computer system transmits a request to store the VSUI in the memory of the device 101 (or a request for identifying information). The data that the vender requests to be stored preferably includes identifying information that is unique for that device 101 (device identifying information) and/or user (user identifying information) such as a unique number or code and can therefore be retrieved at a later time to identify the return of that device 101 and/or user and to retrieve VSUI data stored elsewhere. The VSUI is stored on the device 101 with a file name that is preferably unique to that vender (e.g., Acme Clothing Store), but may be unique to a particular company (e.g., a store chain or franchise such as McDonalds®, Giant®, Safeway®, ABC Theaters, etc.), to that type of vender (e.g., restaurants, bank, clothing, shoe, sporting goods, etc.), shopping complex, product, geographical area (e.g., an auction site, county, etc.), to that user, to that device, and/or a particular service company or manufacturer (e.g., Nike®, Motorola®, Cingular®, etc.). Thus, one VCS may store multiple sets of data for any of the preceding identified categories of data or other data in one or more data files. Preferably, each file for a particular type of data is stored on each device 101 with the same (e.g., vendername.dat) or similar file name (e.g., vendernameXXXXXXXX.dat with the "X"s representing device or user specific data) so that the VCS, other VCSs, or ACS may identify the file and retrieve the data (e.g., when a subsequent communication link is established during, for example, a subsequent visit).

Once the identifying information is determined by either storing it on the device 101 or by retrieving it from the device 101 at step 501, the VCS collects VSUI based on activities of the user at step 505. The VCS stores information that the VCS collects in the VCS memory (or memory of another remote computer system) at step 510. The VSUI is stored in a manner to allow the VCS to retrieve all of the VSUI when the identifying information is known. The VSUI is preferably stored in a database that is searchable and/or indexed by the identifying information.

The vender stored user information (VSUI) may include any data that the VCS can collect such as information about the user and/or device 101 such as information of the previous visit(s) (e.g., the date, time, day of the week, products purchased, amount purchased, etc.), advertisements that the user has responded to and/or viewed, offers that the user has responded to, format for communicating with the device, location data, any CCD, user response information, and/or any temporal data. In addition, the VSUI may include vender account information such the account number, the amount of credit the user has with the vender, and/or the balance of any account the user has with the vender. The data is preferably stored in a database of a central computer system (which may be remote) and may also, or instead, be stored in the memory of the VCS.

In addition or instead of the identifying information, the VSUI stored on the device 101 may also include other information about the user and/or device 101 such as information of the previous visit(s)(e.g., the date, time, day of the week, products purchased, amount purchased, etc.), payment information (payment account information such as credit card number(s), expiration date(s), and billing address(es), etc.) products purchased, format for communicating with the device, location data, vender account information such the account number, the amount of credit the user has with the vender, the balance of any account the user has with the vender any CCD, user response information, and/or any ad targeting data.

Prior to making a request to store and/or storing the VSUI on the device 101, the VCS transmits a request for a file with a file name that, if present on the device 101, would have the desired data (e.g., a file with a name of vender.dat). If no file with the requested filename is present, the device 101 transmits a response with information indicating that the requested file is not present. From the device response, the VCS can determined that new VSUI must be stored on the device 101 and proceeds to transmit a request to store VSUI on the device 101 along with the file name in which the data should be stored. As discussed, the VSUI stored on the device 101 preferably includes identifying information to identify that user and/or device.

If the file (e.g., vender.dat) exists, the device 101 transmits the data file, or a requested portion thereof, which preferably includes the identifying information, to the VCS. After receiving the information, the VCS transmits a request for the VSUI associated with that user and/or device 101 from the central computer system or, depending on the configuration of the embodiment, retrieves it from its own memory.

If the above embodiment in which no data is stored on the device 101 is employed, the received identifying information is likewise transmitted in a request to retrieve data associated with the identifying information. If no VSUI is present, the VCS determines that a new record corresponding to the received identifying information must be created to store VSUI for the user/device.

At step 520, based, at least in part, on the VSUI, the VCS or ACS performs an action such as selecting and transmitting advertisement to a particular user or for presentation on a nearby presentation device (e.g., computer monitor and speakers), which may include a coupon, refund, rebate and/or other offer (e.g., an incentive) to selected users, notifying vender personnel that a preferred customer has arrived. In addition, at step 520 the VCS can supply vender personnel with VSUI or information based on the VSUI (e.g., information of what the products the user previously purchased, is likely to purchased, or that the user has indicated the user likes (e.g., in CCD or stated previously to vender personnel)), direct personnel to point out or offer for sale a particular product, and/or otherwise present advertising, communicate with vender personnel, offer products, or offer incentives to select users based, at least in part, on VSUI.

As discussed, if no data corresponding to the user and/or device 101 is present in memory, (when using either embodiment), it is determined by the VCS that the user has not been in communication with the VCS before and that a new data record must be established for the user and/or device 101. Some users may not have any VSUI data stored because they have elected not to supply any (or very little), because they are a new visitor, or for. other reasons. However, if there is little or no VSUI for a particular user, the VCS can present advertising, communicate with vender personnel, offer products, or offer incentives to select users (as described above) based, at least in part, on the VSUI, of other users. In other words, the VSUI, location data, and/or temporal data of a plurality of users may constitute a VSUI database, from which statistical processing can reveal trends, patterns, profiles, probabilities and other data for selecting advertising, communicating with vender personnel, offering products, and/or offering incentives to select users. For example, if only the user's address is known, the VCS may select advertisements for that user that have been successful, or which are more likely to be successful, for users living in the user's area (e.g., city, neighborhood, street, etc.). Likewise, the age and home address of the user may indicate that the user is likely to become a repeat customer and, consequently, the VCS transmits advertisements with user incentives, whereas users who are not likely to become a repeat customer do not receive such incentives.

Regardless of the means for identifying the user and/or device, the VCS collects new VSUI and stores the new VSUI in memory, which is preferably in a remote central computer system. As discussed, the VSUI may include any data the VCS can collect such as any information about of the visit(s) (e.g., the date, time, day of the week, products purchased, amount purchased, etc.), ads that the user has responded to, offers that the user has responded to, format for communicating with the device, CCD (such as new or revised CCD), location data, and/or temporal data. In addition, the VSUI may update vender account information such as the account identifying information, the amount of credit the user has with vender, and/or the balance of any account the user has with the vender.

FIG. 3 is schematical representation of a vender store location for providing the mobile e-commerce according to the present invention. The vender store location 220 includes an entrance 221, a VCS 401*a,* and a plurality of access points 230*a-e* for providing a WLAN, with each having an associated communication range 235*a-e.* Each of the access points 230*a-e* is communicatively coupled to the VCS via a wired connection (although a wireless connection would work equally as well).

Each access point 230*a-e* of this example has a separate network address so that data received from the user device 101 and provided to the VCS is determined by the VCS 401 to have come from a particular AP 230. Thus, knowing the AP 230 with which the device 101 is communicating, and the range of the AP 230 (if desired or necessary), the VCS 401 can determine the approximate location of the user in the vender store location 220. In addition, as the device 101 communicates through a sequence of APs 230*a-e,* the VCS can determine a plurality of locations for the user and, therefore, determine an anticipated location for the user carrying the device 101. Thus, an action, such as the selection of an advertisement based on location may be a selection based on the user's current location or anticipated location.

In this example embodiment, access point 230*c* is the access point located at the point of sale (e.g., where personnel remove tags), but any or all of the access points could be used to complete the commercial transaction as described herein (e.g., exchange payment information).

After the VCS 401 identifies the user (or device) at step 501, the VSUI is retrieved at step 515, the appropriate user transmission(s) is selected at step 520, preferably based at least in part, on the VSUI, and transmitted. While the user is within transmission range of the VCS 401, the VCS collects (step 505) and stores additional VSUI (step 510), and may transmit additional user transmissions to the user or store personnel (step 520) based on VSUI and/or on the activities of the user while in the store (e.g., the user's location, user's repeated proximity to a location, user's duration at a location in the store, user's duration in the store, the user's purchase of (or intent to purchase) an product, and/or the user's time waiting to checkout, etc.).

Select or all of the collected VSUI is stored locally and transmitted (as desired by the vender) to a central computer system at the end of the user's visit. Preferably, the VCS periodically attempts communication with the user's device 101 (e.g., through numerous vender located LAN nodes) and determines the end of the user visit when a plurality (e.g., three) of attempts are unsuccessful. However, the VCS might also receive information from a sensing device that determines when the user has left the vender store location such as a ACS (which determines the user is in a different store or otherwise outside the vender store location), an entry way monitor (e.g., a short range PAN node) such as access point 230*d* that senses when the device 101 passes through the entry way of the vender store location (e.g., by communicating with the device 101 as it passes through communication zone 235*d* by requesting and receiving the identifying information). The sensing device might also be used to determine when a user enters the vender store location and thereby request and receive the identifying information from the device 101.

When stored in a database of a central computer system, other venders of the same company (e.g., a store chain or franchise), of the same type of vender (e.g., restaurants, bank, clothing, shoe, sporting goods, etc.), in the same shopping complex, in the same geographical area (e.g., an auction site, county, etc.), and/or offering products of the same service company or manufacturer (e.g., Nike®, Motorola®, Cingular®, etc.) may retrieve the VSUI data, request information sufficient for selecting transmissions directed to the user (e.g., transmissions with ads), and/or request that the central computer system select an advertisement (or type of advertisement) for transmission or transmit a transmission itself.

Instead of the more fully featured embodiment of the present invention, the storage of VSUI data may be accomplished through the use of a radio frequency (rf) tag or radio frequency identification (RFID) (which may be powered or not powered). For example, the RFID includes user identifying information (e.g., a unique code) stored therein and transmits the identifying information in response to an rf ping from a remote device that is communicatively coupled to the VCS. Upon receiving the user identifying information, the VCS transmits a request for (or retrieves from memory) the VSUI data associated with the user who has been issued the RFID with the received identifying information. In addition, the RFID may be a Smart Card, which can store some VSUI such as account information as described above. The RFID can also be used to determine the location of the user according to the access point location method described herein. Therefore, many of the features described with respect to VSUI can be implemented with the use of a Smart Card.

The RFID can take the form of a generic credit card (e.g., a MasterCard®), a vender credit card (e.g., a Sears® credit card), or a discount card, which thereby provides an incentive for the user to carry the card when visiting the vender. Alternately, the user may have an RFID in the form of an integrated circuit implanted under the skin, which contains user identifying information, such as, or similar to, the Verichip® manufactured by Applied Digital Solutions of Palm Beach, Fla.

Localized Auction

Another example application of the device 101 of the present invention is for facilitating an auction. In a traditional Internet auction, sellers offer and sell their products across a country or nation. After the sale, the seller must mail or ship the product to the buyer and coordinate secure payment from the buyer and rarely have an opportunity to physically inspect the product for sale. In contrast, the present invention facilitates a localized auction in which the products offered for sale and the buyers are within a common or localized area. Thus, instead of having to mail or ship the product, the buyer can inspect it, collect it and, if necessary, provide payment for the product. The common or localized area of the localized auction ensures that the products offered for sale and the buyers are the within predetermined distance of each and, preferably, within a convenient distance for inspecting and collecting the product. In addition or alternately, the localized area may also ensure (in some auctions) that the buyers and sellers are within predetermined distance of each and, preferably, within a convenient distance for inspecting and collecting the product and, if desired, for providing payment for the product to the seller. Preferably, the localized area of the auction is defined as an area less than one square mile such as within a facility in which the products are offered, within a city block, on the grounds of an auction site, within communication of a WLAN that is used to facilitate the auction, and/or any area that permits the buyers to conveniently inspect and collect the products for sale (e.g., walking to the products). However, the localized area may be distributed with a plurality of users offering their products for auction from their respective homes. The localized area may also be fixed, as is conventional, or dynamic (changing in location and/or size over time). In addition, the localized area might be defined as a larger geographical area such as a county, a city, a state, or multi-state area in which users can drive via automobile to inspect and/or collect the products and is preferably less than a four hundred square miles (e.g., a twenty mile by twenty mile area), and more preferably less than one hundred square miles (e.g., a ten mile by ten mile area), and still more preferably less than twenty-five miles (e.g., a five mile by five mile area).

The auction preferably requires payment to enter the auction, which is preferably provided wirelessly as described above through the wireless exchange of payment information by the commerce module. In response to payment, at the request of the user, or upon entering the auction, the area computer system (ACS) facilitating the auction transmits bidder identifying information (e.g., a bidder number or name) to the device. The devices stores the received bidder identifying information and uses it when making bids so that the ACS (or other devices/computers) can identify the bidder. Alternately, the ACS may request, and the device 101 transmits, in response to the request, device and/or user identifying information such as the device ID or telephone number, which is thereafter used to identify the bidder. In addition, the device 101 may establish a credit line or provide information sufficient to allow the ACS to determine that the user has access to sufficient assets to satisfy (i.e., pay for) a successful bid at a given amount. Alternately, this financial information may be provided after the user places a bid.

In addition, as users enter an auction area, the user's device 101 transmits information relating to products the user wishes to sell at the auction (product information) if any, which may include a title, a name, a description, digital photographs, a minimum price, acceptable methods of payment, seller information, delivery information, a final bid time, a location (e.g., within the area) at which prospective buyers can inspect the product, and other information. The ACS receives and stores the product information and transmits the information to other users present at (or remote from) the facility. Users may elect to receive information about all products for sale, only certain types of products, and/or specific products and supplies the data to the device, which transmits the data to the ACS. The ACS stores and uses the data to determine when and what information is to be transmitted to each user. Users who receive the product information and who are remote from the facility can then elect to place bids remotely and travel to the auction area (e.g., to see the product or if they are the successful bidder to obtain the product).

User devices 101 also transmit bids to the ACS, which receives and stores each the bid and associated bidder identifying information (e.g., the user's telephone), and, in response, transmits information of the new highest bid to all the devices of all users who have previously bid on the product. In addition, the ACS transmits highest bid information and product information to users as they come within a predetermined distance of the location of the product for sale (which is preferably supplied by a WLAN). Users may also program their devices to incrementally outbid the highest bid for a particular product by a predetermined margin starting at a particular time and stopping when at a maximum bid and/or time is reached.

As discussed, prior to accepting a bid the ACS preferably receives payment information from the prospective buyer (the bidder) and confirms that the bidder has access to sufficient financial resources to make payment at the bid amount if the bidder's bid is successful and—if required by the seller—according to the seller's payment criteria (e.g., acceptable payment account). Confirmation of financial resources may be performed in any suitable manner, as discussed above with respect to the commerce module, such as sending a request to a remote computer system representing the payment account. Methods of confirming financial resources are well known in the art (such as that a credit card holder has sufficient credit prior to purchasing gas or checking into a hotel room) and are therefore not repeated in detail here.

If the bidder does not have sufficient resources to make payment for the bidder's bid amount, the ACS rejects the bid and transmits a notification of such to the bidder. If the bidder does have sufficient resources, the ACS preferably debits the payment account for the amount of the bid until the bidder is out bid at which time the ACS credits the payment account.

At the end of the bidding process the ACS notifies the purchaser that he or she was the successful bidder and notifies the seller of the identity of the buyer (e.g., by supplying the telephone number and name), the selling price and other information. The ACS may also exchange the payment information of the bidder with the seller by crediting the seller with the amount of the successful bid and which was previously debited from the bidder's payment account. Alternately, payment exchange data is exchanged between the buyer's and seller' devices. In either event, the transaction is completed quickly, may be paperless, and the seller need not fear that payment will not be received.

While the above example embodiment and application has been described in the context of an auction, the present invention is equally applicable for facilitating a reverse auction in which bids are placed lower and lower to sell a service or product to one or a group of purchasers.

In addition, while the above example embodiment and application (auction and reverse auction) are described as being used in a facility, the present invention could be used in a much greater geographical area such as within a city block, a county, or city. Furthermore, while the above example embodiment and application employs an ACS, the users' devices could perform some or all of the functions described above as being performed by the ACS. In addition, portions of this and other embodiments herein may be applicable to facilitating transactions at flea markets, yard sales, estate sales, and traditional auctions (in which products are auctioned off by an auctioneer sequentially).

Establishing Credit

Another application for the present invention is establishing credit with a vender, merchant, or financial service provider. More particularly, the device 101 transmits the user's information necessary for completing the credit application to a remote computer system (e.g., the VCS). The credit information is preferably transmitted in response to a request from the remote computer system, which requests the specific data (e.g., a portion or all of the CCD). In response to the request, the device 101 prompts the user for permission to respond and, provided permission is granted with a user input, retrieves the data (e.g., preferably stored as CCD) from memory for transmission. The credit information preferably includes the user's name, birth date, address, social security number, income, and/or other relevant data.

Upon receiving satisfactory credit information, the remote computer system may create a credit line for the user. Whether the credit information is satisfactory or not may be determined by the remote computer itself (e.g., based on the income and/or other data) or by requesting additional information from a credit reporting computer system. To employ a credit reporting computer system to determine whether the credit information is satisfactory for providing credit, the remote computer system transmits a request for a credit score (or other data) for the user to a credit reporting computer system. The request includes the user information necessary for the request (e.g., the user's social number, birth date, name and information of the requestor) to receive a valid response. Upon receiving a credit score or other data, the received data is used to determine whether credit should be provided to the user, how much credit should be provided, the terms of any credit provided (e.g., the interest rate, monthly payment, payment schedule, duration of loan, etc.), the amount assets to which the user has access, and/or other determinations. Information of the credit established is preferably transmitted to the device 101 where it is presented to the user and stored as CCD.

Monitoring and Restricting Use

An authorized user may program the device 101 to monitor and/or restrict the use of the device 101 by one or more restricted users. For example, a parent may provide the child with a device 101 or share their device 101 with the child and program the device 101 to monitor and/or restrict the child's use of the device 101, for example, for communications including emails, telephone calls, instant messaging, and/or long distance telephone calls. The restrictions (or limitations) may be based on various characteristics of the communication such as when the communication is initiated, who (or what device) the communication is with, the duration of the communication, the cumulatively duration of communications (e.g., per day), the type of communication (personal video communication, telephone communication, SMS, email, fax, radio or TV, etc.), and/or other characteristics. The device 101 may also be programmed to monitor and restrict the use of the device 101 to engage in commercial exchanges (i.e., make purchases or sell items). For example, the restrictions may be based on various characteristics of the commercial exchange such as when the exchange (sale or purchase) takes place, where the exchange takes place, the value of the exchange (e.g., a maximum limit), the cumulative value of the exchanges for a given time period (e.g., for the month or day), the particular vender, the type of vender, the product, the type of product, and/or other characteristics. Thus, the restrictions are stored in the device 101 and prevent the device 101 from being used in commercial exchanges, communications or for other uses for which a restriction exists (i.e., stored in memory).

In addition, the device 101 may be programmed to monitor the location of the user carrying the device, which may include what facilities the user enters, the address(es) visited, what venders the user visits, etc. The location may then be periodically transmitted to a remote computer system or a location notification can be transmitted to a remote destination if the user enters a restricted location (a location defined by the authorized user as being a location that the user should not enter and/or a notification transmitted). The data, which may be longitude and latitude, is preferably cross-referenced to a street address and more preferably further cross-referenced to the tenant name, owner name, or vender name for the address. In addition or alternate thereto, name and/or address data may be transmitted to the device 101 as the user enters or approaches the location (e.g., from a VCS).

In addition, the device 101 can be programmed to monitor the user devices 101 that are nearby the user's device 101—i.e., within a predetermined distance such as within communication range (e.g., via a PAN or LAN) of the user's device 101. Information of the nearby user devices—including information of the user such as the user's name, age, address, occupation and other CCD—may be received as a result of a query as described above. The device 101 can be programmed to periodically (or upon the occurrence of an event) make the query requested by the authorized user.

Furthermore, an authorized user may monitor live use data from the device 101, which is the input to one or more of the input devices or output from one or more of the devices of the device. For example, the authorized user may request to monitor the input to video and/or audio inputs of the device. The authorized user receives a transmission from the device 101 with the video data and/or audio data captured by the video camera and/or microphone of the device 101. The authorized user may also elect to monitor the voice commands, all sides of a telephone conversation, information of manual inputs (e.g., key board strokes), location information, images displayed on the display of the device 101, communications transmitted and/or received, and any other data to which the CPU has access. The authorized user may elect to monitor all or any subset of such use data.

In addition, the use data may be monitored with or without the knowledge of the user. For example, the authorized user may program the device 101 to begin to transmit the desired use data to a predetermined destination beginning at a particular time or upon occurrence of a triggering event (and without the knowledge of the user). Alternately, the authorized user may remotely transmit a request for use data to the device 101, which includes information identifying the requester as an authorized user so that, if it so desired, the device 101 does not inform the user that the request is being made or that use data is being collected or transmitted. This feature is accomplished in this example embodiment by establishing a communication link with the device 101 by transmitting an authorized user request to a separate address (e.g., telephone number) for the device 101 that is used by authorized users to make such requests and perform other authorized user actions. Alternately, the feature can be accomplished by including additional information in the request packet that is interpreted by the device 101 as a request for a communication link by an authorized user and, optionally, about which the user should not be informed (so that the ringer does not ring). In either or another method, the authorized user is preferably prompted for an authorization password or for other information ensuring that the requester is authorized to perform the monitoring and/or impose restrictions. The authorized user can also program, or transmit a request to program the device 101 to collect and store the use data and to transmit the use data periodically, at a later time, and/or in response to occurrence of an event, as opposed to transmitting the data live. Thus, the authorized user can program the monitoring and restriction instructions remotely by establishing a communication link and transmitting an authorized user request or through voice commands (or manual input) prior to supplying the device 101 to the restricted user.

Imposition or removal of certain restrictions may also be dependent on the occurrence of an event such as the user arriving at a certain location, checking into a hotel, turning on the device, turning off the device, making a purchase, etc. This feature of the device 1 01 is also useful for employers to limit the use of the device 101 by the employer's employees.

The device 101 can store and transmit (immediately or at a later time) any activity or use of that the device 101 can monitor, such as the location of the device, communications, commercial exchanges, physiological sensed data, audible and visual inputs, and other inputs. The device 101 can be programmed to transmit the data to any remote computer system for storage, another device, a telephone, or a telephone message recording device. For example, when the user (e.g., a child) travels to a "restricted" area (e.g., a predetermined restaurant, any bar, a particular home, a predetermined address, and/or a vender or type of vender, etc.), the device 101 automatically establishes a voice communication link with a predetermined telephone number. After the communication link is established, the device 101 transmits a synthesized voice signal, for audible reception by the device 101 (e.g., a message machine) or person answering the telephone, that includes information that the user has entered a restricted area. Alternately, the device 101 may be programmed to transmit an email, a page, or other type of transmission that includes information that the user has entered a restricted area, attempted to use the device 101 in a restricted manner (a use for which a restriction has been programmed in the device), or has otherwise used, or attempted to use, the device 101 an unauthorized manner or in some unauthorized fashion. In addition, the programmed restrictions preclude the use of the device 101 in a restricted manner such as, for example, at a restricted location, for longer than a predetermined duration, for commercial exchanges greater than a predetermined value, for commercial exchanges at particular venders or types of venders, for commercial exchanges for particular products or types products, and/or in a manner that is inconstant with a stored restriction. The authorized user can also program the device 101 to inform the restricted user that a restriction has been placed on the requested action and that the user is not authorized to engage in the requested action.

Information of an attempted use for a restricted use (and/or non restricted uses) can be transmitted to the remote device immediately (at the time of the use), periodically, and/or at the request of another device 101 authorized to receive the stored data.

Thus, when the device 101 receives an input, which may be a user input as a request to perform an action, a transmission, or other data (such as location data), the programming of the device 101 determines whether the received data represents data to be monitored, a request for an action that is to be monitored or restricted, or data representing a triggering event. If the programming determines that the input is data to be monitored, a request for an action that is to be monitored or restricted, or data representing a triggering event, the device 101 monitors (stores, transmits, or both) the data, or prohibits (denies) the action according to the restriction and monitoring data stored in memory by the authorized user.

The user of a device 101 may also elect to provide remote computer systems (which may be other devices 101) with select device information. For example, upon request from a remote computer system, or periodically, the device 101 transmits information such as the user's destination, the user's location, the user's mobility (whether the user is in a vehicle of transportation or not), select CCD, nearby user device information, user profile data, and/or information relating to communications, commercial exchanges, audible and visual inputs, and other inputs of the device. The received information is stored for further processing and/or review.

Preferably, the device information is provided to the requesting remote computer system from the device 101. However, in alternate embodiments, the device 101 periodically (or in response to an event), transmits the data to a remote computer storage system (e.g., a web server) that stores the data. Other remote computer systems may retrieve the data from the remote computer storage system, which may be supplied to them in HTML or other suitable format. The user can also program the device 101 to transmit only selected information and to transmit different information to different requesters by inputting monitoring response instructions. If the information is being provided by a remote computer storage system, information sufficient to determine what information may be provided to what requesters (monitoring response instructions) is also provided to the remote computer storage system. The data may then be processed, for example, to map the location of the user over time.

As an example of the application, when the user is traveling in a vehicle and an incoming call is received, the device 101 responds to the call by transmitting the current location of the user, the previous locations of the user, the intended destinations of the user, and/or the anticipated arrival time at the intended destination(s) (which was previously stored in memory). The user can program the device 101 to respond by inputting monitoring response instructions. The monitoring response instructions may dictate that the device 101 respond in the above manner to all callers, only callers from select addresses (e.g., phone numbers), not respond to such calls at all and/or respond in this manner at certain times of the day or certain days. This application may be used by a parent (or employer) to determine the current and previous locations of a child (or employee), and to determine the person's expected arrival time at the intended destination (e.g., home, work).

In addition, at the request of the user, the device 101, as operated by its programming, informs the user when the user is not likely to at a predetermined destination prior to a predetermined time based on the user's current location, destination, the user's velocity (direction of travel and speed), and other factors (e.g., delays). In addition, the program operates the device 101 to periodically transmit a request for, and receive, information relating to traffic such as the location of delays, congestion back-ups, construction, accidents, and other relevant data that might impact the user's travel and/or arrival time. Upon receiving information that is likely to impact the user's travel time (e.g., when traveling a predetermined route), the device 101 also determines and informs the user of alternate routes that the user can travel in order to circumvent one or more delays.

While it is well known to forward calls received at a first telephone number to a second telephone number. The present invention also provides for emailing (or otherwise transmitting) information of the incoming communications, such as the callers telephone number, to the device 101 or a predetermined destination. Thus, a user can get notification of the calling phone number (which is collected via caller ID process) that calls the user's device 101. The phone number is transmitted in an email (or page) that is collectable from the called device 101 and also includes the date and time of the call and whether the caller left a voice mail, which is also preferably retrievable from the device 101. Thus, this feature may also be used by a parent (or employer) to monitor the source of incoming calls to the child (or employee). In addition, the device 101 can be programmed to receive emails (or otherwise transmit) information of the source of the incoming telephone calls to a remote system.

The device 101 also preferably includes programming for restricting the transmission of certain data based on input by an authorized user and/or manufacture provided restrictions. A transmission restriction can be associated with a directory (or folder), a file, an email, type of data, size of data file, or any other set of data. Transmission of data may be restricted based on the identity of the creator, the creating device, the data type, creation date/time, the transmission type (e.g., email, File Transfer Protocol, or other type), transmission time, destination (e.g., domain, IP address, telephone number, user, area code, exchange, or other address), transmitting device, transmitting user, destination device type (e.g., printer, device, computer system), communication link (e.g., wired, wireless, PAN, LAN, WAN), and/or any other criteria. For example, an employer may wish to restrict the transmission of certain (or all) company data by its employees. Thus, the employer may restrict transfer of data files (e.g., by email) to only email addresses with select domain names (e.g., the company's domain name).

Voice Controlled Input

The small size of handheld devices limits the selection of the available user inputs for selection and navigation of the available software. For example, browsing of the internet, which includes supplying information to forms and "clicking" on hyperlinks can be difficult without a keyboard or mouse. Voice inputs software, well-known in the art, allow input of data and commands to some applications (E.g., word processor applications) and allows the user to enter data into the address field of a conventional web browser. However, selecting a particular link on the web page through the use of a voice command can sometimes be more difficult. Thus, the present invention includes voice recognition software for supplying commands for navigation of the available software.

Often web pages employ the same text to identify multiple links and it is the surrounding text that allows the user to determine which link to select. The following is an example of a set of such links (the underlined words indicating a hyperlink):

1. To join our club, clickhere.
2. To buy a product, clickhere.
3. To log in, clickhere.

Each of the above links transmits a request for a different web page. If the user speaks a voice command such as "Go to click here," the voice command software may be unable to determine which web page, identified by the above "click here" links, the user wishes to transmit a request for retrieval. Thus, the present invention allows the user to more easily select items of interest, such as hyperlinks, and provide data.

In one embodiment of the voice command software, a user, viewing the above links, would speak a voice command such as "Go to click here." In response, the voice command software hi-lights the first link (starting from the top) that is displayed on the display that corresponds to the voice command (in this example, comprised of the words "click here"), which may or may not be the first link on the web page that corresponds to the voice command (i.e., comprised of the words "click here"). Thus, if the user has scrolled down so that the first sentence above (i.e., 1. "To join our club, clickhere.") is not visible on the display, the voice control command software highlights the "click here" found in the second sentence above (i.e., 2. To buy a product, clickhere.) provided it is visible on the display.

If the highlighted link is the link the user wishes to select (e.g., transmit a request for retrieval of the web page), the user then states another voice command such as "Jump." If the highlighted link is not the link the user wishes to select (e.g., transmit a request for retrieval of the web page), the user then states another selection command, such as "Next," which instructs the voice command software to highlight the next link (proceeding down the web page) that corresponds to the voice command (in this example, comprised of the words "click here"). Likewise, if the user states another selection command, such as "Previous," the voice command highlights the previous link (proceeding up the web page) that corresponds to the voice command (in this example, comprised of the words "click here"). To select the next or previous selection (e.g., a hyperlink), the voice command software may also need to scroll the document (e.g., web page) up or down to make the next or previous selection visible on the display. If the spoken selection that is the object of the command (e.g., the spoken hyperlink) is present only once on the display, the voice command software simply transmits a request for the document identified by the object (e.g., the hyperlink).

In addition or as alternative, the device 101 may include web page voice command priming software that annotates the web page to add identifying indicia to the page at all (or select) links or, alternately, overlays identifying indicia over all (or select) links displayed the display. For example, processing and annotation of the above sentences of a web page might result in the following:

1. To join our club, clickhere-A.
2. To buy a product, clickhere-B.
3. To log in, clickhere-C.

To select a link the user simply speaks the voice command, and the link followed by the identifying indicia (e.g., "Go to click here B"). In this embodiment, the identifying indicia are characters following the links, but the software might display the associated identifying indicia anywhere (e.g., above, before, below the link), in any manner (e.g., underlining, bolding, or highlighting each in a different color), and/or with any indicia (e.g., letters, numbers, symbols, etc.).

As another example, the software overlays identifying indicia over duplicative links displayed on the display to allow the user to distinguish the link through a voice command. The identifying indicia may be an opaque overlay and positioned near the link or semi-transparent and positioned near or directly over the link. Some overlays may be desirable for some applications because they can be constructed without modification of the underlying document as is well-known in the art.

The alternative embodiment is also more easily used to select a hyperlinked graphics, which may not have any text (and therefore no text for the user to read out loud as the object of a voice command). Preferably, the linked graphic is surrounded along its edge with a colored border. Alternately or in addition, an overlay (or inserted indicia) can be used that includes, for example, text corresponding to the text present in the "alt" attribute of the HTML image tag (<img).

The identifying indicia may be supplied for all the links, only those links that have the same text (or other visible image), or select links displayed and is preferably added to duplicative links and graphics. While this feature has been described in the context of hyper links on a web page, it is equally applicable for selecting a particular one, from a plurality of form fields, pull down menus, scroll boxes, text boxes, form buttons, radio buttons, check boxes, and other data fields or selectable items as will be evident to one skilled in the art. Furthermore, the voice command priming software—especially through the implementation of overlays—can be used for applications other than web browsers such as spreadsheets, word processors, communication applications (e.g., email clients), and database applications.

Automobile Interface

As discussed, the device 101 preferably communicates with the computer system of one or more automobiles for which the device 101 has the correct authentication information (e.g., security codes) to interface. Once linked, the device 101 can receive and transmit data to the automobile to monitor and request the following: remotely unlock or lock the doors, start the engine, turn off the engine, turn on or off the interior and exterior lights (including the headlight, parking, and/or emergency lights), turn on or off the stereo system, control the heating system, air cooling system, window defrosting system, seat heating system, side mirror defrosting system; open the trunk, and communicate with the computer system of the vehicle(s). In addition, the device 101 communicates to monitor the air bag system, temperature (interior and engine), speed, location, direction, fuel, and other status and diagnostic information. Thus, the vehicle's speed and/or directional information may be communicated to the device 101 to determine location information and/or the device could communicate with a location module in the vehicle to determine the vehicle location.

The vehicle may house one or more of the modules described herein for the device 101 and/or may perform the functions of one or more of the modules described herein. For example, the vehicle may include the GPS receiver and provide location information to the device. In addition, the vehicle may have transceivers and/or receivers (e.g., TV, radio, etc.) that form part of the communications module, and communicate transmissions through the transceivers and/or receivers with the device 101 via a PAN. Likewise, the display system of the vehicle, which preferably includes an in-dash flat panel display, may function as the display device for the device. Alternately or in addition thereto, the automobile system includes a heads up display, which are known in the art, that displays visual images onto the windshield of the automobile. The heads up display may be programmed to display on the drivers side only select data when the vehicle is moving (e.g., direction information such as arrows indicating where to turn) and other kinds of data (i.e., text, maps, emails, web pages, stock quotes, sports scores, etc.) only when the vehicle is not moving, moving below a predetermined speed, parked, or when the engine is turned off to thereby reduce the distractions to the driver when driving. Likewise, the vehicle may include a print device to which the device 101 may transmit data for printing.

Furthermore, a device 101 of the present invention may be integral to the vehicle (although it would not be a handheld device) and/or distributed therein. Thus, for example, a remote user (e.g., an authorized user) of the device 101 integrated into the vehicle can transmit a request to monitor live (or receive previously stored) inputs of a video camera capturing where the vehicle is being driven (i.e., capturing images in front of the vehicle) and/or capturing images of activities inside the vehicle. Likewise, the remote user could be notified, as discussed above, upon the occurrence of certain events such as the vehicle traveling above a speed limit, traveling above a predetermined speed, traveling to a restricted location, a vehicle failure (e.g., mechanical failure or running out of fuel), deployment of an airbag, and/or traveling out of a predetermined area. The remote user could also program restrictions to some of these events (e.g., to prevent the vehicle from traveling above a predetermined speed.) or prevent the purchase of certain products (e.g., products other than fuel).

To purchase fuel with such an integrated device, the user simply drives up to the fuel pump and the device 101 communicates with the access point or node of the fuel pump, which is preferably designed to only be able to communicate with a device that is within a predetermined distance of the fuel pump. The device 101 either integral to the automobile or carried by the user exchanges payment information and if desired, selects the fuel grade and/or the fuel amount. After the payment information is exchanged (or during the exchange), the user couples the appropriate fuel nozzle to the automobile fuel tank aperture and dispenses the fuel from the pump (and if not transmitted by the device 101 or if otherwise necessary selects the fuel grade and/or amount of fuel to be dispensed prior thereto). Thus, with the present invention there is no need to insert a credit card or debit card into the pump and provide associated user inputs (e.g., a pin number) and no need to wave a rf tag in front of the fuel pump as with prior art payment methods.

Multi-Computer Agents

Software programs or agents are often designed to perform periodic processing such as periodically searching for various web sites for data meeting a specific criteria such as a job posting (job opportunity) that satisfies the person's job requirements such as having a particular title, particular responsibilities, a minimum salary, a particular geographical region or regions, a particular work shift, a particular number of hours per week, and/or be offered by a particular employer or type of employer. Other agents may search for the product with the lowest price (e.g., the cheapest computer meeting given characteristics or the lowest airline ticket for a given destination and departure), the vender with the lowest price (e.g., a stereo), the availability of a particular product, etc., as described above As is known in the art, agents available for searching job postings are offered by some, but not all, of the web sites that serve job postings. In essence, the web server storage device receives and stores the user's search criteria for use by the agent in subsequent searches when the user returns to the web site or performs searches with the search criteria periodically. However, an agent of a particular web site is useless for searching other web sites. Thus, an agent must be created and stored for each web site for which the user wishes to perform searches and that offers agents. In addition, for those sites that do not offer agents, the user must repeatedly run the search by manually entering the search criteria.

The present invention overcomes these deficiencies by creating and storing an agent for communicating with multiple web sites and processing the retrieved data. Preferably, the web sites offering the desired services (e.g., job postings) and the format and protocol for communicating with the web sites is determined using Web services as described above, but may be determined through any suitable method. In a particular, in this example the computer program implementing the agent of the present invention receives and stores the search criteria and searches the appropriate service registry or registries to identify the service providers. Alternately, the user may supply the service providers. Once identified, a descriptor document of the Web service offered by each provider is retrieved from the service registry. The computer program then binds to the service provider and runs the Web service to periodically perform (or upon request by the user) the desired search or other action. In addition, data for communicating with service providers not found in a service registry (e.g., name/value pairs, format and protocol data, etc.) may be supplied by the user or vender, stored, retrieved, and used by the agent to communicate with such service providers. Thus, the search function of the agent of the present invention performs the functions of a plurality of agents and also the function periodically performed by the user.

In response to the transmission from the agent, the agent then receives data from one or more service providers and stores and processes the received data. The processing performed may include any desirable processing including sorting based on user supplied criteria such as date of entry of the data (e.g., date of posting of the job offer), price, location (e.g., the closest provider), or other data. The processing preferably also includes eliminating duplicate responses. For example, multiple service providers may respond with the same data such as the same job posting. Thus, the computer program compares the data received by each service provider and displays duplicative data only once.

Other processing may also include retrieving additional information such as the web page or email address of the employer (or vender) posting the job offer (or product) that meets specific criteria—criteria that may be different, and more narrow, than the original search criteria. Thus, the agent may open a new browser and transmit a request for the employer's home web page or a vender's web page relating to the product and subsequently display the received web page for the user. Alternately or in addition, the agent may search the job posting (or product data) for an email address or other information, which is preferably identified with an XML tag.

The processing may also include transmitting data to an employer posting a job offer (or vender offering a particular product) when the job offer (or product meets) specific criteria—criteria that may be different, and more narrow, than the original search criteria. For example, if the job posting meets certain criteria, the agent may retrieve the user's resume from memory and transmit the resume via email (that also contains content such as a cover letter retrieved from memory) as an attachment to the employer. As another example, if the product is available or is below a particular price, the agent may retrieve payment data from memory and other information for purchase of the product (e.g., user's name, address, product identifying information, etc.) and transmit the data to the vender's computer system for purchase of the product. As discussed above, the format and protocol for communicating with the web site (i.e., the employer's or vender's web site) is preferably retrieved from a service registry or retrieved from memory (e.g., stored from a previous communication or as a standard format).

In addition to periodically performing searches and processing the resulting data, the agent may be designed to transmit information to various computer systems. For example, there are a plurality of pay-per-click search engines, employment web sites, auction web sites, and other similar computer system with which an agent of the present invention can be used. For example, one example embodiment of such an agent transmits a plurality of search terms and bid prices to a plurality of pay-per-click (PPC) search engines.

In addition, the agent periodically determines the relative position of the advertisement in a list returned as a result of submission of each search term (i.e., the search term's advertisement placement) at all of the PPC search engines. For example, the agent could transmit a search request to each PPC search engine for each term (e.g., in sequence). After receiving the response from a PPC search engine, the agent processes the received data (by parsing the received data which preferably includes XML tags) to determine the placement of the user's advertisement in the listing (e.g., whether the user's advertisement is first, above tenth, etc.). Alternately, the PPC search engine may have a Web service available for determining a search term's advertisement placement or determining all the search terms' advertisement placements for a given advertiser.

If the placement of the advertisement is below a predetermined threshold placement for that particular term (as stored by the user preferably), the agent then determines the bid price for the search term that would increase the placement of the user's advertisement to another predetermined placement (hereinafter referred to as the "revised bid price"), which may (or may not) be higher than the first predetermined threshold. The predetermined threshold placement (e.g., first, third, tenth, etc.) may be different for each search term and each search engine and also based on costs. In addition, the agent queries the user for input in certain circumstances such as when the bid price reaches a particular level (e.g., query the user for permission to further increase the bid price).

After the agent determines the revised bid price, the agent transmits data of the revised bid price for the search term to the PPC search engine to thereby increase the placement of the advertisement in the listing to the predetermined placement. In addition, the agent also determines the account balance with the PPC search engine and transmits payment data, or authorizes additional transfer of funds from previously supplied payment data, when the account balance falls below a predetermined threshold. Again, the agent may optionally query the user for permission to do so prior to transferring funds.

Similarly, another example embodiment of an agent periodically posts employment offerings to a plurality of employment web sites so that the employment postings remain near the top of the list when job seekers perform searches that return the employment offerings in descending order of the date of the posting (i.e., most recent job postings at the top).

Likewise, another example embodiment of an agent communicates with a plurality of auction sites to repeatedly search for particular products for sale. Similarly, the agent determines the bid price for a specific product (or type of product) and, based on the bid price (e.g., if the bid is not the user's bid and below a ceiling) transmits a higher bid on behalf of the user. The agent determines whether the current bid price is the user's bid by storing the previously submitted bids for each product in memory and comparing the retrieved data from the auction site with the stored data. Alternately, current bid price retrieved from the auction site includes information identifying the bidder such as the bidder's username. In addition, when the same or similar product is auctioned on a plurality of auction sites, the agent bids on the product with the lowest current bid price thereby reducing the potential price paid by the user.

Thus, a multi-computer agent of the present invention can be used to find an apply for a job, to purchase a product, bid on a product, to rent an item including, but not limited to, a car, a home, a boat; to make reservations including, but not limited to, travel reservations, hotel reservations, golf tee time, event reservations (e.g., to an entertainment event such as a sporting event or concert), and perform other actions periodically, at the request of the user, or at other times.

Bar Code Writer

The present invention may also be coupled to a print module that has the capability of imprinting indicia on a substrate, such as paper, cardboard, a wall, etc. For example, the print module may be a barcode writer for printing a barcode on a box, document, product, or other item. Preferably, the bar code prints on labels that are placed on items to be marked (marked items). The device 101 can print bar codes (or other indicia) with information relating to the marked item such as the marked item's contents, creator, date of creation, date of other event (e.g., receipt, shipping, opening,), destination, origin, price, terms for purchase, product identifying information, delivery location, vender, payment information, communication format and/or protocol data, Because the information is imprinted on the indicia, a reading device may not need to retrieve the data from a database based on the barcode. If desired, however, the information may be used to retrieve additional data (e.g., a price, supplier, etc.).

In addition or alternately, the bar code can include information relating to a location at which information relating to the marked item (such as that described above) can be retrieved (e.g., an internet address, telephone) and/or where to purchase the marked item.

While the preferred embodiment employs a barcode, any imprinted indicia could be used that is sufficient to provide the desired information and that is readable by other devices.

Biosensors

The device 101 optionally include biosensors that monitor physiological conditions such as the user's heart rate, heart rhythm, blood pressure, temperature, blood alcohol content, blood sugar, and cholesterol as is well-known in the art, and can store the data, provide an alert to the user, and/or transmit the data (or an alert) to a remote system for storage and processing.

Wireless Pen

The present invention may also communicate with input devices wirelessly (e.g., via its WLAN transceiver). One such device from which user inputs may be received is a wireless pen. The pen acts a writing implement to wirelessly transmit data of the information written by the writer. In the preferred embodiment, sensors in the pen sense the rotation and direction of rotation of the roller. This information is wireless transmitted to the device 101 or other remote computer system, which processes the data with hand writing recognition software, which is well-known in the art. This embodiment is most suitable for writing, as opposed to printing, in which the pen's roller is substantially continuously rolling throughout each word (as opposed to being lifted for each stroke as is done when printing). The sensor also detects when the user depresses the pen roller such as when dotting an "i" or when adding punctuation. The transmitted data is stored for immediate or later processing as is desired and selected by the user.

Preferably, the recognition software also recognizes editing indicia written by the user such as line breaks and paragraph breaks. Alternately, the device 101 includes actuators (e.g., pressure sensitive buttons).that allow the user to supply inputs that indicate editing indicia such as the beginning or end of a paragraph.

In another embodiment, a remote voice recorder includes a wireless transceiver and transmits the recorded voice data to the device. In still another embodiment, the device 101 (which may take the form and function of a pen) includes a voice recorder, which transmits the recorded voice data to a remote computer system. In either alternate embodiment, the data may be transmitted as digital stored voice data or converted to text through conventional voice recognition software and subsequently transmitted.

Miscellaneous

The preferred embodiment of the present invention also includes an MP3 player and MP3 storage capabilities. Using the wireless or wired communication transceiver, MP3 data can be downloaded and stored in the device 101 and repeatedly audible produced to by the user as is well-known in the art. In addition, the device 101 permits MP3 compression of voice data that has been stored in memory, which can then be transmitted (wired or wirelessly) to a remote destination for processing and/or storage.

While the preferred embodiment of the present invention has been described in the context of a mobile communication device, many of applications of the present invention may be used with an embodiment that takes the form of a Smart Card. For example, those embodiments in which CCD is retrieved, payment information is exchanged, could be implemented with a Smart Card.

Another agent includes a print agent, which will, in response to a print request, locates the nearest printer accessible via a network, transmits the data to be printed to the nearest printer, and informs the user (e.g., on the display) of the location of the printer to which the data was sent. In addition, the agent can transmit data to be printed to a designated remote printer (such as at the user's home) for printing.

When an application of the present invention employs a service registry, the present invention may use a predetermined service registry—the address of which has been stored in the device. Alternately, the device 101 determines or identifies the appropriate service registry by performing a search in a database of service registries, which may form part of a service registry, web site, or other source. The "appropriate" service registry, in many applications, may hold information for providers in a particular geographical area, within a predetermined distance from the user, within a shopping complex, within an auction area, or providers meeting any other criteria.

Location and Activity Based Actions

The device 101 includes programming for performing other functions based on the location of the device. For example, based on inputs by the user and stored by the device 101, the device 101 establishes a communication link with a computer system at the user's home to communicate with and/or control electrical devices (e.g., appliances, lights, computers, stereos, etc.) in the user's home, work, or other location. The device 101 preferably establishes the communication link automatically when the user is within a predetermined distance (or time) from the user's home, work, or other location. However, the user can also program the device 101 (by supplying user input) to establish the communication link when the user is at (or arrives at) a predetermined location such as on a particular street, in the user's driveway, in a particular parking lot, in a particular county, state, or city, at a particular vender, or other location.

As an example, the user can program the device 101 to transmit command signals to the user's home computer system to turn on the lights when the user arrives in the user's driveway. In this example, the communication link is preferably accomplished via a short range wireless LAN or PAN and may be established as soon as the device 101 (which may be carried in or integral to a vehicle) is within communication range of the of the home computer system. Other commands, for example, include turning on (or off) a coffee maker, a television, a video recording device, a stereo, a computer, air conditioning, heating, an oven, a stove, select lights (e.g., kitchen and outdoor lights), all lights, a garage door opener, a washer, a dryer, a door lock (to lock or unlock the door), and controlling any other device. The means for controlling electrical devices in the home are well-known in the art and, therefore, not repeated here.

The device 101 can also be programmed to control devices (e.g., turn a device on or off) when the user leaves a particular area (i.e., is no longer present in the area or is detected leaving the area), arrives at an area, is out of communication range via a first communication link such as a short range wireless LAN or WLAN (in which case the link for transmitting control signals is established with a second communication link such as a wireless WAN), or other activity associated with a location.

The device 101 can also be programmed to perform other activities upon arrival or departure from a particular area such as order food for delivery, ordering a movie (e.g., a movie on demand), performing some other action, and/or controlling some other action. In addition, the device 101 can also be programmed by the user to perform activities upon arrival or departure from a particular area that occurs during a particular window of time such as Monday through Friday, at lunch time, after seven o'clock, or during another time period.

In addition, the device 101 can also be programmed by the user to perform activities upon the occurrence of an arrival or departure from a particular area that occurs in conjunction with a triggering event. For example, if the user makes purchase (or purchase above a predetermined amount or above a predetermined number of products), such as at a grocery store, the device 101 transmits a notice to the user's residence (e.g., that is viewed by personnel at the apartment building) when the user is within a predetermined distance from the residence. Thus, personnel at the user's residence can prepare for, and meet the user when the user arrives, and assist the user in unloading the vehicle.

The programming for taking the action can be supplied by the manufacturer, by the user, or supplied by a vender or other third party, or. For example, the user may supply data for controlling appliances in his or her home that is used by an application supplied by the manufacturer or third party software provider. In contrast, a VCS or other third party may transmit an application for storage on the device 101 that performs location based, time based, or activity based actions as well.

One example of a vender application receives location information (e.g., from the location module), and establishes a communication link with the VCS to request an advertisement when the user is within a predetermined distance of the vender store location (which may still be outside of the communication range of the shopping complex WLAN or VCS WLAN). The VCS then receives the request (and preferably the user or device identifying information), retrieves VSUI, selects an advertisement (e.g., based on VSUI, location data, temporal data, and/or received CCD), and transmits the advertisement to the device 101 for presentation to the user.

The application (which may be a third party application) can receive time data, location data, and/or other data and perform any desired action when conditions determined by the application indicate such action should be taken. Another example is an application that monitors the vehicle's odometer and notifies the user that an oil change is needed when the odometer indicates a predetermined distance has been traveled since the previous oil change. Another application automatically purchases (or orders) a product when time data, location data, and/or activity data satisfy predetermined criteria (e.g., a weekday, on a particular street, and no food purchases within previous three hours). Such an application is especially suitable for repeated purchases such as those performed by employees in the course of business. The items purchased (in this example application and others) may be determined by the device 101 which determines the desired quantity and combination of products (e.g. the desired inventory of office supplies or inventory of groceries), determining the current inventory of products, and ordering and purchasing the products sufficient to bring the current inventory to the desired inventory of products. The desired and current inventories can be retrieved from memory, retrieved from an external computer system, or some combination thereof.

Irrespective of the source of the application, depending on the parameters of the application such as the location, the desired action, and other factors, the device 101 may simply transmit information to the remote device that includes the location data along with, if necessary, data of a triggering event and/or time information. In this example, the receiving system is programmed to take the desired action such as controlling electrical devices in response to receiving the data. In the preferred embodiment, the device 101 and remote computer system cooperate together to achieve the desired result. For example, the device 101 transmits a request for the desired action while the remote computer system controls the appliances and presents the appropriate information to personnel to achieve the desired action. In an alternate embodiment, the device 101, based on the location, the time, and/or any triggering event, transmits a request to the remote system (e.g., an appliance or ACS) to perform the action.

In addition to location, the device 101 includes programming to take an action when location data and one or more sensed inputs satisfy predetermined criteria. Thus, for example, the device 101 can be programmed (at the election of the user) to notify the user of the location of a gas station only when the fuel levels are below a predetermined level and the user is within one mile of a gas station. As another example, the device 101 can notify the user of the location of a blood pressure measuring machine when the device 101 determines that the user's blood pressure is above a predetermined value (e.g. as received from the physiological sensors described herein) and the user is within a predetermined distance of the blood pressure measuring machine. Thus, it will be evident to those skilled in the art that the presently described application of the device 101 can, at the election of the user, perform a desired action when one or more of location data, temporal data, activity data, and sensed input data satisfy criteria, which may be criteria supplied by the user, vender supplied criteria, and/or otherwise determined criteria.

In addition to the above, when the user arrives at an area, such as a facility, shopping mall, amusement park, conference, auction site, stadium, sports center, a communication link is preferably established between the device 101 and a remote computer system such as an ACS or ECCS. After establishment of the link, the remote computer system transmits data that includes information of the contents of the area to the device 101 for presentation to the user (e.g., in response to a request from the device). For example, upon arriving at a shopping mall, directory data including information of the venders and their locations is transmitted to the device 101 for use in finding particular stores. Thus, the user can input a request for a particular point of interest (e.g., a vender) and, in response, the device 101 searches the supplied data for the point of interest (e.g., the vender), and, if the point of interest is present, highlights the point of interest (e.g., the vender's store location) on a map of the area (e.g., shopping complex) presented on the display. In addition, the device 101 can provide directions, based on the received data, for traveling to the requested point of interest. The device 101 uses the data to display the location, and, if desired, provide directions to, restrooms, campsites, particular venders, exits, the user's vehicle, monuments, landmarks, and other points of interest. Preferably, the map data or other requested information is displayed along with advertising that is received by the device 101. Preferably, the advertisement(s) is selected and transmitted according to one or more of the methods described herein.

In addition, in the example in which a vender is sought, when the vender is identified the user can instruct the device 101 to establish a communication link with the VCS (if necessary) and request the availability and price for a particular product according to the methods described above.

In some of the above described embodiments, the device 101 communicates with a service registry and numerous service providers. In an alternate embodiment, a service gateway computer system (SGCS) receives the requests (to identify particular service providers or communicate with service providers) from the device 101 via a WAP or XML request. The SGCS receives the request and performs the necessary actions to respond to the request thereby acting on behalf of the device 101. Thus, the SGCS may perform the steps of searching a service registry for service providers (e.g., meeting selection criteria or offering a desired service (requested by the device)), determining the communication parameters (format, protocol, etc.) for communicating with the service providers (which may be determined by retrieving the data from memory or requesting and receiving a descriptor document), transmitting requests to the service providers (for information or to purchase a product), receiving responses from service providers, processing the responses (e.g., sorting, eliminating duplicates or other processing), formatting the processed responses for transmission to the requesting device 101 (e.g., WAP), and transmitting the formatted processed response to the requesting device 101. The SGCS may be the user's home computer system, a vehicle computer system, but is preferably a third party remote computer system that services numerous devices 101. The SGCS preferably stores numerous descriptor documents and service provider information for numerous service providers and may also store the entire service registry for a given area.

In addition, the device 101 stores numerous forms (e.g., WAP) for making requests of the SGCS or of service providers. The forms are preferably downloaded from the SGCS or other source for repeated use by the device 101. For example, one form might be designed to find the closest type of vender from the user's location. Thus, the form would ask for type of vender sought. The form itself would preferably include a hidden variable (which may simply identify the form) that instructs the SGCS to seek the closest vender of the type indicated by the user's input. In addition, information of the user's location is also determined, for example, by receiving the information from the device 101, by receiving the information from a third party system (e.g., from a triangulating system), or determined in any other suitable manner. Another form included, for example, requests data for determining a vender offering a particular product in a given area and determining the lowest price. Thus, the form requests data of the product sought by the user. Still another form is for purchasing a product and therefore requests the product to be purchased from the user. Other information such as payment information may be supplied along with data from the form, or subsequently requested by the SGCS after the vender is determined based on the accepted method of payment for that vender (in which case the SGCS transmits the accepted types of payment and the payment method is selected by the device 101 (either automatically or based on user input) and the associated payment information transmitted to the SGCS or service provider). Some of all of the forms may be combined in one document.

Thus, the SGCS receives the data from the device 101 and generates a transmission (e.g., one or more service providers or the service registry) in a different format and, perhaps, employing a different protocol. Likewise, the SGCS receives data from one or more service providers in a first format (e.g., a SOAP transmission of XML), processes the data if necessary, and generates a transmission in a second format (e.g., WAP) for transmission to the device 101, perhaps using a different protocol, and transmits the transmission to the device 101. The SGCS may employ Web services (as described) as well other communications. Thus, the SGCS may act on behalf of the device, or plurality of devices, in the implementation of any of the embodiments described herein as will be evident to one skilled in the art.

As will be evident to one skilled in the art, the present invention has numerous applications. For example, a user carrying a device 101 configured according to one of the embodiments described herein can use the device 101 to purchase products from a vending machine (which may include a computer and also be connected to a network). Thus, a wireless link (e.g., a PAN) is established between the device 101 and the vending machine. The user may actuate buttons on the machine or select the product from list transmitted to the device 101 from the machine or from another remote computer system. After the selection is made, payment for the product is determined (by either the machine or the device) and is made by the device 101. Payment information may be transmitted to the machine, which verifies the payment information. Alternately, information may received from the device 101 (which in this application may be an rf tag) for facilitating payment. The information may be user information, which is then used by the vending machine (or transmitted to a remote system and used by the remote system) to retrieve payment information and obtain payment. Alternately, the information may be account information, which is then used by the vending machine (or transmitted to a remote system and used by the remote system) to obtain payment.

In many applications of the present invention, the device 101 is described as establishing a communication link. As will be evident to those skilled in the art, in many instances the invention will work just as well if the remote system establishes (or initiates) the communication link or the device 101 establishes the link. In fact, the component that establishes a communication link may be dictated by network characteristics for the communication link, communication protocols, format, and/or standards. Thus, in many instances the invention will work just as well if the remote device (e.g., a computer) initiates the communication by, for example, transmitting data (e.g., map data) and/or transmitting a request (e.g., for CCD). In many instances, such as an always on connection, the communication link may be established when entering communication range with the network or remain from a previous connection and need not be established only to perform the subsequent communication.

Audio Advertising

As discussed above, the preferred embodiment of the device 101 embodying present invention is capable of receiving and producing audio signals for the user. For example, the user may elect to receive and listen to radio signals (e.g., AM, FM, or XM®), which may be transmitted from the original source or from a intermediate source such as the computer system of a shopping complex or other facility or area. In addition, the user may elect to receive a certain type of audio signal such as a certain type of music, a collection (e.g., sequence) of MP3 audio files, a news broadcast, sports, or talk radio. The means of selecting the transmission, the transmission source, and the transmission of the signal are known in the art and therefore not repeated here, but may be as simple as transmitting a request for the desired transmission.

In this example embodiment, the audio signal is transmitted via a WLAN from a facility computer system (e.g., the ACS of a shopping complex) and the user has elected to receive music. In between selections of music, the ACS transmits audio advertisements. However, one problem with audio advertisements is that often the user is doing other things (e.g., driving, or shopping in this example) and does not have access to a writing implement and paper to write the advertisement information down. Thus, audio advertisements are often less effective for impulse buying than other forms of advertising.

In the present invention, the ACS transmits associated product data along with the advertisement content transmission. Thus, while data comprising the advertisement is transmitted, and received, stored, and audibly presented to the user, the product data associated with the advertisement is transmitted by the ACS and received and stored by the device 101. Preferably, data packets representing product data that are received and stored (and later retrieved) are preferably distinguished based on data in a header (or subheader) identifying the data as product data. In an alternate embodiment, data identifying the beginning and/or end of an advertisement may also be transmitted.

Upon receiving an appropriate input from the user, programming of the device 101 retrieves the product data from memory for further processing. For example, during or after the user hears an advertisement, such as an advertisement offering a discount for a food item, the user supplies a user input (either vocally or manually) requesting action of the device 101. The device 101 retrieves the product data from memory of the most recent three advertisements. In this example, the product data of the most recent advertisement—the food item—is displayed on the display. The user can select an advertised product for purchase, to obtain more information of the advertised product by providing another user input selecting desired product displayed.

In response, a communication link is established between the device 101 and the appropriate VCS. The device transmits a request to purchase to the advertised product selected by the user and also exchanges payment information (retrieved from memory) with the VCS to facilitate the purchase. If the purchased product is located close to the user, a time for delivery of the product may also be established (by either the device 101 based on location or by the VCS) such as fifteen minutes from now. The user is subsequently informed of the success (or failure) of the transaction.

The product data may be in any suitable format such as an HTML page, XML, a WAP page, SOAP, text, and/or any other suitable format. The product data may include any data desirable such as data for requesting more information, product identifying information, data for purchasing the product (e.g., price), acceptable payment account data, availability data, destination data for communicating with a ACS about the product, a web site, a web site product ordering processing page, a service registry address and vender identifying information, a full or partial descriptor document, and any other data that may enable the user to purchase or inquire about the advertised product or vender.

In response to the first user input, the device 101 can be programmed to purchase the product advertised in the most recent advertisement after receiving user confirmation or automatically without confirmation. In the automatic purchase mode, the user would only need to press a button or speak a command to purchase the product. After determining that a purchase is to be made, the device 101 transmits payment information, delivery information (e.g., if shipped to the user's home or work), user information (e.g., the user's name), and any other information necessary for purchasing the product. The format, protocol, and payment account data is selected according the particular product data and/or by any of the means described herein as will be evident to one skilled in the art.

In addition or instead of displaying information the three most recent advertisements (e.g., product names), the device 101 can audibly present the most recent advertisement to the user again so that the user can audibly confirm the correct advertisement has been identified by the device 101 before supplying an input to the device 101 to take action.

As will be evident to those skilled in the art, this application of the present invention is especially suitable for a device 101 that is integrated into a vehicle thereby allowing the driver to respond to advertisements while driving.

This application of the present invention may also be used with analog AM and FM radio transmissions in which the product data is modulated on a separate carrier signal or preferably on a subcarrier within the same signal. This application of the present invention may also be used with digital or analog television. Its application to digital television could be easily implemented in a manner similar to that of the digital signal described above as will be evident to one skilled in the art. For use with analog or digital television, the product data may be included in the closed caption portion of the television signal. The device 101 simply decodes the caption data as it is received, stores the decoded data, and retrieves the data to make the purchase (or perform another action) upon receiving the user request. Thus, a web address for purchasing a product may be included in the closed caption and used along with the payment information retrieved from memory to purchase the product in response to a user input.

As discussed, the image module, voice recorder module, voice recognition module, and commerce module cooperate to provide applications as well. The voice data files are processed to generate text representing the voice data, which is then stored in memory. The first step is accomplished through conventional voice recognition software, which converts spoken words into text (e.g., ASCII). Processing of voice through the use of voice recognition software is well-known in the art, commercially available, and the details thereof are, therefore, not repeated here.

The output of the voice recognition software is a text version of the spoken words. Next, the software parses the converted text to identify the word "website" and the word "stop." The text between the words "website" and "stop" (or after a pause) are then identified to be a web page address and is stored in memory as such. Words stored in the same data index that follow the word "stop", if any, are stored as a voice message indexed to the identified web page address.

The software also has the capability to go a step further (at the option of the user), by converting the entire voice message to text and parsing the text for particular words, which may represent commands. For example, after speaking the web address (and the word "stop" or pausing) the user then speaks "buy, card corporate American express, delivery home, shipping normal." The software parses this text, opens the default web browser to access the web address that was stored and converted to the displayed text—(e.g., www.gifts.com\products\pn123242). This web address is the web page that a person would access to purchase a particular product (but could be any information provided by a vender to allow the user to purchase a particular product). After the word "stop"(or a pause) the software identifies the word "buy", which is recognized by the software to be the previously stored command to place an order. The next words are "card American Express," which identify which of the previously stored credit files (containing the appropriate credit card information such as credit card number, associated expiration date, billing address, and card name) to be used to make the purchase. Alternately, the commerce module may select the payment account as described above.

Portions of web pages that request information from users are often referred to as forms. The beginning of a form in HTML can be recognized by the use of the "form" command (e.g., <form method="POST" action="http://www.email-sarehere.com/ts/mf.pl">). As is well-known to those skilled in the art, the text in quotes after the word "action" indicates where the form (i.e., the user's device 101) will send the requested information. Information that is being transmitted to the processing web page (i.e., the web page that receives the form data) is transmitted along with the request for the web page. For example, the device 101 might transmit "http://www.emails.com/scripts/mailform.pl?clients_email=john@somecompany.com" which passes the information "john@somecompany.com" as the variable "clients_email" to the processing web page (e.g., http://www.e-mails.com/scripts/mailform.pl).

Most web forms are written in HTML and typically use the same HTML command (the input command, e.g., "<input name=user size=25 maxlength=25>") to prompt the user for data. Likewise, the forms often use the same or similar variable labels for each requested piece of information. For example, for the person's name, HTML forms often use the label NAME or Last_Name, First_Name, and Middle_initial. For the address, the forms often use ADDRESS, CITY, STATE, COUNTRY, and ZIPCODE. The software processes the web page and parses the web page for all the predetermined, stored labels that are used in common purchase forms. In other words, the software looks for the input command on the web page and then determines the variable label to which the user's input would be assigned (e.g., "name=user" would indicate the variable is "user") to determine what information is to be supplied.

The software then transmits the appropriate information for each variable label (i.e., name value pair) to the web page server (or other remote computer system), thus emulating the user filling out the form and clicking on the Submit button. In instances in which the software has been taught what information needs to be transmitted to a particular processing page, the software may not need to request the web page containing a form. Instead, the software simply transmits the necessary information to the processing web page. Alternately, the transmission may be generated, formatted, and transmitted according to communication parameters and other data found in a descriptor document, which may be requested of, and transmitted from, a service registry thereby using Web services.

The software also parses the words "delivery home," which instructs the software to use the user's home address (previously stored in memory) as the address for delivery. Finally, the software parses the words "normal delivery," which instructs the software to request normal (or standard) delivery of the purchased item(s).

If not using an industry standard such as Web services, the software may be "trained" to interact with websites that have elaborate or unusual forms and/or which the user accesses frequently. For example, if a user often purchases books through Amazon.com®, the user may wish to train the software to interface with the Amazon.com® web site. To train the software the user accesses the website of Amazon.com® and selects a product for purchase. Next, the user puts. the software in "watch" mode and provides user input indicating that the following information should be stored with a "buy book" command. The user then completes the forms to purchase the book and takes the software out of the "watch" mode. The software thus stores the number and address of the web page forms, the labels representing data that is requested by the web pages, the type of information that is supplied by the user (by comparing the information provided by the user (e.g., a credit card number) with the categories of user related stored information) and any other relevant necessary information. Subsequently, when the software receives the "buy book" command, the software will complete the Amazon.com® form(s) with a much greater likelihood of providing the correct information. The watch mode is especially applicable for use with websites that are frequently accessed such as for trading stock, making hotel, restaurant, or travel reservations, reserving golf tee times, and buying music, electronics, or books. Instead of actually accessing the forms, the software may (provided the web site is designed appropriately) simply send the required variable labels and associated information to the processing web page(s) that receives purchase information (e.g.,www.golfit.com/ph.cfm?pd=bigdriver).

In another application of the present invention, the image module is used to scan product and/or vender information. In addition, the audio input device is optionally (depending on the data scanned) used to provide a voice command for the associated scanned data such as a command to purchase the product or request additional information.

In operation, the user scans a print advertisement or other indicia (i.e., representing information) that the user wishes to store so that the user may access the web address when convenient to the user. Scanning activates the display, which prompts the user to enter voice data associated with the scanned data. If the user does not wish to enter any voice data, the user simply provides an input indicating so (e.g., pushing a button). If the user does wish to enter voice data, the user begins speaking. Generally, and as is well-known in the art, the speech storage is accomplished with a filter, amplifier, analog-to-digital converter, and stored in memory (e.g., RAM). The stored speech is indexed to be associated with the recently scanned text (i.e., stored at the same data index).

Once the image is normalized (if necessary), it is processed by character recognition software, which is used to convert the image to a text. Character recognition software is well-known in the art and the details thereof are not repeated here. The output of the character recognition software is text (e.g., the web page address) that corresponds to the scanned image.

After processing, the software determines if a command has been received (e.g., via voice or other input) and processes the command accordingly. The results of the processing (that may potentially include a request to take the received command) of presented to the user visually or audibly providing additional confidence to the user that the correct data was stored. As discussed, the command may require immediately establishing a wireless connection to the identified web site, purchasing a product, and/or requesting information about a product.

The scanned data may represent product identifying information and/or a destination for transmitting a request for more information about the product or for purchasing the product. However, the destination information may be retrieved from memory as a preferred vender for such products (such as with the "buy book" command described herein). As discussed above, the payment account is preferably selected by the commerce module and when the device 101 communicates with the desired destination payment information is exchanged to facilitate purchase of the product identified by the image data. In addition, the scanned data may also include data representing a command such as a command to purchase or a command to request additional information, which would thereby eliminate the need for the user to supply the command. Preferably, if the image scanned is not legible (e.g., not text but a bar code or other machine readable image) other data in the advertisement or elsewhere is provided to the user so that the user knows what action will be taken when the image data is scanned. In addition, the user can program the device to prompt the user for permission before taking any action resulting from a scanned image.

As discussed, the system of the present invention preferably customizes advertisements directed to users based on CCD, which in addition to identifying the user by name and other user data, also allows the broadcaster to customize advertisements to the user's likes, dislikes, financial qualifications and/or other qualifications. For example, if the user profile indicates that the user's favorite color is blue, the broadcaster can then customize an advertisement relating to a sports car to be an advertisement with a blue sports car instead of black sports car. Likewise, an advertisement advertising music may be customized to include the recent compilation of an artist that is liked by the user and, for example, of an artist that the user has previously purchased. Similarly, a restaurant advertisement can be customized to be that of restaurant of the type liked by the user (seafood) and that is local to the user and provided with the address of the restaurant. As another example, an advertisement relating to a timeshare (or house) of a greater expense may be transmitted to those user's known to have a high net worth or income or who are known to be financially qualified to purchase the product or feature a house that is priced near the user's maximum financial qualifications.

To accomplish this customizing, the ACS software processes the likes, dislikes, and qualifications of users to select advertisements for transmission to that user that are more likely to be of interest to the user (and/or for which the user is qualified to purchase) as discussed above.

The advertisements stored in the ACS are preferably identified in memory (e.g., a database) by a unique identifier along the targeting criteria. Each advertisement relating to a specific product (e.g., a car) is present in the bank in a multitude of variations of the advertisement, with each variation having different attributes. Once an advertisement product is selected (e.g., a sports car), the variations of advertisements for that product are compared to the likes, dislikes, and qualifications in the CCD. Using the above example, user "A" will receive a sports car advertisement depicting a blue sports car while others interested in sports cars may receive the same advertisement, but with the sports car being a different color.

When the user is viewing an advertisement, which may be a moving video, the user may click on a portion of the advertisement to purchase the product. Thus, by clicking anywhere in window that is displaying the advertisement (or alternately on a displayed "buy" icon), the device 101 automatically purchases the product in the advertisement (in a method such as described above).

Alternately, for some products (e.g., cars) the user may click on a "get information" icon transmitted by the ACS to have additional information transmitted to the buyer (such as the options, price, delivery time, taxes, etc.). The additional information is transmitted immediately and presented to the user in a separate window on the device 101. At the user's discretion, the additional information may alternately be mailed to user, or emailed to the user.

For advertisements that advertise a plurality of products, portions of the display (which correlate to the image of the advertised product) may be clicked on by the user to purchase the product. In other words, images on the transmitted advertisement overlay hyperlinks (hot spots) that may be actuated by moving the pointing device (e.g., mouse cursor) to the image and clicking the pointing device. The hyperlink web address is the address of the web page for obtaining product information and/or for purchasing the product. Alternately, the user may select the advertisement with a voice command as described herein.

At the option of the user, the device may store advertisements for later retrieval to allow a user to think about a product before making the decision to purchase. All or only selected advertisements may be stored as desired by the user and indicated by a user input.

In addition to purchasing products in advertisements, the user may click on a product in a video presentation such as a movie to purchase a product. Because not all objects in a movie may be purchased, the user is preferably provided an "available for purchase" indication transmitted by the broadcaster. In the present embodiment, when the user places the pointing device (which may be the user's finger or a remote pointing device) over an object on the display that is available for purchase, the price of the object is displayed. When the user moves the pointing device over an object on the display that is not available for purchase, no price is displayed. When the user selects an object that is available for purchase, the device 101 places the object in a conventional shopping cart, which the user may review (and confirm the user's desire to purchase the products) at the end of the presentation. Likewise, the user may request additional information about products that are available for purchase. The user may pause the presentation or click on the moving video.

Optionally, the user may replay the stored transmission and modify the color or other attributes of the product of interest before purchasing the product. In doing so, the device software examines the digital information representing the video. Those bits of information representing images that are not modifiable by the user are associated with an image selection code (e.g. preceded by "00") that indicates the image may not be modified. Those bits of information representing image data that is modifiable by the user is associated with an image selection code indicating that the image may be modified (e.g., preceded by a "01"). When the user selects an image (with the pointing device) that is identified as being modifiable, the software retrieves the selectable attributes (e.g., colors) that are stored (from the broadcast transmission) that are associated with that image selection code. Different images or products (e.g., cars) may have the same or different set of available selectable attributes. After selection of the desired attributes (e.g., color of blue), a portion of the video may be replayed which provides the selected image with selected attribute(s). In this embodiment, this is accomplished by replacing the data associated with the previously selected image selection code with data of the selected attribute for that object. As will be evident to those skilled in the art, the data stored in memory also includes object identifying information to identify the same object (e.g., a car) in various pages of memory and may also include feature identifying information to identify the same feature (e.g., hood or a portion of the object that is shaded (and the same color) or well illuminated) of the same object in different pages of memory. The method of modifying the attributes is the designer's choice and is based on the capabilities of the device 101, the format of the broadcast transmission(s), the number and types of available attributes and many other factors that are recognizable to one skilled in the art. In general, however, the image to be modified must be discernible or selectable from other images so that data of the selected attribute can be replaced. This can be accomplished through the use of associated data codes (as described), using dedicated portions of memory for selected images, or using a discernible format for the data representing modifiable images.

Thus, one embodiment of this application of the present invention includes a system performing the steps of transmitting video data including an object to a user, said object having a feature, transmitting a plurality of attributes (such as colors) for said feature and wherein the transmitted video data is received and stored in memory of a user device. In addition, the data packets of information representing said object include a first set of bits in data packets of the video data transmission and data packets of information representing said feature include a second set of bits in data packets of the video data transmission (which may or may not form part of the first set of bits) and data packets representing said attribute of said feature comprise a third set of bits in said packet (which may or may not form part of said second set of bits) and wherein said user can select one of said plurality of attributes of said feature for presentation to the user. Upon selection by the user, the set of bits in said packet comprising said attribute of said feature a modified according to the user's selection. Furthermore, the presentation of the video data to the user presents the object as a moving object to the user such as in a digital television transmission (e.g., RealPlayer®) or Flash® presentation.

Another application of the present embodiment is virtual gambling. Many people enjoy gambling even though most people do no live near gambling establishments and people often travel great distances to participate in gambling. One alternative is online gaming, which is performed through software that generates the order of cards in a virtual deck of cards that the user plays. The computer generation of the virtual deck of cards (or other gaming device such as dice or roulette) is not, by many people, considered to be trustworthy and fair. In other words, many people do not trust virtual gaming in which a computer controls the device of chance (dice, cards, or roulette).

As an alternative to this type of virtual gambling, the present embodiment allows the user to gamble with a real device of chance. In this application, a user wishes to play blackjack. The device establishes a communication with the gaming computer system (GCS) and the user logs into the GCS and establishes credit with the broadcaster through any suitable means. The user is then assigned to a virtual chair at a blackjack table that has a minimum bet requirement and maximum allowable bet that are suitable to the user. Once assigned to the virtual chair, the device 101 receives transmissions from the GCS station that allows the user to see all the blackjack hands being played at the table. The transmission from a video camera is of a live person acting as a dealer and who deals cards to all the players (virtual or live) who are playing at that table. The device of chance (deck(s) of cards) are thus real cards. In essence, the transmission allows the user to see a video transmission of all the cards at the table as if the user were actually sitting at the table. The user expresses his or her decisions relating to the playing of the user's hand (e.g., betting, stay, hit, double down, split, or surrender) by clicking on the appropriate hyperlink (or button) on the display, which is transmitted from the GCS to the device 101 as HTML. The user's desire relating to play of the hand is then transmitted to the GCS, stored, and displayed to the dealer who responds accordingly (e.g., giving the user another card, etc.).

Likewise, the user makes wagers by providing input to the device, which is transmitted to the GCS station, stored, and presented to the dealer. Other players may, or optionally, may not know the amount being wagered by another virtual player. The GCS is preferably a web server and ideally located remotely from the dealer, with the dealer operating a local computer connected thereto.

To provide the true feeling of being present, the dealer's voice is also transmitted to all users as well as the voice of other virtual players. Alternately, instead of using the display and pointing device to transmit the user's decisions regarding wagering and playing of the hands, the user provides voice commands. The speech is transmitted to the GCS and received by the dealer who acts accordingly. Transmitting the audio to all players allows friends from different geographical locations to play and interact together as if they were in a real gambling establishment. Preferably, the speech is converted to a data signal that indicates the desire of the user and is displayed to the dealer.

At the end of a hand, the dealer supplies an input indicating which users are winners and which are users and the payout odds for each. The GCS stores the input and credits or debits the user's gambling account (which is stored in memory of the GCS) according to the dealer input.

This application is especially applicable to games of chance such as craps and roulette. Typically, the number of people that may engage in a craps or roulette game is limited by the number of people who can physically gain access to the table to place a bet. In a virtual game as described above however, an unlimited number of people may receive a broadcast from a single roulette or craps table (i.e., the number is only limited to the number of broadcasts that can be transmitted by the broadcast station).

For example, in roulette, the user provides an input of the desired bets, which is then transmitted to the GCS where the data is stored. After a predetermined time period, no more bets are accepted and the roulette wheel is spun. When the roulette ball comes to rest in a number, the dealer supplies an input to the GCS indicating the number (and/or perhaps color) at which the ball came to rest. The GCS then credits the user accordingly by retrieving the numbers bet upon by each user and comparing those numbers with the winning number. Again, the live action of the roulette ball is transmitted live to the device 101 for presentation to the user.

Craps may similarly be the game of chance with users supplying data of his or bets (the amount and numbers) to the device which transmits the data to the GCS, which determines if the bet is valid (allowable) and stores the data. After the betting period is over, a player playing live at the table rolls the dice. The dealer supplies an input to the GCS indicating the numbers shown on the rolled die. The GCS then credits the users accordingly by retrieving the bets of each user and comparing those bets with the bets made by the user.

Thus, this application includes the steps of receiving and storing a bet amount from a user, receiving and storing a bet request from a user, transmitting a confirmation to the user (or a first presentation device) of the bet request and/or bet amount, transmitting to the user (or the first presentation device or a second presentation device) video data of the game of chance upon which the bet is made, receiving an input relating to the result of the game of chance, determining whether the user won the bet, crediting the betting account of the user if the user won the bet, determining whether the user lost the bet, debiting the betting account of the user if the user lost the bet. In addition, the steps of determining whether the user won or lost the bet, include retrieving the bet of the user and comparing the retrieved data with the input relating to the results of the bet. The method may additionally include the step of determining the odds for payout of a winning bet or debit amount in the case of a loss, which may be retrieved from memory or provided by a user input.

Furthermore, the game of chance may have an image input device, or other input device, for reading the cards of each player, the roulette ball results, or crap dice data which is then supplied to the GCS.

The transmission of the game of chance to the user may be via a WLAN, a wired LAN, or a television transmission (e.g., closed circuit) such as those found in casino hotels. Irrespective of the transmission of the game of chance, the input from the user can be transmitted via a WLAN, a wired LAN, or via a television network. As will be evident to one skilled in the art, the GCS and the transmitting the video of the game of chance may be separate devices and would not necessarily need to communicate with each other.

This application of the present invention allows the user to enjoy live gaming while in his room. For example, the user could view the game of chance on the in room television and receive and transmit gaming data (e.g., bet amounts, bet requests, etc.) via a device 101. Alternately, the television or other presentation device in the room includes an input device (e.g., a remote control) for receiving the user's input and for receiving and transmitting gaming data. Alternately, the device 101 can be used in a restaurant to receive and transmit gaming data based on a video transmission that is presented to a plurality of users in the restaurant. In still another alternative, the device can be used to receive the video data and receive and transmit gaming data.

Many of the software modules and applications may not be necessary or desirable in some embodiments of the present invention. For example, some embodiments may not include an image module and, therefore, could not practice those applications that utilize the image module. Other embodiments may not include one more of the modules and/or software programs described herein and therefore, would not be able to practice those applications requiring the omitted modules and software programming. The applications of use, hardware, and software programs of the embodiment implementing the present invention is a design choice based on available processing power, external systems, cost, desired functions, and other factors as will be evident from this disclosure to one skilled in the art.

The system, method, apparatus, and computer program product of the present invention can preferably process any type of data including ASCII Text, binary data, such as streaming video, streaming-real-time audio, and image data. As is well-known in the art, buffering, and delayed presentation, may be used for some data streams. Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of memory including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely. Other examples of suitable memory include memory such as a SmartMedia® card, a CompactFlash® card, a Memory Stick®, a MultiMediaCard®, a DataPlay disc®, and a SecureDigital® card.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

As discussed, the infrastructure of the present invention includes both hardware and software. The details of the infrastructure are left to the designer and will vary depending on the costs and benefits, compatibility with existing technology (hardware and software) and systems, the application(s), the particular embodiment, and various other factors. A multitude of variations and applications are described and components and methods (hardware or software) of any particular application can be readily used with the components and methods of other applications as will be readily ascertainable by one skilled in the art. In addition, components and methods providing the same or similar functionality of another disclosed component or method may be substituted. In fact, as technology progresses, one skilled in the art would expect that the components and methods disclosed (both hardware and software) to be replaced with faster, smaller, cheaper, more efficient and/or better components and methods having enhanced functions and more adaptable to particular applications.

Likewise, features described in one embodiment or application might be used with features described in another embodiment or application and still be within the scope of the invention. One example embodiment of a device 101 practicing the present invention includes hardware and computer programming (computer code segments) for performing the following steps:

determining location data for the device, which may be determined through the use of a GPS receiver, from a transmission from a nearby fixed or moving device, which may be a vehicle;

determining when the device is within a predetermined distance from a point of interest;

receiving and storing data for monitoring and restricting the use of the device;

receiving a request to perform an action;

determining that said requested action is a restricted use and prohibiting said action;

determining that said requested action is a monitored use and storing said action and transmitting data of said action;

determining one of a plurality networks through which to communicate;

monitoring and storing physiological conditions of the user;

transmitting data upon detection of location based data such as being with a predetermined distance of a point of interest, within a given area, on a particular street and said transmitting may first include establishing a communication link;

wirelessly receiving, storing, and presenting to a user, audio and/or visual data (e.g., a map or video content) from a facility (or area) upon arriving at a predetermined distance from the facility (or area);

receiving and storing a transmission that includes advertisement content and product data; receiving a user input relating to the advertisement and, in response, retrieving the product data and taking action on said product data according to a user input;

receiving and storing authentication data;

transmitting authentication data to a remote computer system;

requesting authenticating data upon receiving a request to perform an action such as make a purchase;

storing a voice annotation with computer data file, such as an image file;

audibly producing a voice annotation upon receiving a user input of a request;

using a voice input as the file name and/or location (e.g., a transmission destination) for storing a computer data file such as an image file;

exchanging payment account information by selecting a payment account, transmitting payment information, and receiving a response;

contemporaneously maintaining a voice and data (e.g., internet) communication links through a connection that is wireless at the mobile device;

receiving a mobile telephone communication while presenting an audio presentation to the user an notifying the user of the received telephone communication through a vibratory alert and/or an audible alert;

audibly presenting an audio presentation to the user from a storage device in the device such as playing an MP3 file;

presenting a video presentation to the user from memory;

receiving and storing a user input such as a voice input and/or actuator input, wherein said input includes a command;

converting said voice input to text;

determining a command to perform based on a user input;

determining a target point of interest (such as a vender) meeting selection criteria which may based on a user input and/or stored data;

determining the available target points of interest in an area meeting the selection criteria;

determining which of the available target points of interest is closest; which may include determining the user location and determining the location of the available target points of interest, which may be relative or absolute locations, determining the distance between user location and the location of the available target points of interest, and determining an estimate of the time to travel to the available target points of interest;

determining the available points of interest in said area satisfying the selection criteria by receiving and processing information for determining whether said available points of interests satisfy the selection criteria from a plurality of said available points of interests; wherein said step of receiving is in response to transmitting a request for information for determining whether said available points of interests satisfy the selection criteria;

presenting information to the user of at least some of the available target points of interest meeting the selection criteria, which may include identifying the closest target point of interest to the user.

receiving an input from the user relating to at least an available target point of interest;

transmitting data to an available target point of interest (or data relating to said available target point of interest to a computer system) based on an input from the user; wherein said transmitted data is a request to purchase or a request for information receiving a response from an said available target point of interest (or the associated computer system) and presenting the user with information relating to the response;

determining service providers satisfying a criteria such as may supplied by, for example, searching a service registry, by searching memory, or by a user input;

determining and storing communication parameters for communicating with at least some of service providers comprising points of interest meeting a selection criteria;

generating requests, based on said communication parameters, for transmission to said at least some of said service providers comprising points of interest satisfying said first selection criteria, said request including information for determining whether said point of interests satisfy a second selection criteria;

transmitting said requests according to said communication parameters to said service providers comprising said points of interest meeting a selection criteria;

receiving a response from a plurality of said service providers comprising said points of interest to which a request was transmitted;

processing said responses, for example, according to instructions from a user by removing duplicates, sorting, purchasing product(s); determining a placement of an advertisement in the results of a search of a pay per click search engine and transmitting a revised bid price is said determined placement is below a predetermined placement;

generating a request to one of said points of interest responding to said requests based on said processing;

transmitting said request to said one of said points of interest responding to said requests;

presenting information to the user based on said processed responses;

transmitting a request to a plurality of service providers such as pay per click pay per click search engines, which may be performed periodically;

providing a heads up display for presenting information a window of the vehicle,:

receiving a request for information relating to a location;
determining directions to said location;
displaying information for traveling to the location on the window via the heads up display and wherein said displayed information includes information for communicating a turn;
including an audio presentation of the directions;
receiving a document for presentation to the user;
determining a plurality of objects, such as hyperlinks, in the document that are displayed the substantially the same;
generating indicia for each of said plurality of objects, said indicia being different for each of said plurality of objects;
displaying said indicia for each of said plurality of objects and said document to the user;
receiving a voice input from the user that includes information of an indicia which is a request to retrieve a web page corresponding to said hyperlink;
determining that said input from the user corresponds to the one of said plurality of objects corresponding to said indicia.
transmitting a request for a web page associated with said hyperlink;
generating a request for first user data;
wirelessly transmitting second user data to said first user device;
transmitting said request for said first user data to said first user device; and
receiving a response to said request for first user data that is based on said second user data and storing said response from said first user device.

Other embodiments may include hardware and software for performing other steps described herein, a subset of these steps, or some combination thereof. For example, another example of an embodiment of a computer system practicing the present invention includes hardware and software (computer code segments) for performing the following steps:

receiving identification information from a mobile user device a first time;
storing said identification information in memory;
receiving product information of products within a predetermined area;
storing said product information;
receiving a bid for a product;
storing said bid,
transmitting a notification of said bid to a plurality of users having placed a bid on said product;
determining the successful bidder of said product;
transmitting information of said successful bid to said successful bidder;
transmitting a transmission to a presentation device for presentation to the user, said transmission including user information therein such as the user's name; said transmission being based on user information such as the user likes and dislikes;
determining the location of a user, which may be an absolute location, a relative location, or a determination that the user is within a give area such as within communication of an access point or two access points;
receiving user data;
determining temporal data; selecting an advertisement based, at least in part, on the location of the user, said received user data, on temporal data, and/or a transmission value;
transmitting said advertisement for presentation to the user;
receiving information of a response to said transmitted advertisement;
performing an incentive transaction in response to receiving said information of said response;
collecting CCD information via a wireless communication;
storing said user information with said user identifying information;
determining that the user is in an area, which may be predefined and may be determined by communication with the user's device via one or more access points;
receiving identifying information of the user or device a second time;
retrieving vender stored user information based on said identifying information;
performing an action based on said retrieved vender stored user information, determined temporal data, and/or determined location data; and
selecting and transmitting data, such as an advertisement, based on said vender stored user information which may further be selected based on received CCD, determined temporal data, determined location data, and/or a transmission value;

Again, other embodiments may include hardware and software for performing other steps described herein, a subset of these steps, or some combination thereof.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A method of using a computer to modify a motion video for presentation to a user, comprising:
  receiving the motion video in data packets, said data packets including data representing an image of an object visible in the motion video, said object having a feature visible in the motion video;
  storing said data packets in memory;
  receiving data of a plurality of attributes for said feature;
  storing said data of said plurality of attributes in memory;
  presenting the motion video to the user;
  receiving a pause request to pause the motion video;
  pausing the motion video in response to receiving the pause request;
  receiving a first user request relating to a first selected one of said plurality of said attributes while the motion video is paused;
  retrieving data of said first selected one of said plurality of said attributes from memory; and
  presenting the motion video to the user with the feature of the object modified in accordance with the first selected one of said plurality of said attributes; and
  upon receiving a user selection input indicating a user selection of the object in the video, providing a visual indicator that the article of commerce is available for purchase if the article of commerce is available for purchase, and not providing the visual indicator that the article of commerce is available for purchase if the article of commerce is not available for purchase.

2. The method of claim 1, further comprising:
receiving a second user request relating to a second selected one of said plurality of said attributes;
retrieving data of said second selected one of said plurality of said attributes; and
presenting the motion video to the user with the feature of the object modified in accordance with said second selected one of said plurality of said attributes.

3. The method according to claim 1, wherein the object comprises an object moving within the motion video.

4. The method according to claim 1, wherein the feature visible in the motion video comprises a surface feature of the object.

5. A method of modifying a motion video presentation, comprising:
receiving a motion video presentation having content;
wherein the content of the video presentation includes a plurality of moving objects including a first moving object that represents an article of commerce;
wherein the first moving object includes a first feature having a selectable attribute;
wherein the first moving object and the first feature are visible in the motion video presentation;
receiving data of a plurality of selections for the selectable attribute;
presenting the motion video presentation including the first moving object with the first feature having a first selection of the selectable attribute to a user;
receiving a pause request to pause the motion video;
pausing the motion video in response to receiving the pause request;
receiving a request to modify the selectable attribute while the motion video is paused;
presenting the motion video presentation to the user with the first feature of the first moving object modified in accordance with the received request; and
upon receiving a user selection input indicating a user selection of the first moving object in the video, providing a visual indicator that the article of commerce is available for purchase if the article of commerce is available for purchase, and not providing the visual indicator that the article of commerce is available for purchase if the article of commerce is not available for purchase.

6. The method of claim 5, further comprising receiving a user input indicating a request for more information about the first moving object.

7. The method of claim 5, further comprising replaying a portion of the motion video presentation that includes the first moving object after being modified.

8. The method of claim 5, further comprising receiving a user input indicating a request to purchase the first moving object.

9. The method of claim 5, wherein the first selection of the selectable attribute is selected based on information of the user.

10. The method of claim 5, further comprising:
storing the motion video presentation in a memory;
storing data of the plurality of selections in memory;
receiving a user input indicating a request to present the motion video presentation; and
wherein said presenting the motion video presentation including the first moving object with the first feature having a first selection of the selectable attribute to the user is in response to the user input.

11. The method of claim 5, further comprising:
receiving a request to purchase the article of commerce while the motion video presentation is paused.

12. The method according to claim 5, wherein the first feature comprises a surface feature of the moving object.

13. A method of providing a video presentation, comprising:
receiving a motion video presentation having content;
wherein the content of the motion video presentation includes a plurality of moving objects including a first moving object that represents an article of commerce;
wherein the first moving object includes a first feature having a selectable attribute;
wherein the first moving object and the first feature are visible in the motion video presentation;
receiving data of a plurality of selections for the selectable attribute;
selecting one of said plurality of selections for the selectable attribute based on information of the user;
presenting the video presentation including the first moving object with the first featuring having the selected one selectable attribute to a user;
receiving a pause request to pause the motion video;
pausing the motion video in response to receiving the pause request;
receiving a request to modify the selectable attribute while the motion video is paused;
presenting the motion video presentation to the user with the first feature of the first moving object modified in accordance with the received request; and
upon receiving a user selection input indicating a user selection of the first moving object in the video, providing a visual indicator that the article of commerce is available for purchase if the article of commerce is available for purchase, and not providing the visual indicator that the article of commerce is available for purchase if the article of commerce is not available for purchase.

14. The method of claim 13, further comprising receiving a user input indicating a request to purchase the first moving object.

15. The method of claim 13, further comprising replaying a portion of the motion video presentation that includes the first moving object after being modified.

16. The method of claim 13, further comprising receiving a user input indicating a request for more information about the first moving object.

17. The method of claim 13, wherein the content of the motion video presentation includes a second moving object that represents an article of commerce and wherein the first and second objects are displayed simultaneously.

18. The method of claim 13, further comprising:
storing the motion video presentation in a memory;
storing data of the plurality of selections in memory;
receiving a user input indicating a request to present the motion video presentation; and
wherein said presenting the motion video presentation including the first moving object with the first feature having the selected one attribute to a user is in response to the user input.

19. The method of claim 13, further comprising:
receiving a request to purchase the article of commerce while the motion video presentation is paused.

20. The method according to claim 13, wherein the first feature comprises a surface feature of the moving object.

21. A method of modifying a motion video presentation, comprising:
receiving a motion video presentation having content;
wherein the content of the motion video presentation includes an image of a three dimensional object that comprises an article of commerce;

wherein the object includes a surface feature having a selectable attribute;

wherein the object and the surface feature are visible in the motion video presentation;

presenting to a user the motion video presentation including the image of the first object with the surface feature accorded a first attribute;

receiving a pause request to pause the motion video;

pausing the motion video in response to receiving the pause request;

receiving a request to modify the first attribute of the surface feature of the object of the motion video presentation while the motion video is paused; and presenting the motion video presentation to the user with the surface feature of the object modified in accordance with the received request;

upon receiving a user selection input indicating a user selection of the object in the video, providing a visual indicator that the article of commerce is available for purchase if the article of commerce is available for purchase, and not providing the visual indicator that the article of commerce is available for purchase if the article of commerce is not available for purchase.

* * * * *

UNITED STATES PATENT AND TRADEMARK OFFICE
CERTIFICATE OF CORRECTION

| | | |
|---|---|---|
| PATENT NO. | : 7,487,112 B2 | Page 1 of 3 |
| APPLICATION NO. | : 10/154016 | |
| DATED | : February 3, 2009 | |
| INVENTOR(S) | : Melvin L. Barnes, Jr. | |

It is certified that error appears in the above-identified patent and that said Letters Patent is hereby corrected as shown below:

On the Title Page, below Item (65),
insert -- Related U.S. Application Data
Item (63) Continuation-in-part of application Ser. No. 09/606,350, filed Jun. 29, 2000. --.

In column 6, line 2, delete "$^{Player®}$)" and insert -- $^{Player®}$ --, therefor.

In column 8, line 59, delete "Enhanced." and insert -- Enhanced --, therefor.

In column 9, line 11, delete "a." and insert -- a --, therefor.

In column 10, line 31, after "via" insert -- a --.

In column 14, line 19, delete "requesters" and insert -- requestors --, therefor.

In column 14, line 22, delete "requester" and insert -- requestor --, therefor.

In column 14, line 36, delete "<tmodel>" and insert -- <tModel> --, therefor.

In column 15, line 30, delete "requester" and insert -- requestor --, therefor.

In column 15, line 33, delete "requester." and insert -- requestor. --, therefor.

In column 15, line 38, delete "requester" and insert -- requestor --, therefor.

In column 15, line 57, delete "requester" and insert -- requestor --, therefor.

In column 30, line 31, delete "a in" and insert -- in a --, therefor.

In column 31, line 17, delete "Pls" and insert -- PIs --, therefor.

In column 32, line 22, delete "(e g.," and insert -- (e.g., --, therefor.

In column 35, line 63, delete "authentica ting" and insert -- authenticating --, therefor.

In column 36, line 9, delete "such." and insert -- such --, therefor.

In column 37, line 65, delete "device101)" and insert -- device 101) --, therefor.

UNITED STATES PATENT AND TRADEMARK OFFICE
CERTIFICATE OF CORRECTION

PATENT NO.         : 7,487,112 B2
APPLICATION NO.    : 10/154016
DATED              : February 3, 2009
INVENTOR(S)        : Melvin L. Barnes, Jr.

It is certified that error appears in the above-identified patent and that said Letters Patent is hereby corrected as shown below:

In column 39, line 6, delete "requester" and insert -- requestor --, therefor.

In column 39, line 63, before "vender" delete "10".

In column 51, line 30, delete "particular." and insert -- particular --, therefor.

In column 51, line 41, delete "for." and insert -- for --, therefor.

In column 56, line 6, delete "requester)" and insert -- requestor) --, therefor.

In column 57, line 27, delete "requester" and insert -- requestor --, therefor.

In column 57, line 42, delete "requester" and insert -- requestor --, therefor.

In column 57, line 58, delete "device 1 01" and insert -- device 101 --, therefor.

In column 58, line 66, delete "requesters" and insert -- requestors --  therefor.

In column 59, line 2, delete "requesters" and insert -- requestors --, therefor.

In column 63, line 15, after "above" insert -- . --.

In column 65, line 51, delete "data," and insert -- data. --, therefor.

In column 66, line 27, delete ".that" and insert -- that --, therefor.

In column 74, line 3, delete "Middle_initial" and insert -- Middle_Initial --, therefor.

In column 74, line 40, delete "puts." and insert -- puts --, therefor.

In column 82, line 27, delete "user." and insert -- user; --, therefor.

UNITED STATES PATENT AND TRADEMARK OFFICE
CERTIFICATE OF CORRECTION

PATENT NO. : 7,487,112 B2
APPLICATION NO. : 10/154016
DATED : February 3, 2009
INVENTOR(S) : Melvin L. Barnes, Jr.

It is certified that error appears in the above-identified patent and that said Letters Patent is hereby corrected as shown below:

In column 82, line 34, after "information" insert -- . --.

In column 83, line 5, delete "vehicle,:" and insert -- vehicle; --, therefor.

In column 83, line 24, delete "indicia." and insert -- indicia; --, therefor.

Signed and Sealed this

Seventh Day of April, 2009

JOHN DOLL
*Acting Director of the United States Patent and Trademark Office*